US012483273B2

(12) United States Patent
Zhang et al.

(10) Patent No.: US 12,483,273 B2
(45) Date of Patent: Nov. 25, 2025

(54) DATA ENCODING METHOD, DATA DECODING METHOD, AND DATA PROCESSING APPARATUS

(71) Applicant: HUAWEI TECHNOLOGIES CO., LTD., Guangdong (CN)

(72) Inventors: Shifeng Zhang, Beijing (CN); Ning Kang, Hong Kong (CN); Tom Ryder, London (GB); Zhenguo Li, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 18/618,306

(22) Filed: Mar. 27, 2024

(65) Prior Publication Data
US 2024/0235577 A1   Jul. 11, 2024

Related U.S. Application Data

(63) Continuation of application No. PCT/CN2022/120095, filed on Sep. 21, 2022.

(30) Foreign Application Priority Data

Sep. 30, 2021 (CN) .......................... 202111163722.5

(51) Int. Cl.
*H03M 7/00* (2006.01)
*G06F 7/50* (2006.01)
(Continued)

(52) U.S. Cl.
CPC ............. *H03M 7/6011* (2013.01); *G06F 7/50* (2013.01); *G06F 7/523* (2013.01); *G06F 7/72* (2013.01); *H03M 7/6005* (2013.01)

(58) Field of Classification Search
CPC ............. H03M 7/6011; H03M 7/6005; H03M 7/6035; H03M 7/40; H03M 7/3079;
(Continued)

(56) References Cited

U.S. PATENT DOCUMENTS

2023/0239516 A1*  7/2023  Mao ...................... H04N 19/30
                                                              375/240.12
2023/0401756 A1*  12/2023  Zhang .................. G06N 3/0464
(Continued)

FOREIGN PATENT DOCUMENTS

WO          2022179588 A1    9/2022
WO    WO-2025103888 A1 *   5/2025   .......... H04N 19/156

OTHER PUBLICATIONS

Shifeng Zhang et al.:"iVPF: Numerical Invertible Volume Preserving Flow for Efficient Lossless Compression" arXiv:2103.16211v1,2021. 3.30,XP93165597A, total 10 pages.
(Continued)

*Primary Examiner* — Jean B Jeanglaude
(74) *Attorney, Agent, or Firm* — WOMBLE BOND DICKINSON (US) LLP

(57) ABSTRACT

This application relates to the field of artificial intelligence, and discloses a data encoding method, a data decoding method, and data processing apparatuses. Both the data encoding method and the data decoding method relate to an invertible flow-based model. The invertible flow-based model includes a target invertible flow layer, a model parameter of the target invertible flow layer is used to constrain an auxiliary variable generated in an inverse transform processing process, an operation corresponding to the target invertible flow layer includes a multiplication operation and a division operation that are determined based on the model parameter, and the auxiliary variable is an increment of a product of the multiplication operation or a remainder generated through the division operation.

20 Claims, 17 Drawing Sheets

(51) Int. Cl.
  *G06F 7/523* (2006.01)
  *G06F 7/72* (2006.01)
  *H03M 7/30* (2006.01)

(58) Field of Classification Search
  CPC .. G06F 7/50; G06F 7/523; G06F 7/72; G06N 3/0464; G06N 3/0455
  See application file for complete search history.

(56) References Cited

U.S. PATENT DOCUMENTS

2024/0235577 A1* 7/2024 Zhang ................. H03M 7/6035
2024/0323441 A1* 9/2024 Guo ....................... H04N 19/60

OTHER PUBLICATIONS

Jonathan Ho et al.:"Compression with Flows via Local Bits-Back Coding", arXiv:1905.08500v3,2020.1.6, total 16 pages.

Rianne Van Den Berg: "IDF++: Analyzing and Improving Integer Discrete Flows for Lossless Compression", arXiv.org, Jun. 22, 2020, total 19 pages.

Emiel Hoogeboom et al.: "Integer Discrete Flows and Lossless Compression", arxiv.org, Cornell University Library, 201 Olin Library Cornell University Ithaca, NY 14853, May 17, 2019, total 11 pages.

* cited by examiner

DATA ENCODING METHOD, DATA DECODING METHOD, AND DATA PROCESSING APPARATUS

CROSS-REFERENCE TO RELATED APPLICATIONS

This application is a continuation of International Application No. PCT/CN2022/120095, filed on Sep. 21, 2022, which claims priority to Chinese Patent Application No. 202111163722.5, filed on Sep. 30, 2021. The disclosures of the aforementioned applications are hereby incorporated by reference in their entireties.

TECHNICAL FIELD

Embodiments of this application relate to the field of artificial intelligence (AI), and in particular, to a data encoding method, a data decoding method, and data processing apparatuses.

BACKGROUND

Lossless compression is a technology for compressing data. A length of compressed data obtained after lossless compression is performed on original data is less than a length of the original data, and the compressed data can be completely restored to the original data through decompression. Currently, a core of the lossless compression is to find an internal distribution rule of original data, and perform compression according to the internal rule of the original data. For example, if occurrence frequency of a letter e in the original data is much higher than that of a letter z, e is represented by using shorter bits, and the foregoing original data may be represented by using compressed data with a shorter length.

With the development of the artificial intelligence AI technology, researchers hope to use the AI technology to find a better internal distribution rule of data, and use the internal distribution rule of the data to perform compression, to expect to obtain a better lossless compression ratio. Currently, a common model that uses the AI technology to search for the internal distribution rule of the data is a flow-based model. In a compression procedure, the flow-based model transforms original data into hidden variables, the hidden variables have probability distribution, and compression may be performed based on the probability distribution of the hidden variables. In a decompression procedure, decompression is performed based on the probability distribution of the foregoing hidden variables, and the hidden variables are restored to the original data by using the flow-based model.

In a conventional solution, an integer discrete flow (IDF) model is usually used to implement lossless compression. Both an input and an output of the integer discrete flow model need to be integers, and integer addition and subtraction operations are used to avoid a floating-point number error, to ensure that the input and the output of the flow-based model are invertible. However, because the flow-based model is limited to the addition and subtraction operations, a model representation capability is poor, and model probability distribution estimation is poor. As a result, compression efficiency of the lossless compression is low.

SUMMARY

Embodiments of this application provide a data encoding method, a data decoding method, and data processing apparatuses, to improve compression efficiency of lossless compression.

According to a first aspect, this application provides a data encoding method, and the data encoding method is used in a data processing apparatus used as a compression end. In the method, the data processing apparatus obtains to-be-encoded data, performs forward transform processing on the to-be-encoded data by using an invertible flow-based model to obtain a hidden variable, and performs encoding processing on the hidden variable to obtain encoded data corresponding to the to-be-encoded data.

The invertible flow-based model is a new flow-based model proposed in this application. The invertible flow-based model includes a target invertible flow layer, and an operation corresponding to the target invertible flow layer is an invertible operation. The target invertible flow layer includes a model parameter, the model parameter is used to constrain an auxiliary variable generated in the forward transform processing process, the operation corresponding to the target invertible flow layer includes a multiplication operation and a division operation that are determined based on the model parameter, and the auxiliary variable is an increment of a product of the multiplication operation or a remainder generated through the division operation.

It should be understood that the model parameter of the target invertible flow layer may be a preconfigured parameter, or may be a parameter calculated by the target invertible flow layer based on an algorithm. This is not limited herein.

It should be understood that the to-be-encoded data may be original data such as an image, a video, or a text. In this case, the to-be-encoded data is usually integer data. Alternatively, the to-be-encoded data may be data obtained after preprocessing is performed based on original data such as an image, a video, or a text. In this case, the to-be-encoded data may be a fixed-point number with precision.

In this embodiment, because the invertible flow-based model used to perform forward transform processing on the to-be-encoded data includes the target invertible flow layer, not only the target invertible flow layer includes the multiplication operation and the division operation that are determined based on the model parameter, but the model parameter of the target invertible flow layer can further constrain the auxiliary variable generated in the forward transform processing process. The auxiliary variable is the increment of the product of the multiplication operation or the remainder generated through the division operation. In other words, in this application, not only the multiplication operation can be used, but invertibility can be implemented by using the auxiliary variable when the division operation is performed. Therefore, in comparison with an integer discrete flow model in the conventional technology, a model representation capability is improved. This helps improve estimation accuracy of model probability distribution, and can further improve compression efficiency of lossless compression.

In a possible implementation, the invertible flow-based model includes N invertible flow layers, the N invertible flow layers include the target invertible flow layer, and N is an integer greater than or equal to 1. The target invertible flow layer is used to perform forward transform processing on first data input to the target invertible flow layer to obtain second data output from the target invertible flow layer. The first data is a multiplier of the multiplication operation, and the second data is an integer quotient of the division operation.

In other words, in the forward transform processing process, in the multiplication operation determined based on the model parameter, the first data is used as the multiplier of the multiplication operation, and another multiplier of the multiplication operation is determined by using the model parameter. Because the auxiliary variable may be used as the increment of the product of the multiplication operation, intermediate data may be obtained based on the auxiliary variable plus a product of the first data and the another multiplier. In the division operation determined based on the model parameter, the second data is used as the integer quotient of the division operation, a divisor of the division operation is the intermediate data, and a dividend is determined by using the model parameter. Therefore, after the first data is input to the target invertible flow layer, the second data is output after operation processing such as the multiplication operation and the division operation is performed on the first data, and the second data is an output at the target invertible flow layer.

The first data is the to-be-encoded data or data output through processing by at least one invertible flow layer. The second data is the hidden variable, or data output by processing the second data by the at least one invertible flow layer is the hidden variable. It should be understood that the at least one invertible flow layer refers to n invertible flow layers, where n is an integer greater than or equal to 1 and less than N, but in this case, N is an integer greater than 1.

In other words, if the target invertible flow layer is a first invertible flow layer in the invertible flow-based model, the to-be-encoded data input to the invertible flow-based model is the first data, and after forward transform processing is performed on the first data, the target invertible flow layer outputs the second data. If the invertible flow-based model has only one invertible flow layer, the second data output by the target invertible flow layer is the hidden variable. If there are a plurality of invertible flow layers in the invertible flow-based model, the second data output by the target invertible flow layer is used as an input at another invertible flow layer, so that the another invertible flow layer processes the second data. In this way, the data output through processing by the at least one invertible flow layer is the hidden variable.

Similarly, if the target invertible flow layer is a last invertible flow layer in the invertible flow-based model, the first data is output after the to-be-encoded data input to the invertible flow-based model is processed by the at least one invertible flow layer. The first data is used as an input at the target invertible flow layer, and after forward transform processing is performed on the first data, the target invertible flow layer outputs the second data. Because the target invertible flow layer is the last invertible flow layer in the invertible flow-based model, the second data output by the target invertible flow layer is the hidden variable.

In this implementation, it is proposed that the multiplication operation is performed on the first data input to the target invertible flow layer, and the second data output from the target invertible flow layer is obtained through the division operation. Therefore, compared with the integer discrete flow model using only integer addition and subtraction, the invertible flow-based model in this application has a stronger model representation capability. This helps improve the estimation accuracy of the model probability distribution, and can further improve the compression efficiency of the lossless compression.

In a possible implementation, the model parameter includes a first parameter and a second parameter, both the first parameter and the second parameter are positive integers, the first parameter is unequal to the second parameter, the auxiliary variable includes a first auxiliary variable, and the first auxiliary variable is the increment of the product of the multiplication operation.

A process in which the data processing apparatus performs forward transform processing on the first data input to the target invertible flow layer, to obtain the second data output from the target invertible flow layer may be:
performing a multiplication operation by using the first data as a multiplier of the first parameter to obtain first product data;
performing an addition operation by using the first auxiliary variable as an increment of the first product data to obtain intermediate data; and
performing a division rounding operation by using the intermediate data as a divisor and the second parameter as a dividend to obtain the second data.

In other words, the data processing apparatus performs the addition operation on the first auxiliary variable and a product (that is, the first product data) obtained by performing the multiplication operation on the first data and the first parameter, to obtain the intermediate data. The data processing apparatus performs the division operation by using the intermediate data as the divisor and the second parameter as the dividend, and the obtained integer quotient is the second data. It can be learned that, in the forward transform process, the first data is first transformed into the intermediate data based on the multiplication operation and the addition operation, and the intermediate data is transformed into the second data based on the division rounding operation. Because the first auxiliary variable participates in a process of determining the intermediate data, that is, the first auxiliary variable is used as the increment of the product of the multiplication operation, and the integer quotient obtained by performing the division rounding operation based on the intermediate data is the second data, this avoids a problem of a non-invertible operation caused by using only the multiplication operation, and also avoids a problem of a poor model representation capability caused by using only the addition operation and the subtraction operation.

In a possible implementation, the auxiliary variable further includes a second auxiliary variable, and the second auxiliary variable is the remainder generated through the division operation.

When outputting the second data, the data processing apparatus further performs a division modulo operation by using the intermediate data as a divisor and the second parameter as a dividend to obtain the second auxiliary variable. The second auxiliary variable is used as an increment of a product of a multiplication operation in inverse transform processing corresponding to the forward transform processing, and the first auxiliary variable is used as a remainder generated through a division operation in the inverse transform processing.

In this implementation, it is proposed that the second auxiliary variable is further generated when the invertible flow-based model is in the forward transform processing, and the second auxiliary variable is used as the increment of the product of the multiplication operation in the inverse transform processing corresponding to the forward transform processing. In other words, in the inverse transform processing, the data processing apparatus restores the second data to the intermediate data based on the second auxiliary variable, and further restores the intermediate data to the first data. Therefore, in the forward transform processing, the second auxiliary variable is calculated. This helps restore the second data to the first data.

In a possible implementation, a process in which the data processing apparatus determines the first auxiliary variable based on the first parameter may be:

The data processing apparatus first obtains first auxiliary data input to the target invertible flow layer, and the data processing apparatus determines the first auxiliary variable based on the first auxiliary data and the first parameter.

In this implementation, it is proposed that the first auxiliary data input to the target invertible flow layer may be used in the process in which the data processing apparatus determines the first auxiliary variable based on the first parameter. The first auxiliary data may be a binary code stream.

In a possible implementation, the data processing apparatus may encode and decode, in an entropy coding mode (for example, uniform distribution of entropy coding), the auxiliary data input to the target invertible flow layer, to generate or store the auxiliary variable.

A process in which the data processing apparatus determines the first auxiliary variable based on the first auxiliary data and the first parameter may be:

determining first uniform distribution based on the first parameter, where endpoints of the first uniform distribution are 0 and the first parameter; and decoding the first auxiliary data by using the first uniform distribution to obtain the first auxiliary variable and second auxiliary data, where a value of the first auxiliary variable is between 0 and the first parameter.

In this implementation, it is proposed that the first uniform distribution determined based on the first parameter is used as probability distribution of the entropy coding, and the first auxiliary data is decoded based on the first uniform distribution to obtain the first auxiliary variable and the second auxiliary data.

In a possible implementation, a process in which the data processing apparatus decodes the first auxiliary data by using the first uniform distribution to obtain the first auxiliary variable and the second auxiliary data may be implemented by using the following operations:

performing a division modulo operation by using the first auxiliary data as a divisor and the first parameter as a dividend to obtain the first auxiliary variable; and performing a division rounding operation by using the first auxiliary data as a divisor and the first parameter as a dividend to obtain the second auxiliary data, where the second auxiliary data is used to: encode the second auxiliary variable in the forward transform process, and encode the first auxiliary variable in the inverse transform process.

In a possible implementation, after generating the second auxiliary variable, the data processing apparatus further encodes the second auxiliary variable in the entropy coding mode (for example, the uniform distribution of the entropy coding), so that the data processing apparatus can directly store the auxiliary data obtained after the second auxiliary variable is encoded, without directly storing the second auxiliary variable.

In this embodiment, the data processing apparatus uses the second auxiliary data obtained by decoding the first auxiliary data as auxiliary data for encoding the second auxiliary variable. The data processing apparatus encodes, by using the following operations, the second auxiliary variable generated by the target invertible flow layer:

determining second uniform distribution based on the second parameter, where endpoints of the second uniform distribution are 0 and the second parameter;

encoding the second auxiliary variable by using the second uniform distribution and the second auxiliary data to obtain third auxiliary data, where a value of the second auxiliary variable is between 0 and the second parameter; and storing the third auxiliary data, where the third auxiliary data is used to decode the second auxiliary variable in the inverse transform processing.

In this implementation, because the data processing apparatus encodes the second auxiliary variable by using the second auxiliary data to obtain the third auxiliary data encoded with the second auxiliary variable, this helps the data processing apparatus store the third auxiliary data, so that the data processing apparatus decodes the second auxiliary variable by using the third auxiliary data in the inverse transform processing process. Because storage space occupied for storing the third auxiliary data is far less than storage space required for storing the second auxiliary variable, in comparison with a solution in which the data processing apparatus directly stores the second auxiliary variable, this helps save the storage space, and improve storage efficiency. In addition, because the third auxiliary data is determined by encoding the second auxiliary variable by using the second auxiliary data, and the second auxiliary data is obtained in a process in which the first auxiliary variable is decoded by using the first auxiliary data, storing the third auxiliary data means indirectly storing a correspondence between the second auxiliary variable and the first auxiliary variable (this is equivalent to storing the first auxiliary variable and the second auxiliary variable correspondingly).

In a possible implementation, a process in which the data processing apparatus encodes the second auxiliary variable by using the second uniform distribution and the second auxiliary data to obtain the third auxiliary data may be implemented by using the following operation:

performing an addition operation on the second auxiliary variable and a product obtained by performing a multiplication operation on the second auxiliary data and the second parameter, to obtain the third auxiliary data.

In a possible implementation, the target invertible flow layer is further used to: obtain a first interval in a definition range of a first monotonic continuous function and a second interval that corresponds to the first interval and that is in a value range of the first monotonic continuous function, where the first monotonic continuous function is a non-linear function; and calculate the model parameter based on the first interval and the second interval by using an interpolation algorithm or a binary search algorithm. The model parameter includes the first parameter and the second parameter.

In this implementation, it is proposed that the target invertible flow layer may be constructed based on the non-linear function (for example, the first monotonic continuous function). In this case, the data processing apparatus may divide the non-linear function into a plurality of segments, and approximate each segment to a straight line to calculate the first parameter and the second parameter. Optionally, the data processing apparatus may calculate the first parameter and the second parameter by using the interpolation algorithm or the binary search algorithm.

In a possible implementation, when the N invertible flow layers include at least two invertible flow layers, the N invertible flow layers are arranged in a serial manner. An output at an $(i-1)^{th}$ invertible flow layer is used as an input at an $i^{th}$ invertible flow layer, i is a positive integer greater than 1 and not greater than N, an input at a first invertible flow layer is the to-be-encoded data, and an output at an $N^{th}$ invertible flow layer is the hidden variable.

In this implementation, it is proposed that a plurality of invertible flow layers in the invertible flow-based model are arranged in series. This helps the invertible flow layers in the invertible flow-based model sequentially process data, thereby ensuring a sequence of the inverse transform processing process.

In a possible implementation, the to-be-encoded data is data obtained by performing bits-back encoding processing on the original data by using noise data, and the to-be-encoded data is fixed-point number data with first preset precision.

The $i^{th}$ invertible flow layer is further used to: before the forward transform processing, process the fixed-point number data with first preset precision into integer data, and process, into the fixed-point number data with first preset precision, the integer data obtained through the forward transform processing, to be used as an output at the $i^{th}$ invertible flow layer.

It should be understood that the noise data may be a bit stream of compressed data in the data processing apparatus, or may be a bit stream prestored in the data processing apparatus. This is not limited herein. In this implementation, because bits-back encoding processing is performed on the original data by using the noise data, a value of data calculated by the data processing apparatus can be increased. This helps improve processing precision in a subsequent transform process, and also helps improve a compression ratio.

In a possible implementation, the N invertible flow layers further include an invertible convolutional layer, the invertible convolutional layer includes a convolution kernel and the target invertible flow layer, and the convolution kernel is a square matrix whose order is a quantity of channels of the to-be-encoded data.

The invertible convolutional layer is used to perform LU (Lower-Upper) factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

In this implementation, it is proposed that the invertible convolutional layer is disposed in the invertible flow-based model, and a 1*1 convolutional layer is combined with the target invertible flow layer. The 1*1 convolutional layer is converted into continuous matrix multiplication operations of an upper triangular matrix, the diagonal matrix, a lower triangular matrix, and a permutation matrix. Iteration calculation, numerically invertible linear flow transform processing based on the target invertible flow layer, iteration calculation, and element rearrangement are used for the four matrix multiplications, respectively. Therefore, diversity of data transformation can be implemented, and a representation capability of the invertible flow-based model can be improved.

In a possible implementation, the N invertible flow layers further include a coupling layer, and the coupling layer includes the target invertible flow layer.

The coupling layer is used to: divide, based on preset dimensions, data input to the coupling layer into at least two parts of data, and process at least one of the at least two parts of data as an input at the target invertible flow layer to obtain an output at the coupling layer.

It should be understood that the coupling layer may include a neural network, and the neural network is used to process, based on the dimensions, the data input to the coupling layer. The neural network may include a plurality of types, for example, a convolutional neural network (CNN), a deep neural network (DNN), a recurrent neural network (RNN), or another neural network. This is not limited herein.

In this implementation, it is proposed that the coupling layer is disposed in the invertible flow-based model. The coupling layer can divide, based on the dimensions, the data input to the coupling layer, and perform transform processing only on data in some dimensions in a transform mode of the target invertible flow layer. Therefore, the diversity of the data transformation can be implemented, and the representation capability of the invertible flow-based model can be improved.

According to a second aspect, this application provides a data decoding method, and the data decoding method is used in a data processing apparatus used as a decompression end. In the method, the data processing apparatus obtains encoded data, performs decoding processing on the encoded data to obtain a hidden variable, and performs inverse transform processing on the hidden variable by using an invertible flow-based model to obtain a decoded output.

The invertible flow-based model is a new flow-based model proposed in this application. It should be understood that the data encoding method and the data decoding method use the same invertible flow-based model. The invertible flow-based model includes a target invertible flow layer, the target invertible flow layer includes a model parameter, the model parameter is used to constrain an auxiliary variable generated in the inverse transform processing process, an operation corresponding to the target invertible flow layer includes a multiplication operation and a division operation that are determined based on the model parameter, and the auxiliary variable is an increment of a product of the multiplication operation or a remainder generated through the division operation.

It should be understood that the model parameter of the target invertible flow layer may be a preconfigured parameter, or may be a parameter calculated by the target invertible flow layer based on an algorithm. This is not limited herein.

It should be understood that the to-be-encoded data may be original data such as an image, a video, or a text. In this case, the to-be-encoded data is usually integer data. Alternatively, the to-be-encoded data may be data obtained after preprocessing is performed based on original data such as an image, a video, or a text. In this case, the to-be-encoded data may be a fixed-point number with precision.

In this embodiment, the data processing apparatus performs inverse transform processing on the decoded hidden variable, and the invertible flow-based model used to perform inverse transform processing includes the target invertible flow layer. Not only the target invertible flow layer includes the multiplication operation and the division operation that are determined based on the model parameter, but the model parameter of the target invertible flow layer can further constrain the auxiliary variable generated in the inverse transform processing process. The auxiliary variable is the increment of the product of the multiplication operation or the remainder generated through the division operation. In other words, in this application, for a multiplication operation in a forward transform processing process, the division operation can be performed by using the auxiliary variable, to restore the hidden variable to data (that is, the to-be-encoded data in the foregoing data encoding method) before the forward transform processing. Therefore, not only an invertible operation of transform processing can be ensured, but a model representation capability can be improved. This helps improve estimation accuracy of model probability distribution, and can further improve compression efficiency of lossless compression.

In a possible implementation, the invertible flow-based model includes N invertible flow layers, the N invertible flow layers include the target invertible flow layer, and N is an integer greater than or equal to 1. The target invertible flow layer is used to perform inverse transform processing on second data input to the target invertible flow layer to obtain first data output from the target invertible flow layer. The second data is a multiplier of the multiplication operation, and the first data is an integer quotient of the division operation.

In other words, in the inverse transform processing process, in the multiplication operation determined based on the model parameter, the second data is used as the multiplier of the multiplication operation, and another multiplier of the multiplication operation is determined by using the model parameter. Because the auxiliary variable may be used as the increment of the product of the multiplication operation, intermediate data may be obtained based on the auxiliary variable plus a product of the second data and the another multiplier. In the division operation determined based on the model parameter, the first data is used as the integer quotient of the division operation, a divisor of the division operation is the intermediate data, and a dividend is determined by using the model parameter. Therefore, after the second data is input to the target invertible flow layer, the first data is output after operation processing such as the multiplication operation and the division operation is performed on the second data, and the first data is an output at the target invertible flow layer.

It should be understood that a model parameter (for example, a first parameter) and an auxiliary variable (for example, a first auxiliary variable) that are used in the multiplication operation in the forward transform processing process are applied to the division operation in the inverse transform processing process; and a model parameter (for example, a second parameter) and an auxiliary variable (for example, a second auxiliary variable) that are used in a division operation in the forward transform processing process are applied to the multiplication operation in the inverse transform processing process.

The second data is the hidden variable or data output through processing by at least one invertible flow layer. The first data is the decoded output, or an output obtained by processing the first data by the at least one invertible flow layer is the decoded output. It should be understood that the at least one invertible flow layer refers to n invertible flow layers, where n is an integer greater than or equal to 1 and less than N, but in this case, N is an integer greater than 1.

In this implementation, it is proposed that the multiplication operation is performed on the second data input to the target invertible flow layer, and the first data output from the target invertible flow layer is obtained through the division operation. Therefore, compared with an integer discrete flow model using only integer addition and subtraction, the invertible flow-based model in this application has a stronger model representation capability. This helps improve the estimation accuracy of the model probability distribution, and can further improve the compression efficiency of the lossless compression.

In a possible implementation, the model parameter includes a first parameter and a second parameter, both the first parameter and the second parameter are positive integers, the first parameter is unequal to the second parameter, the auxiliary variable includes a second auxiliary variable, and the second auxiliary variable is the increment of the product of the multiplication operation.

A process in which the data processing apparatus performs inverse transform processing on the second data input to the target invertible flow layer, to obtain the first data output from the target invertible flow layer may be:
performing a multiplication operation by using the second data as a multiplier of the second parameter to obtain second product data;
performing an addition operation by using the second auxiliary variable as an increment of the second product data to obtain intermediate data; and
performing a division rounding operation by using the intermediate data as a divisor and the first parameter as a dividend to obtain the first data.

In other words, the data processing apparatus performs the addition operation on the second auxiliary variable and a product (that is, the second product data) obtained by performing the multiplication operation on the second data and the second parameter, to obtain the intermediate data. The data processing apparatus performs the division operation by using the intermediate data as the divisor and the first parameter as the dividend, and the obtained integer quotient is the first data. It can be learned that, in the forward transform process, the second data is first transformed into the intermediate data based on the multiplication operation and the addition operation, and the intermediate data is transformed into the first data based on the division rounding operation. Because the second auxiliary variable participates in a process of determining the intermediate data, that is, the second auxiliary variable is used as the increment of the product of the multiplication operation, and the integer quotient obtained by performing the division rounding operation based on the intermediate data is the first data, this avoids a problem of a non-invertible operation caused by using only the multiplication operation, and also avoids a problem of a poor model representation capability caused by using only the addition operation and the subtraction operation.

It should be understood that a sequence of the model parameters and the auxiliary variables used by the target invertible flow layer in the inverse transform processing process is opposite to a sequence of the model parameters and the auxiliary variables used by the target invertible flow layer in the forward transform processing process.

In a possible implementation, the auxiliary variable further includes a first auxiliary variable, and the first auxiliary variable is the remainder generated through the division operation.

When outputting the second data, the data processing apparatus further performs a division modulo operation by using the intermediate data as a divisor and the first parameter as a dividend to obtain the first auxiliary variable.

In this implementation, it is proposed that the first auxiliary variable is further generated when the target invertible flow-based model is in the inverse transform processing, so that the data processing apparatus replies, based on the first auxiliary variable, data (for example, the first auxiliary data) related to the first auxiliary variable.

In a possible implementation, a process in which the data processing apparatus determines the second auxiliary variable based on the second parameter may be:
The data processing apparatus first obtains third auxiliary data input to the target invertible flow layer, where the third auxiliary data is auxiliary data stored in the forward transform processing corresponding to the inverse transform processing; and the data processing apparatus determines the second auxiliary variable based on the third auxiliary data and the second parameter.

In this embodiment, it is proposed that the data processing apparatus determines the second auxiliary variable by using the third auxiliary data stored in the forward transform processing corresponding to the inverse transform processing. This helps restore the second auxiliary variable from the third auxiliary data, to ensure that a value of the second auxiliary variable used in the inverse transform processing process is consistent with a value of the second auxiliary variable used in the forward transform processing process.

In a possible implementation, in the forward transform processing process, the data processing apparatus encodes and decodes, in an entropy coding mode (for example, uniform distribution of entropy coding), the auxiliary data input to the target invertible flow layer, to generate or store the auxiliary variable. In this case, in the forward transform processing process, the data processing apparatus encodes and decodes the auxiliary data by using same uniform distribution.

A process in which the data processing apparatus determines the second auxiliary variable based on the third auxiliary data and the second parameter may be:
determining second uniform distribution based on the second parameter, where endpoints of the second uniform distribution are 0 and the second parameter; and
decoding the third auxiliary data by using the second uniform distribution to obtain the second auxiliary variable and second auxiliary data, where the value of the second auxiliary variable is between 0 and the second parameter.

In this implementation, it is proposed that the second uniform distribution determined by using the second parameter is used as probability distribution of the entropy coding, and the third auxiliary data is decoded based on the second uniform distribution to obtain the second auxiliary variable and the second auxiliary data.

In a possible implementation, a process in which the data processing apparatus decodes the third auxiliary data by using the second uniform distribution to obtain the second auxiliary variable and the second auxiliary data may be implemented by using the following operations:
performing a division modulo operation by using the third auxiliary data as a divisor and the second parameter as a dividend to obtain the second auxiliary variable; and
performing a division rounding operation by using the third auxiliary data as a divisor and the second parameter as a dividend to obtain the second auxiliary data, where the second auxiliary data is used to: encode the second auxiliary variable in the forward transform process, and encode the first auxiliary variable in the inverse transform process.

In a possible implementation, after generating the second auxiliary variable, the data processing apparatus further encodes the second auxiliary variable in the entropy coding mode (for example, the uniform distribution of the entropy coding), so that the data processing apparatus can directly store the auxiliary data obtained after the second auxiliary variable is encoded, without directly storing the second auxiliary variable.

In this embodiment, the data processing apparatus uses the second auxiliary data obtained by decoding the third auxiliary data as auxiliary data for encoding the first auxiliary variable. The data processing apparatus encodes, by using the following operations, the first auxiliary variable generated by the target invertible flow layer:
determining first uniform distribution based on the first parameter, where endpoints of the first uniform distribution are 0 and the first parameter;
encoding the first auxiliary variable by using the first uniform distribution and the second auxiliary data to obtain first auxiliary data, where a value of the first auxiliary variable is between 0 and the first parameter; and
storing the first auxiliary data, where the first auxiliary data is auxiliary data that is input to the target invertible flow layer in the forward transform processing corresponding to the inverse transform processing.

In this implementation, because the data processing apparatus encodes the first auxiliary variable by using the second auxiliary data to obtain the first auxiliary data encoded with the first auxiliary variable, this helps the data processing apparatus store the first auxiliary data. Because storage space occupied for storing the first auxiliary data is far less than storage space required for storing the first auxiliary variable, in comparison with a solution in which the data processing apparatus directly stores the first auxiliary variable, this helps save the storage space, and improve storage efficiency. In addition, generating and storing the first auxiliary data helps restore the first auxiliary data input to the target invertible flow layer in the forward transform processing process.

In a possible implementation, a process in which the data processing apparatus encodes the first auxiliary variable by using the first uniform distribution and the second auxiliary data to obtain the first auxiliary data may be implemented by using the following operation:
performing an addition operation on the first auxiliary variable and a product obtained by performing a multiplication operation on the second auxiliary data and the first parameter, to obtain the first auxiliary data.

In another possible implementation, the target invertible flow layer is further used to:
obtain a first interval in a definition range of a first monotonic continuous function and a second interval that corresponds to the first interval and that is in a value range of the first monotonic continuous function, where the first monotonic continuous function is a non-linear function; and calculate the model parameter based on the first interval and the second interval by using an interpolation algorithm or a binary search algorithm. The model parameter includes the first parameter and the second parameter.

In this implementation, it is proposed that the target invertible flow layer may be constructed based on the non-linear function (for example, the first monotonic continuous function). In this case, the data processing apparatus may divide the non-linear function into a plurality of segments, and approximate each segment to a straight line to calculate the first parameter and the second parameter. Optionally, the data processing apparatus may calculate the first parameter and the second parameter by using the interpolation algorithm or the binary search algorithm.

In a possible implementation, when the N invertible flow layers include at least two invertible flow layers, the N invertible flow layers are arranged in a serial manner. An output at an $i^{th}$ invertible flow layer is used as an input at an $(i-1)^{th}$ invertible flow layer, i is a positive integer greater than 1 and not greater than N, an input at an $N^{th}$ invertible flow layer is the hidden variable, and an output at a first invertible flow layer is the decoded output.

In this implementation, it is proposed that a plurality of invertible flow layers in the invertible flow-based model are arranged in series. This helps the invertible flow layers in the invertible flow-based model sequentially process data. It should be understood that a sequence in which the data passes through the invertible flow layers in the forward transform processing process is opposite to a sequence in which the data passes through the invertible flow layers in the inverse transform processing process.

In a possible implementation, the $i^{th}$ invertible flow layer is further used to: before the inverse transform processing, process fixed-point number data with first preset precision into integer data, and process, into the fixed-point number data with first preset precision, the integer data obtained through the inverse transform processing, to be used as an output at the $i^{th}$ invertible flow layer.

In a possible implementation, the method further includes: The data processing apparatus performs bits-back decoding processing on the output at the first invertible flow layer to obtain original data and noise data.

In this embodiment, it is proposed that if the decoded output is data obtained by performing bits-back encoding processing on the original data by using the noise data, the data processing apparatus may separate, by performing bits-back decoding processing, the noise data and the original data from the decoded output.

In a possible implementation, the N serial invertible flow layers further include an invertible convolutional layer, the invertible convolutional layer includes a convolution kernel and the target invertible flow layer, and the convolution kernel is a square matrix whose order is a quantity of channels of the to-be-encoded data.

The invertible convolutional layer is used to perform LU factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

In this implementation, it is proposed that the invertible convolutional layer is disposed in the invertible flow-based model, and a 1*1 convolutional layer is combined with the target invertible flow layer. The 1*1 convolutional layer is converted into continuous matrix multiplication operations of an upper triangular matrix, the diagonal matrix, a lower triangular matrix, and a permutation matrix. Iteration calculation, numerically invertible linear flow transform processing based on the target invertible flow layer, iteration calculation, and element rearrangement are used for the four matrix multiplications, respectively. Therefore, diversity of data transformation can be implemented, and a representation capability of the invertible flow-based model can be improved.

In a possible implementation, the N serial invertible flow layers further include a coupling layer, and the coupling layer includes the target invertible flow layer.

The coupling layer is used to: divide, based on preset dimensions, data input to the coupling layer into at least two parts of data, and process at least one of the at least two parts of data as an input at the target invertible flow layer to obtain an output at the coupling layer.

It should be understood that the coupling layer may include a neural network, and the neural network is used to process, based on the dimensions, the data input to the coupling layer. The neural network may include a plurality of types, for example, a convolutional neural network CNN, a deep neural network DNN, a recurrent neural network RNN, or another neural network. This is not limited herein.

In this implementation, it is proposed that the coupling layer is disposed in the invertible flow-based model. The coupling layer can divide, based on the dimensions, the data input to the coupling layer, and perform transform processing only on data in some dimensions in a transform mode of the target invertible flow layer. Therefore, the diversity of the data transformation can be implemented, and the representation capability of the invertible flow-based model can be improved.

According to a third aspect, this application provides a data processing apparatus, and the data processing apparatus is an encoder side. The data processing apparatus includes an obtaining module, a transform processing module, and an encoding module. The transform processing module includes the invertible flow-based model proposed in this application. At the encoder side, the invertible flow-based model is used to perform forward transform processing on data input to the invertible flow-based model. Functions of the foregoing functional modules are as follows:

The obtaining module is configured to obtain to-be-encoded data;

the transform processing module is configured to perform forward transform processing on the to-be-encoded data by using the invertible flow-based model to obtain a hidden variable, where the invertible flow-based model includes a target invertible flow layer, the target invertible flow layer includes a model parameter, the model parameter is used to constrain an auxiliary variable generated in the forward transform processing process, an operation corresponding to the target invertible flow layer includes a multiplication operation and a division operation that are determined based on the model parameter, and the auxiliary variable is an increment of a product of the multiplication operation or a remainder generated through the division operation; and the encoding module is configured to perform encoding processing on the hidden variable to obtain encoded data corresponding to the to-be-encoded data.

In this embodiment, because the invertible flow-based model used to perform forward transform processing on the to-be-encoded data includes the target invertible flow layer, not only the target invertible flow layer includes the multiplication operation and the division operation that are determined based on the model parameter, but the model parameter of the target invertible flow layer can further constrain the auxiliary variable generated in the forward transform processing process. The auxiliary variable is the increment of the product of the multiplication operation or the remainder generated through the division operation. In other words, in this application, not only the multiplication operation can be used, but invertibility can be implemented by using the auxiliary variable when the division operation is performed. Therefore, in comparison with an integer discrete flow model in the conventional technology, a model representation capability is improved. This helps improve estimation accuracy of model probability distribution, and can further improve compression efficiency of lossless compression.

In a possible implementation, the invertible flow-based model includes N invertible flow layers, the N invertible flow layers include the target invertible flow layer, and N is an integer greater than or equal to 1.

The target invertible flow layer is used to perform forward transform processing on first data input to the target invertible flow layer to obtain second data output from the target invertible flow layer. The first data is a multiplier of the multiplication operation, and the second data is an integer quotient of the division operation. The first data is the to-be-encoded data or data output through processing by at least one invertible flow layer. The second data is the hidden variable, or data output by processing the second data by the at least one invertible flow layer is the hidden variable.

In a possible implementation, the model parameter includes a first parameter and a second parameter, both the first parameter and the second parameter are positive integers, the first parameter is unequal to the second parameter, the auxiliary variable includes a first auxiliary variable, and the first auxiliary variable is the increment of the product of the multiplication operation.

The transform processing module is configured to:
perform a multiplication operation by using the first data as a multiplier of the first parameter to obtain first product data;
perform an addition operation by using the first auxiliary variable as an increment of the first product data to obtain intermediate data; and
perform a division rounding operation by using the intermediate data as a divisor and the second parameter as a dividend to obtain the second data.

In a possible implementation, the auxiliary variable further includes a second auxiliary variable, and the second auxiliary variable is the remainder generated through the division operation.

The transform processing module is further configured to perform a division modulo operation by using the intermediate data as a divisor and the second parameter as a dividend to obtain the second auxiliary variable. The second auxiliary variable is used as an increment of a product of a multiplication operation in inverse transform processing corresponding to the forward transform processing, and the first auxiliary variable is used as a remainder generated through a division operation in the inverse transform processing.

In a possible implementation, the transform processing module is further configured to: obtain first auxiliary data input to the target invertible flow layer; and determine the first auxiliary variable based on the first auxiliary data and the first parameter.

In a possible implementation, the transform processing module is configured to:
determine first uniform distribution based on the first parameter, where endpoints of the first uniform distribution are 0 and the first parameter; and
decode the first auxiliary data by using the first uniform distribution to obtain the first auxiliary variable and second auxiliary data, where a value of the first auxiliary variable is between 0 and the first parameter.

In a possible implementation, the transform processing module includes a first entropy encoding and decoding module, the first entropy encoding and decoding module stores the first uniform distribution, and the first entropy encoding and decoding module is configured to:
perform a division modulo operation by using the first auxiliary data as a divisor and the first parameter as a dividend to obtain the first auxiliary variable; and
perform a division rounding operation by using the first auxiliary data as a divisor and the first parameter as a dividend to obtain the second auxiliary data, where the second auxiliary variable is used to: encode the second auxiliary variable in the forward transform process, and encode the first auxiliary variable in the inverse transform process.

In a possible implementation, the transform processing module is further configured to:
determine second uniform distribution based on the second parameter, where endpoints of the second uniform distribution are 0 and the second parameter;
encode the second auxiliary variable by using the second uniform distribution and the second auxiliary data to obtain third auxiliary data, where a value of the second auxiliary variable is between 0 and the second parameter; and
store the third auxiliary data, where the third auxiliary data is used to decode the second auxiliary variable in the inverse transform processing.

In a possible implementation, the transform processing module includes a second entropy encoding and decoding module, the second entropy encoding and decoding module stores the second uniform distribution, and the second entropy encoding and decoding module is configured to:
perform an addition operation on the second auxiliary variable and a product obtained by performing a multiplication operation on the second auxiliary data and the second parameter, to obtain the third auxiliary data.

In another possible implementation, the target invertible flow layer is further used to:
obtain a first interval in a definition range of a first monotonic continuous function and a second interval that corresponds to the first interval and that is in a value range of the first monotonic continuous function, where the first monotonic continuous function is a non-linear function; and
calculate the model parameter based on the first interval and the second interval by using an interpolation algorithm or a binary search algorithm.

In a possible implementation, when the N invertible flow layers include at least two invertible flow layers, the N invertible flow layers are arranged in a serial manner.

An output at an $(i-1)^{th}$ invertible flow layer is used as an input at an $i^{th}$ invertible flow layer, i is a positive integer greater than 1 and not greater than N, an input at a first invertible flow layer is the to-be-encoded data, and an output at an $N^{th}$ invertible flow layer is the hidden variable.

In a possible implementation, the to-be-encoded data is data obtained by performing bits-back encoding processing on original data by using noise data, and the to-be-encoded data is fixed-point number data with first preset precision.

The $i^{th}$ invertible flow layer is further used to: before the forward transform processing, process the fixed-point number data with first preset precision into integer data, and process, into the fixed-point number data with first preset precision, the integer data obtained through the forward transform processing, to be used as an output at the $i^{th}$ invertible flow layer.

In a possible implementation, the N invertible flow layers further include an invertible convolutional layer, the invertible convolutional layer includes a convolution kernel and the target invertible flow layer, and the convolution kernel is a square matrix whose order is a quantity of channels of the to-be-encoded data.

The invertible convolutional layer is used to perform LU factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

In a possible implementation, the N invertible flow layers further include a coupling layer, and the coupling layer includes the target invertible flow layer.

The coupling layer is used to: divide, based on preset dimensions, data input to the coupling layer into at least two parts of data, and process at least one of the at least two parts of data as an input at the target invertible flow layer to obtain an output at the coupling layer.

It should be noted that there are a plurality of other implementations in this embodiment of this application. For details, refer to the implementations of the first aspect and beneficial effects of the first aspect. Details are not described herein again.

According to a fourth aspect, this application provides a data processing apparatus, and the data processing apparatus is a decoder side. The data processing apparatus includes an obtaining module, a transform processing module, and a decoding module. The transform processing module includes the invertible flow-based model proposed in this application. At the decoder side, the invertible flow-based model is used to perform inverse transform processing on data input to the invertible flow-based model. Functions of the foregoing functional modules are as follows:

The obtaining module is configured to obtain encoded data;
the decoding module is configured to perform decoding processing on the encoded data to obtain a hidden variable; and
the transform processing module is configured to perform inverse transform processing on the hidden variable by using the invertible flow-based model to obtain a decoded output, where the invertible flow-based model includes a target invertible flow layer, the target invertible flow layer includes a model parameter, the model parameter is used to constrain an auxiliary variable generated in the inverse transform processing process, an operation corresponding to the target invertible flow layer includes a multiplication operation and a division operation that are determined based on the model parameter, and the auxiliary variable is an increment of a product of the multiplication operation or a remainder generated through the division operation.

In this embodiment, the data processing apparatus performs inverse transform processing on the decoded hidden variable, and the invertible flow-based model used to perform inverse transform processing includes the target invertible flow layer. Not only the target invertible flow layer includes the multiplication operation and the division operation that are determined based on the model parameter, but the model parameter of the target invertible flow layer can further constrain the auxiliary variable generated in the inverse transform processing process. The auxiliary variable is the increment of the product of the multiplication operation or the remainder generated through the division operation. In other words, in this application, for a multiplication operation in a forward transform processing process, the division operation can be performed by using the auxiliary variable, to restore the hidden variable to data (that is, the to-be-encoded data in the foregoing data encoding method) before the forward transform processing. Therefore, not only an invertible operation of transform processing can be ensured, but a model representation capability can be improved. This helps improve estimation accuracy of model probability distribution, and can further improve compression efficiency of lossless compression.

In a possible implementation, the invertible flow-based model includes N invertible flow layers, the N invertible flow layers include the target invertible flow layer, and N is an integer greater than or equal to 1.

The target invertible flow layer is used to perform inverse transform processing on second data input to the target invertible flow layer to obtain first data output from the target invertible flow layer. The second data is a multiplier of the multiplication operation, and the first data is an integer quotient of the division operation. The second data is the hidden variable or data output through processing by at least one invertible flow layer. The first data is the decoded output, or an output obtained by processing the first data by the at least one invertible flow layer is the decoded output.

In a possible implementation, the model parameter includes a first parameter and a second parameter, both the first parameter and the second parameter are positive integers, the first parameter is unequal to the second parameter, the auxiliary variable includes a second auxiliary variable, and the second auxiliary variable is the increment of the product of the multiplication operation.

The transform processing module is configured to:
perform a multiplication operation by using the second data as a multiplier of the second parameter to obtain second product data;
perform an addition operation by using the second auxiliary variable as an increment of the second product data to obtain intermediate data; and
perform a division rounding operation by using the intermediate data as a divisor and the first parameter as a dividend to obtain the first data.

In a possible implementation, the auxiliary variable further includes a first auxiliary variable, and the first auxiliary variable is the remainder generated through the division operation.

The transform processing module is further configured to:
perform a division modulo operation by using the intermediate data as a divisor and the first parameter as a dividend to obtain the first auxiliary variable.

In a possible implementation, the transform processing module is configured to:
obtain third auxiliary data input to the target invertible flow layer, where the third auxiliary data is auxiliary data stored in the forward transform processing corresponding to the inverse transform processing; and
determine the second auxiliary variable based on the third auxiliary data and the second parameter.

In a possible implementation, the transform processing module is configured to:
determine second uniform distribution based on the second parameter, where endpoints of the second uniform distribution are 0 and the second parameter; and
decode the third auxiliary data by using the second uniform distribution to obtain the second auxiliary variable and second auxiliary data, where a value of the second auxiliary variable is between 0 and the second parameter.

In a possible implementation, the transform processing module includes a second entropy encoding and decoding module, the second entropy encoding and decoding module stores the second uniform distribution, and the second entropy encoding and decoding module is configured to:
perform a division modulo operation by using the third auxiliary data as a divisor and the second parameter as a dividend to obtain the second auxiliary variable; and
perform a division rounding operation by using the third auxiliary data as a divisor and the second parameter as a dividend to obtain the second auxiliary data, where the second auxiliary data is used to: encode the second auxiliary variable in the forward transform process, and encode the first auxiliary variable in the inverse transform process.

In a possible implementation, the transform processing module is further configured to:

determine first uniform distribution based on the first parameter, where endpoints of the first uniform distribution are 0 and the first parameter;

encode the first auxiliary variable by using the first uniform distribution and the second auxiliary data to obtain first auxiliary data, where a value of the first auxiliary variable is between 0 and the first parameter; and store the first auxiliary data, where the first auxiliary data is auxiliary data that is input to the target invertible flow layer in the forward transform processing corresponding to the inverse transform processing.

In a possible implementation, the transform processing module includes a first entropy encoding and decoding module, the first entropy encoding and decoding module stores the first uniform distribution, and the first entropy encoding and decoding module is configured to:

perform an addition operation on the first auxiliary variable and a product obtained by performing a multiplication operation on the second auxiliary data and the first parameter, to obtain the first auxiliary data.

In another possible implementation, the target invertible flow layer is further used to:

obtain a first interval in a definition range of a first monotonic continuous function and a second interval that corresponds to the first interval and that is in a value range of the first monotonic continuous function, where the first monotonic continuous function is a non-linear function; and calculate the model parameter based on the first interval and the second interval by using an interpolation algorithm or a binary search algorithm.

In a possible implementation, when the N invertible flow layers include at least two invertible flow layers, the N invertible flow layers are arranged in a serial manner.

An output at an $i^{th}$ invertible flow layer is used as an input at an $(i-1)^{th}$ invertible flow layer, i is a positive integer greater than 1 and not greater than N, an input at an $N^{th}$ invertible flow layer is the hidden variable, and an output at a first invertible flow layer is the decoded output.

In a possible implementation, the $i^{th}$ invertible flow layer is further used to: before the inverse transform processing, process fixed-point number data with first preset precision into integer data, and process, into the fixed-point number data with first preset precision, the integer data obtained through the inverse transform processing, to be used as an output at the $i^{th}$ invertible flow layer.

In a possible implementation, the decoding module is further configured to perform bits-back decoding processing on the output at the first invertible flow layer to obtain original data and noise data.

In a possible implementation, the N serial invertible flow layers further include an invertible convolutional layer, the invertible convolutional layer includes a convolution kernel and the target invertible flow layer, and the convolution kernel is a square matrix whose order is a quantity of channels of the to-be-encoded data.

The invertible convolutional layer is used to perform LU factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

In a possible implementation, the N serial invertible flow layers further include a coupling layer, and the coupling layer includes the target invertible flow layer.

The coupling layer is used to: divide, based on preset dimensions, data input to the coupling layer into at least two parts of data, and process at least one of the at least two parts of data as an input at the target invertible flow layer to obtain an output at the coupling layer.

It should be noted that there are a plurality of other implementations in this embodiment of this application. For details, refer to the implementations of the second aspect and beneficial effects of the second aspect. Details are not described herein again.

According to a fifth aspect, this application provides a data processing apparatus, and the data processing apparatus is an encoder side. The data processing apparatus includes a storage medium, a processing circuit, and a bus system. The storage medium is configured to store instructions, and the processing circuit is configured to execute the instructions in the memory, to perform the data encoding method described in any one of the first aspect or the implementations of the first aspect.

According to a sixth aspect, this application provides a data processing apparatus, and the data processing apparatus is a decoder side. The data processing apparatus includes a storage medium, a processing circuit, and a bus system. The storage medium is configured to store instructions, and the processing circuit is configured to execute the instructions in the memory, to perform the data decoding method described in any one of the second aspect or the implementations of the second aspect.

According to a seventh aspect, an embodiment of this application provides a computer-readable storage medium, including instructions. When the instructions are run on a computer, the computer is enabled to perform the method described in any one of the first aspect or the second aspect, or the implementations of the foregoing aspects.

According to an eighth aspect, an embodiment of this application provides a computer program product including instructions. When the computer program product runs on a computer, the computer is enabled to perform the method described in any one of the first aspect or the second aspect, or the implementations of the foregoing aspects.

According to a ninth aspect, this application provides a chip system. The chip system includes a processor, configured to support an execution device or a training device to implement a function in the foregoing aspects, for example, send or process data and/or information in the foregoing methods. In a possible design, the chip system further includes a memory, and the memory is configured to store program instructions and data for the execution device or the training device. The chip system may include a chip, or may include a chip and another discrete device.

According to the foregoing technical solutions, it can be learned that embodiments of this application have the following advantages.

For the data encoding method, because the invertible flow-based model used to perform forward transform processing on the to-be-encoded data includes the target invertible flow layer, not only the target invertible flow layer includes the multiplication operation and the division operation that are determined based on the model parameter, but the model parameter of the target invertible flow layer can further constrain the auxiliary variable generated in the forward transform processing process. The auxiliary variable is the increment of the product of the multiplication operation or the remainder generated through the division operation. In other words, in this application, not only the multiplication operation can be used, but the invertibility can be implemented by using the auxiliary variable when the division operation is performed. Therefore, in comparison with an integer discrete flow model in the conventional technology, the model representation capability is improved. This helps improve the estimation accuracy of the model probability distribution, and can further improve the compression efficiency of the lossless compression.

For the data decoding method, the data processing apparatus performs inverse transform processing on the decoded hidden variable, and the invertible flow-based model used to perform inverse transform processing includes the target invertible flow layer. Not only the target invertible flow layer includes the multiplication operation and the division operation that are determined based on the model parameter, but the model parameter of the target invertible flow layer can further constrain the auxiliary variable generated in the inverse transform processing process. The auxiliary variable is the increment of the product of the multiplication operation or the remainder generated through the division operation. In other words, in this application, for the multiplication operation in the forward transform processing process, the division operation can be performed by using the auxiliary variable, to restore the hidden variable to data (that is, the to-be-encoded data in the foregoing data encoding method) before the forward transform processing. Therefore, not only the invertible operation of transform processing can be ensured, but the model representation capability can be improved. This helps improve the estimation accuracy of the model probability distribution, and can further improve the compression efficiency of the lossless compression.

BRIEF DESCRIPTION OF DRAWINGS

To describe the technical solutions in embodiments of this application more clearly, the following briefly describes the accompanying drawings for describing embodiments. It is clear that the accompanying drawings in the following descriptions show merely some embodiments of this application.

Figure 10A:
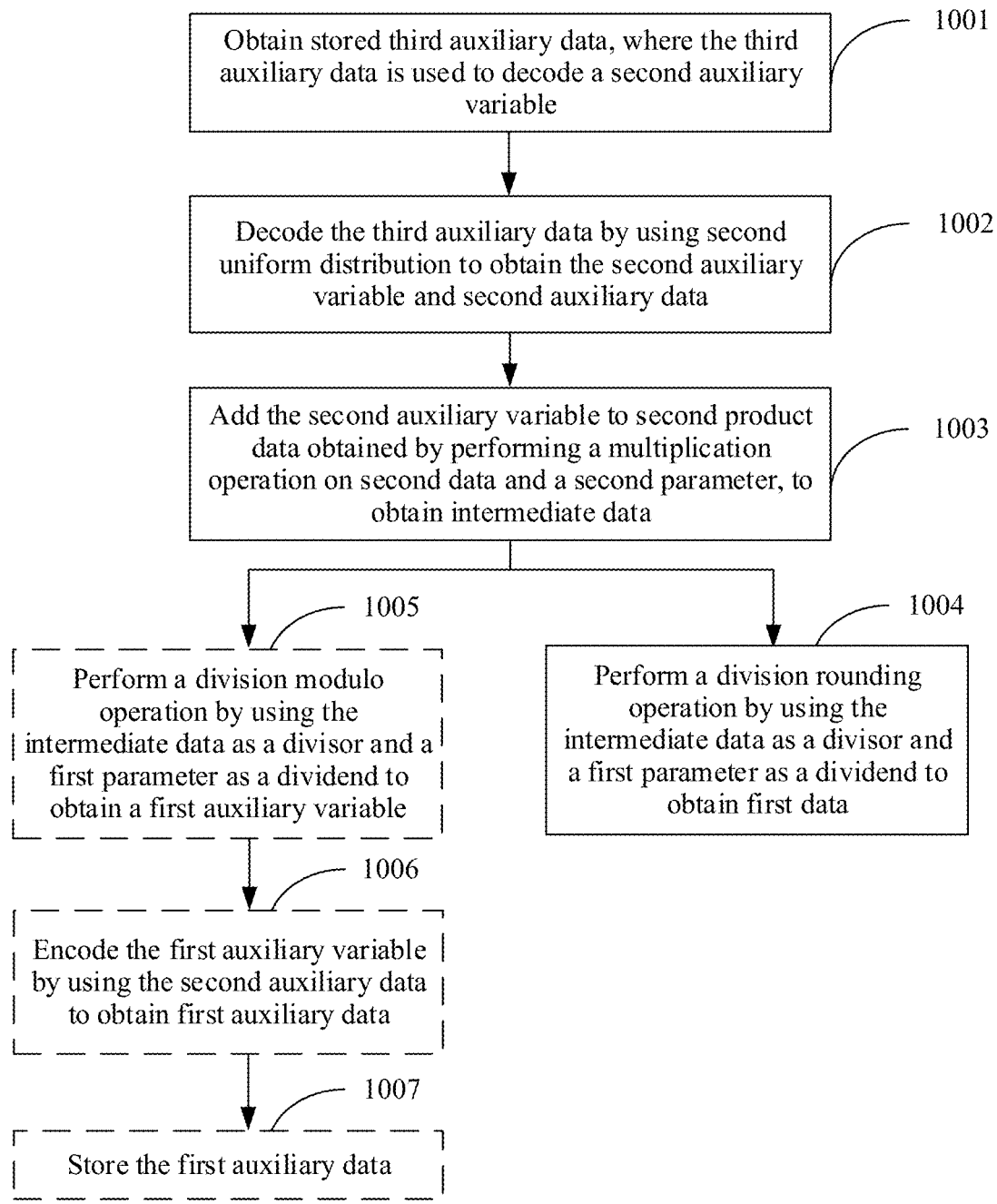
Figure 10B:
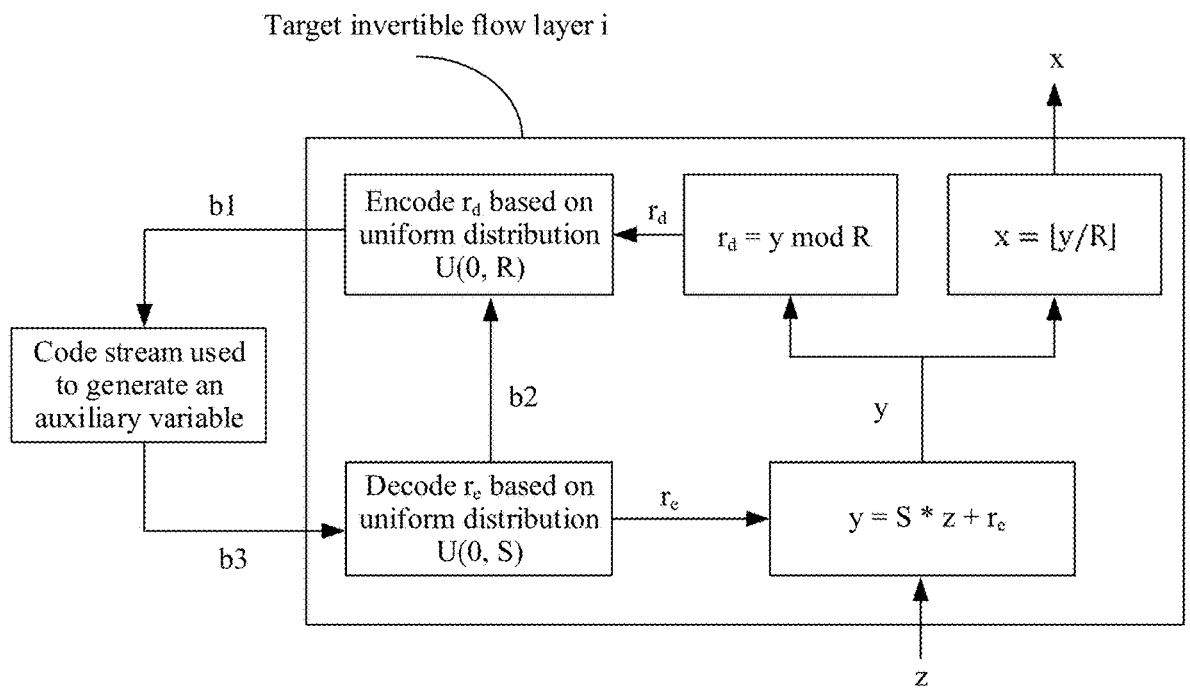
Figure 11:
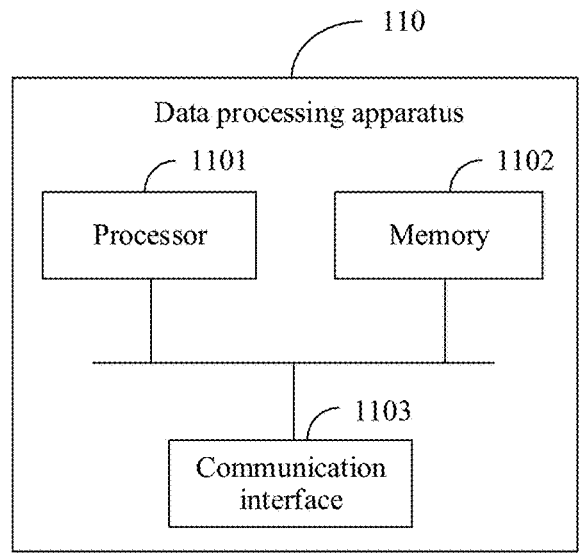
Figure 12:
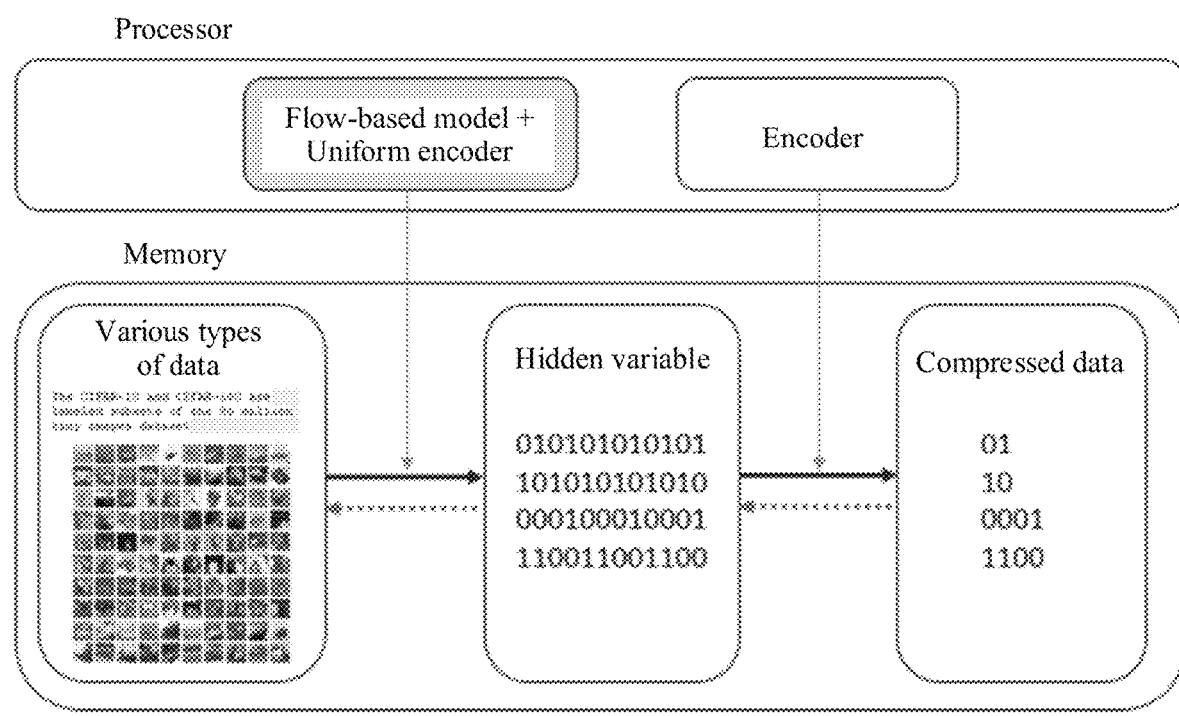
Figure 13:
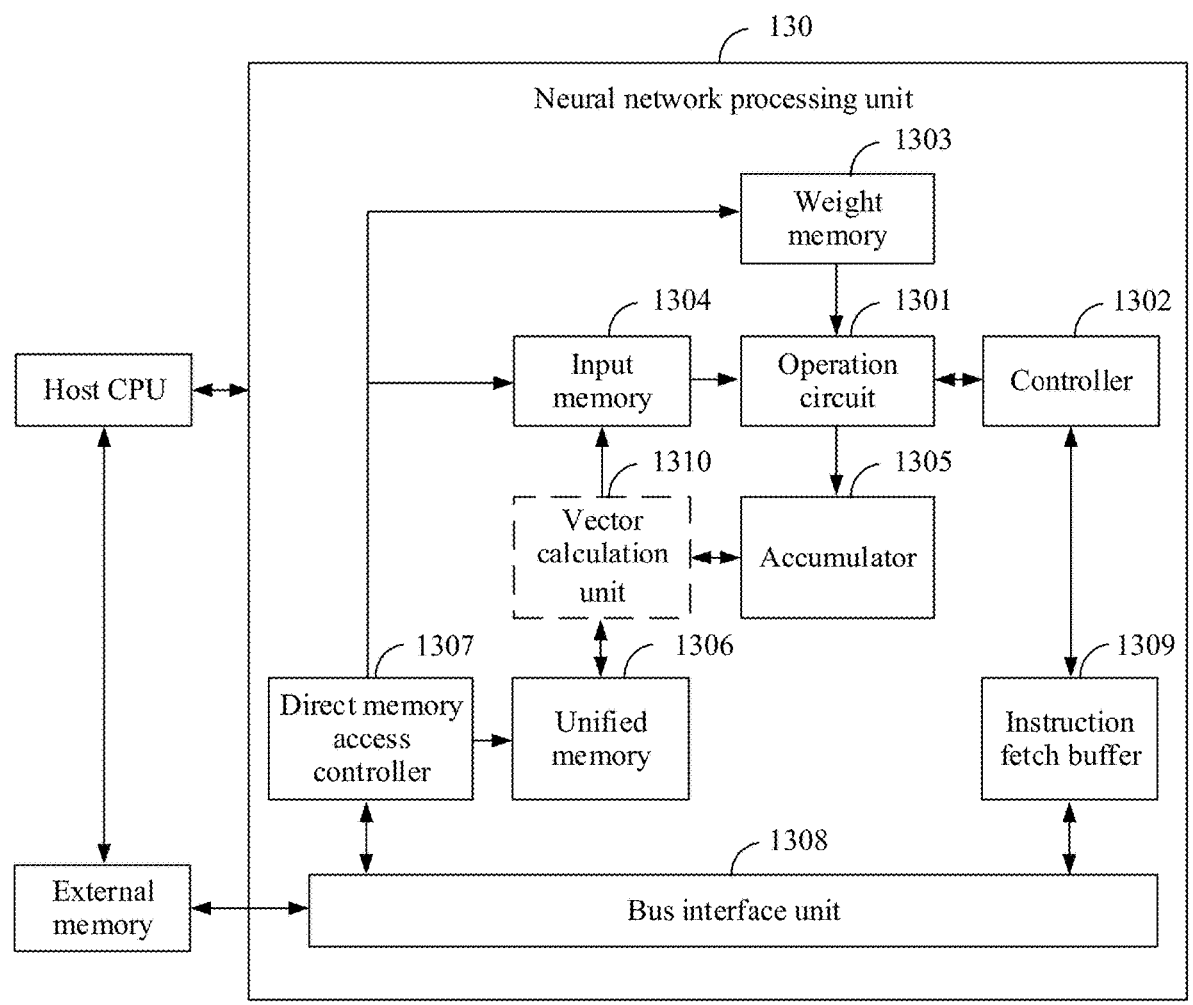
Figure 14:
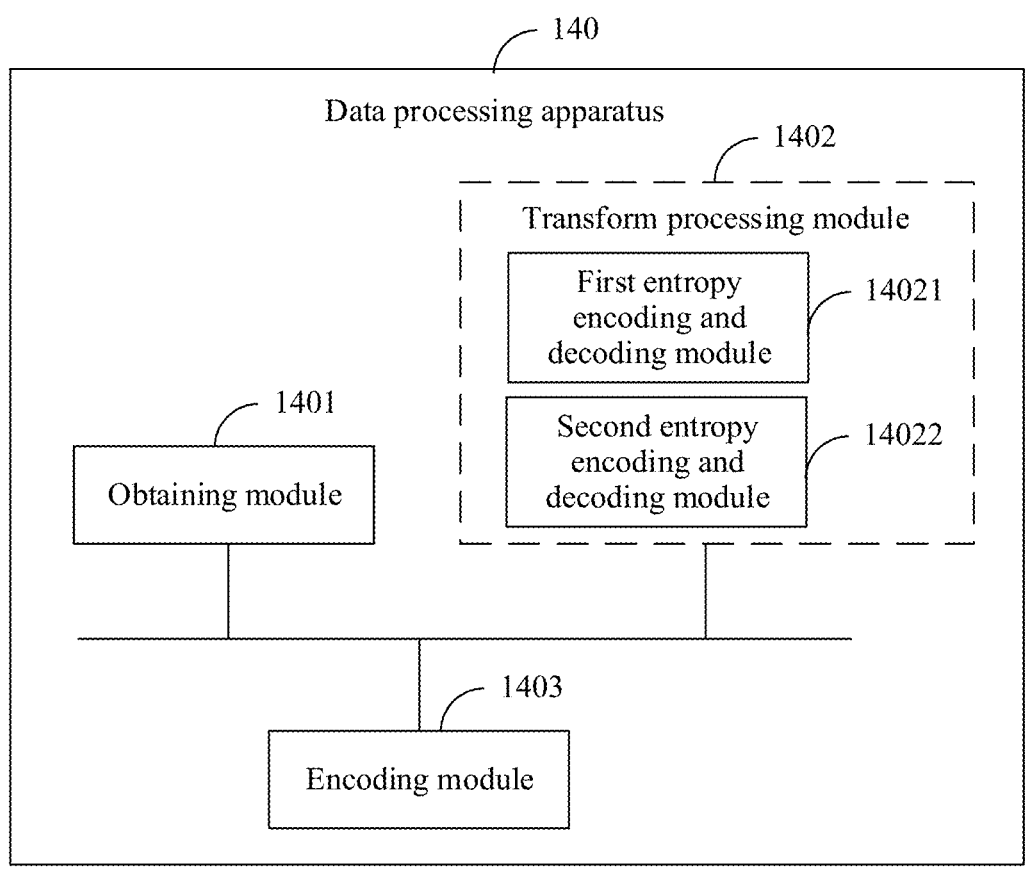
Figure 15:
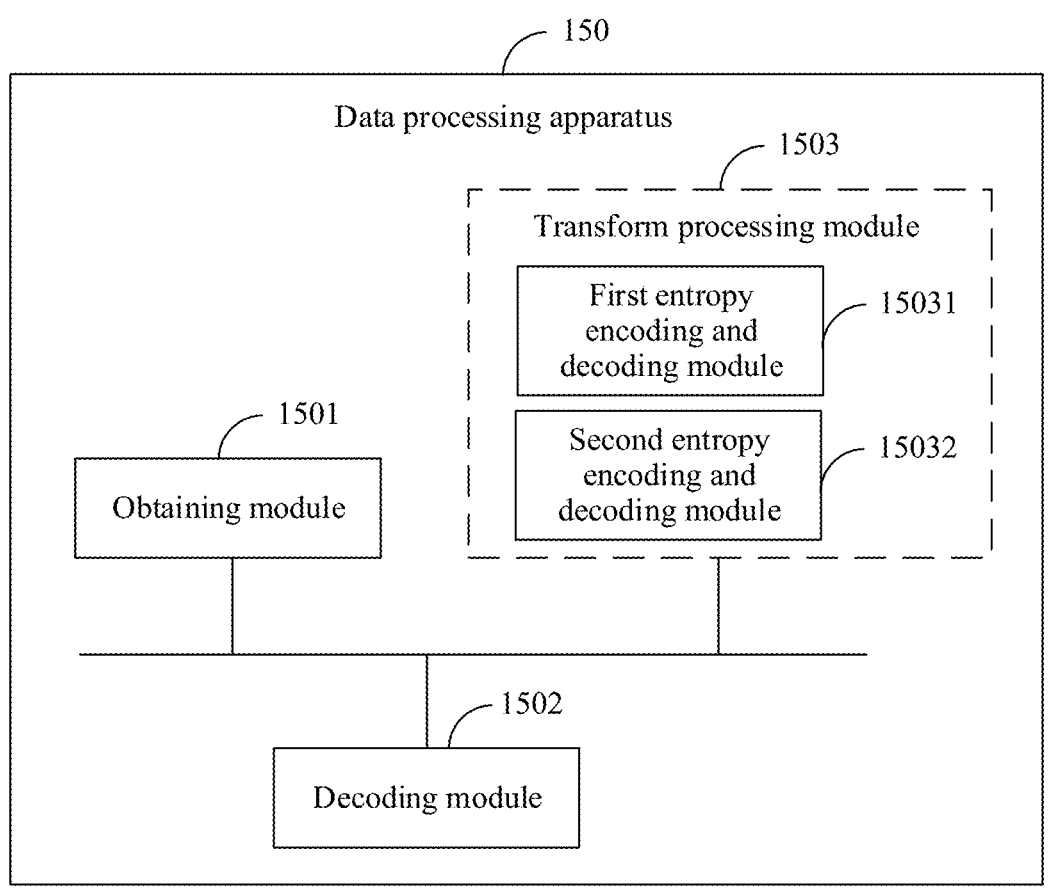

FIG. TOA is another flowchart of a target invertible flow layer when inverse transform is performed according to this application;

FIG. 10B is an example diagram of a target invertible flow layer when inverse transform is performed according to this application;

FIG. 11 is a schematic diagram of an embodiment of a data processing apparatus according to this application;

FIG. 12 is a schematic diagram of another embodiment of a data processing apparatus according to this application;

FIG. 13 is a schematic diagram of another embodiment of a data processing apparatus according to this application;

FIG. 14 is a schematic diagram of an embodiment in which a data processing apparatus is used as an encoder side according to this application; and FIG. 15 is a schematic diagram of an embodiment in which a data processing apparatus is used as a decoder side according to this application.

DESCRIPTION OF EMBODIMENTS

The following clearly and describes the technical solutions in embodiments of this application with reference to the accompanying drawings in embodiments of this application. It is clear that the described embodiments are merely some but not all of embodiments of this application.

In this application, terms such as "first", "second", "third", and "fourth" (if exists) in the specification, the claims, and the accompanying drawings are intended to distinguish between similar objects but do not necessarily indicate an order or sequence. It should be understood that the terms used in such a way are interchangeable in proper circumstances, so that embodiments described herein can be implemented in an order other than the order illustrated or described herein. Moreover, the terms "include", "have", and any other variants mean to cover the non-exclusive inclusion, for example, a process, method, system, product, or device that includes a list of operations or units is not necessarily limited to those operations or units, but may include other operations or units not expressly listed or inherent to such a process, method, product, or device.

Figure 1:
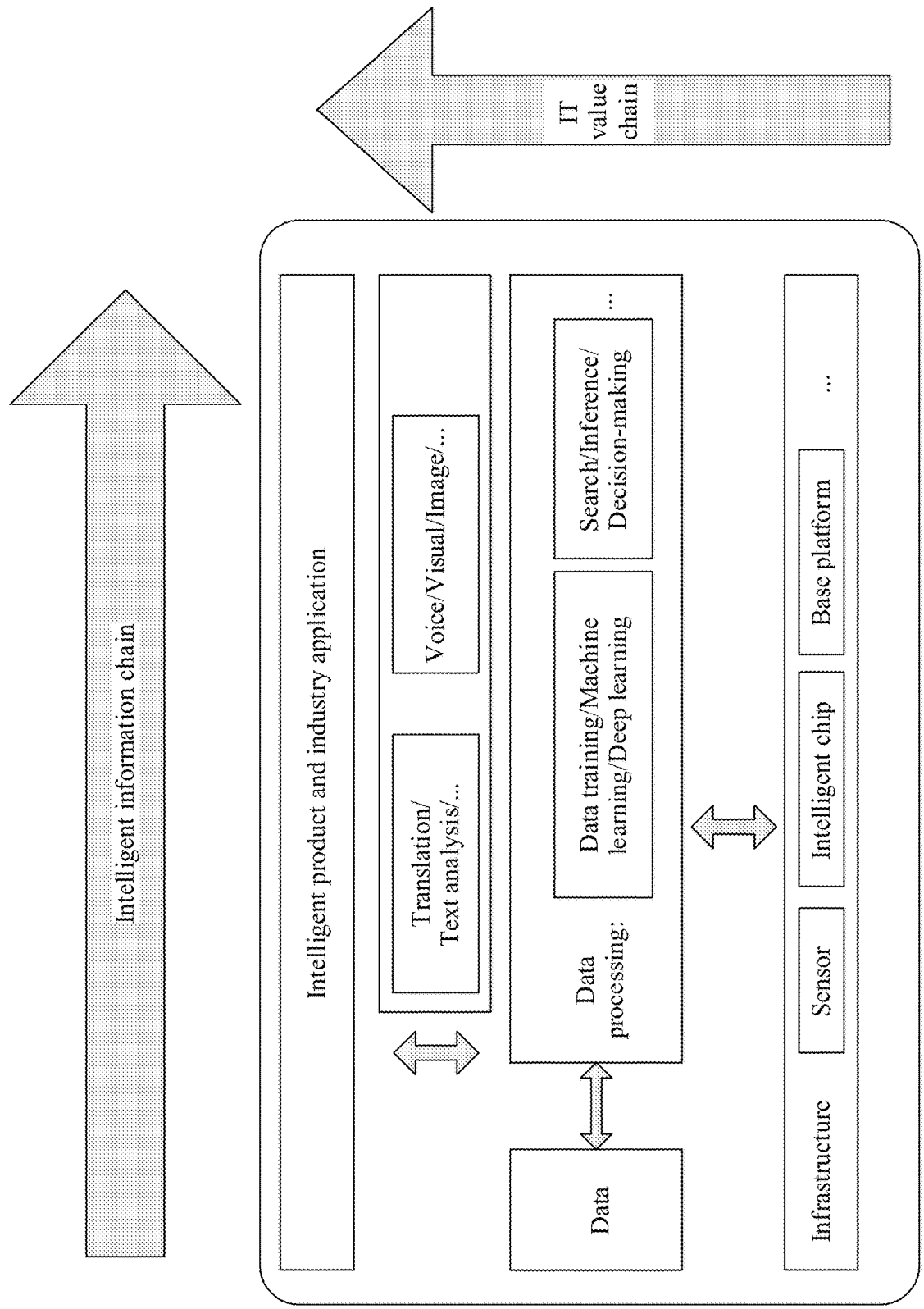
FIG. 1 is a schematic diagram of a structure of an artificial intelligence main framework according to this application.

A data encoding method and a data decoding method provided in this application may be applied to the field of artificial intelligence AI and the field of storage related to artificial intelligence AI. FIG. 1 is a schematic diagram of a structure of an artificial intelligence main framework. The following describes the artificial intelligence main framework from two dimensions: an "intelligent information chain" (a horizontal axis) and an "IT value chain" (a vertical axis). The "intelligent information chain" reflects a series of processes from obtaining data to processing the data. For example, the processing process may be a general process of intelligent information perception, intelligent information representation and formation, intelligent inference, intelligent decision-making, and intelligent execution and output. In the process, data undergoes a condensation process of "data-information-knowledge-wisdom". In addition, the "IT value chain" reflects a value brought by artificial intelligence to the information technology industry in a process from an underlying infrastructure and information (providing and processing technology implementation) of human intelligence to a systemic industrial ecology.

The following separately describes parts in the main framework.

(1) Infrastructure

The infrastructure is used to: provide computing capability support for the artificial intelligence system, implement communication with the external world, and implement support by using a base platform. The infrastructure may be a processing circuit or an intelligent chip that has a computing capability. For example, the intelligent chip includes a hardware acceleration chip such as a central processing unit (CPU), a neural network processing unit (neural network processing unit, NPU), a graphics processing unit (GPU), an application-specific integrated circuit (ASIC), or a field programmable gate array (FPGA). In addition, the infrastructure may alternatively be a basic platform that provides a cloud computing or cloud storage function. The basic platform includes related platforms, for example, a distributed computing framework and a network, for assurance and support, including cloud storage and computing, an interconnection network, and the like. For example, a sensor communicates with the outside to obtain data, and the data is provided for an intelligent chip in a distributed computing system for computation, where the distributed computing system is provided by the base platform.

(2) Data

Data at an upper layer of the infrastructure indicates a data source in the field of artificial intelligence. The data relates to a graph, an image, a voice, and text, further relates to Internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolized and formalized intelligent information modeling, extraction, preprocessing, training, and the like on data.

Inference is a process in which a pattern of human intelligent inference is simulated in a computer or an intelligent system, and machine thinking and problem resolving are performed by using formalized information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may further be formed based on a data processing result. For example, the general capabilities may further be an algorithm or a general system, such as translation, text analysis, computer vision processing, speech recognition, and image recognition.

(5) Intelligent Product and Industry Application

Intelligent products and industry applications are products and applications of the artificial intelligence system in various fields, and are encapsulation for an overall solution of artificial intelligence, to productize intelligent information decision-making and implement applications. Application fields thereof mainly include an intelligent terminal, intelligent manufacturing, intelligent transportation, intelligent home, intelligent healthcare, intelligent security protection, autonomous driving, a safe city, and the like.

The data encoding method and the data decoding method provided in this application may be applied to a scenario in which lossless compression needs to be implemented in the various application fields. The data encoding method and the data decoding method may be applied to a lossless compression scenario of data such as an image, a video, and a text.

Figure 2:
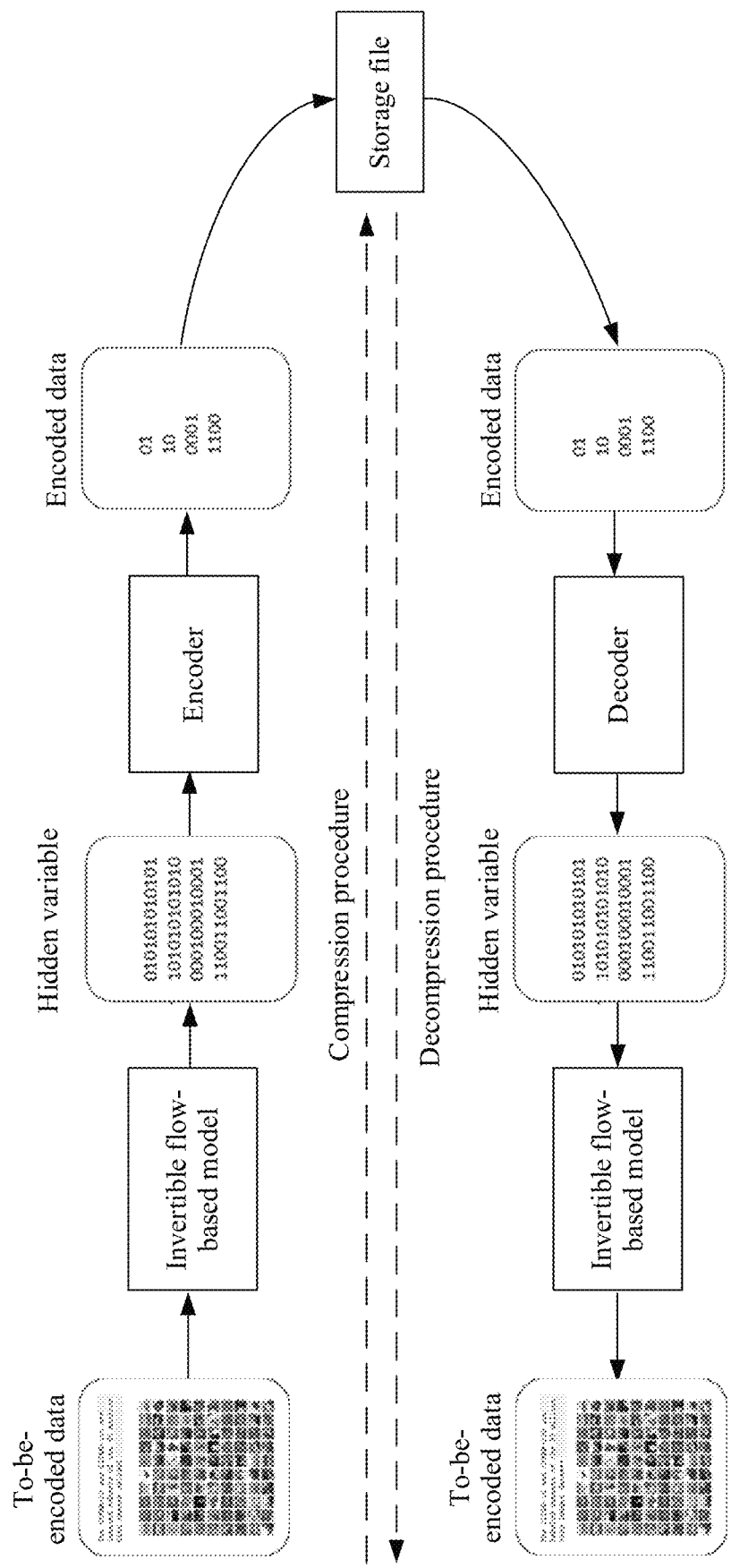
FIG. 2 is a schematic principle diagram of a compression procedure and a decompression procedure according to this application.

For ease of understanding, an application scenario of this application is described by using FIG. 2 as an example. As shown in FIG. 2, a data processing apparatus may obtain to-be-encoded data. The to-be-encoded data may be a pre-processed file or an original file of data such as an image, a video, or a text. For ease of understanding, an example in which the to-be-encoded data is a to-be-compressed and stored image (a to-be-compressed image for short hereinafter) is used for description. The to-be-compressed image may be a photo shot by a camera or a frame of picture captured from a video. The data processing apparatus may process the obtained to-be-compressed image by using an invertible flow-based model, transform image data into a hidden variable, and generate probability estimates of points in the hidden variable. An encoder may encode, by using the probability estimates of the points in the hidden variable, the hidden variable obtained through extraction, to reduce coding redundancy of the hidden variable, and further reduce a data transmission amount in an image compression process; and store, in a corresponding storage location in a form of a data file, the encoded data obtained through encoding. When a user needs to obtain the file stored in the storage location, the data processing apparatus may obtain and load the stored file at the corresponding storage location, and perform inverse transform processing on the hidden variable by using the invertible flow-based model based on the decoded hidden variable obtained by a decoder, to obtain a reconstructed image (that is, a decoded output) obtained through the inverse transform processing.

It should be understood that the data processing apparatus in this application may be a terminal device or a server. The terminal device may be a mobile phone, a tablet computer, a notebook computer, an intelligent wearable device, or the like, and the terminal device may perform compression processing on obtained data (for example, image data, video data, or text data). For example, the terminal device may be a virtual reality (VR) device or an augmented reality (AR) device. It should be understood that this embodiment of this application may be further applied to another scenario in which data compression needs to be performed. Details are not described herein again. In this embodiment and subsequent embodiments, the term, that is, the data processing apparatus, is used for description.

Based on the foregoing application scenario, the following first separately describes main procedures of the data encoding method and the data decoding method, and then separately describes change processing processes performed by the invertible flow-based model, in the data encoding method and the data decoding method, on data.

Figure 3:
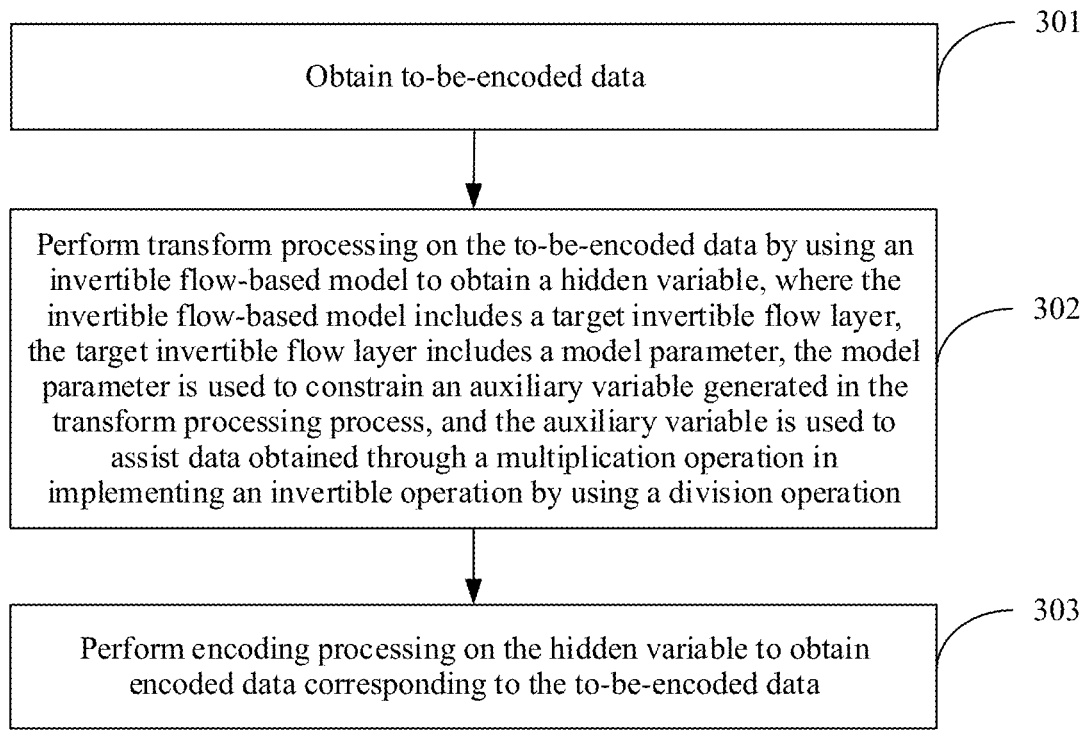
FIG. 3 is a flowchart of a data encoding method according to this application.

The following describes the procedure of the data encoding method provided in this application with reference to FIG. 3. In this case, the foregoing data processing apparatus is used as an encoder side to perform the following operations.

Operation 301: Obtain to-be-encoded data.

The to-be-encoded data refers to uncompressed and unencoded data. The to-be-encoded data may be integer data, or may be fixed-point number data (also referred to as floating-point number data).

In a possible implementation, the to-be-encoded data may be original data such as an image, a video, or a text. In this case, the to-be-encoded data is usually the integer data. For example, if the to-be-encoded data is image data, the to-be-encoded data may be an image shot by a terminal device by using a camera, or may be an image obtained from inside the terminal device (for example, an image stored in an album of the terminal device, or an image obtained by the terminal device from a cloud). It should be understood that the foregoing image may be an image that has an image compression requirement, and a source of the to-be-processed image is not limited in this application.

In another possible implementation, the to-be-encoded data may be data obtained after preprocessing is performed based on original data such as an image, a video, or a text. In this case, the to-be-encoded data may be a fixed-point number with precision. For example, after obtaining the original data, the data processing apparatus may perform bits-back encoding processing on the original data by using noise data to obtain the to-be-encoded data. In this case, the to-be-encoded data is fixed-point number data with first preset precision.

For example, if probability distribution of the noise data is given (for example, probability distribution of noise data u is q(u|x) δ, and u∈[0, 1), where $\delta=2^{-k}$, and k represents precision of a fixed-point number), the data processing apparatus may decode the noise data by using a bits-back encoding technology based on the probability distribution of the noise data, to obtain the decoded noise data u. The decoded noise data u is the fixed-point number data with first preset precision (for example, the first preset precision is the precision k). The data processing apparatus sums the original data and the decoded noise data (that is, calculate $\bar{x}=x+u$, where x is the original data, and u is the decoded noise data), to obtain to-be-encoded data $\bar{x}$. The to-be-encoded data is the fixed-point number data with first preset precision.

It should be understood that the noise data may be a bit stream of compressed data in the data processing apparatus, or may be a bit stream prestored in the data processing apparatus. This is not limited herein. In this implementation, because bits-back encoding processing is performed on the original data by using the noise data, a value of data calculated by the data processing apparatus can be increased. This helps improve processing precision in a subsequent transform process, and also helps improve a compression ratio.

It should be noted that, if the to-be-encoded data is video data, and a size of a video does not match an input size of a model, the video needs to be segmented into several video blocks, and an input size of each block is the same as the input size of the model (invertible flow-based model). If a length of the video is greater than a length required by the model, the video is segmented into a plurality of video inputs. If the length of the video or the input size is insufficient, the input size or the length may be obtained by filling a color block of a color.

It should be noted that, if the to-be-encoded data is text data, a word vector needs to be constructed to represent a character or a word in the text. In other words, in a compression process, the text needs to be converted into the vector first. For example, it is assumed that input data w (a word or a character), and a corresponding word vector is represented as a d-dimensional vector x=μ(w). Probability distribution p(x|w)=N(μ(w), σ²(w)) δ ($\delta=2^{-dk}$), and p(w|x)=

$$p(w|x) = \frac{p(w)p(x|w)}{\Sigma_{w'} p(w')p(x|w')}$$

(p(w) is a priori of w, and is generally word frequency of w) are constructed. In a data preprocessing process, the input w is given, x is decoded by using p(x|w), and encoding is performed by using p(w|x), to obtain the to-be-encoded data.

Operation 302: Perform forward transform processing on the to-be-encoded data by using the invertible flow-based model to obtain a hidden variable, where the invertible flow-based model includes a target invertible flow layer, the target invertible flow layer includes a model parameter, the model parameter is used to constrain an auxiliary variable generated in the forward transform processing process, an operation corresponding to the target invertible flow layer includes a multiplication operation and a division operation that are determined based on the model parameter, and the auxiliary variable is an increment of a product of the multiplication operation or a remainder generated through the division operation.

The invertible flow-based model is a new flow-based model proposed in this application. The target invertible flow layer is a layer to the invertible flow-based model proposed in this application. Because the target invertible flow layer can implement an invertible operation, the invertible operation can be implemented by the invertible flow-based model that includes the target invertible flow layer and/or a transformation layer at the target invertible flow layer.

In this embodiment, the invertible flow-based model includes a plurality of invertible flow layers, and the plurality of invertible flow layers sequentially process the data in a serial arrangement manner. The target invertible flow layer may be one of the plurality of invertible flow layers, or may be a component of one of the plurality of invertible flow layers. The following separately describes the two scenarios.

In a possible implementation, the target invertible flow layer is the one of the plurality of invertible flow layers in the invertible flow-based model. The invertible flow-based model may include N invertible flow layers, the N invertible flow layers include the target invertible flow layer, and N is an integer greater than or equal to 1. Optionally, when the current N invertible flow layers include at least two invertible flow layers, the N invertible flow layers may be arranged in the serial manner.

Figure 4A:
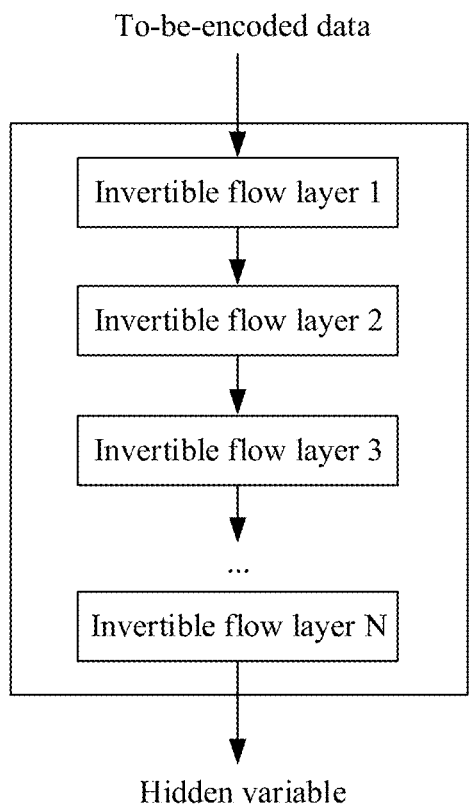
FIG. 4A is a schematic diagram of a structure of an invertible flow-based model according to this application.

For example, as shown in FIG. 4A, the invertible flow-based model includes N serial invertible flow layers, and N is an integer greater than 1. An output at an $(i-1)^{th}$ invertible flow layer is used as an input at an $i^{th}$ invertible flow layer, and an output at the $i^{th}$ invertible flow layer is used as an input at an $(i+1)^{th}$ invertible flow layer, where i is a positive integer greater than or equal to 1 and not greater than N. For example, an input at a first invertible flow layer (that is, an invertible flow layer 1) is the to-be-encoded data. An output at the first invertible flow layer (that is, the invertible flow layer 1) is used as an input at a second invertible flow layer (that is, an invertible flow layer 2). An output at the second invertible flow layer (that is, the invertible flow layer 2) is used as an input at a third invertible flow layer (that is, an invertible flow layer 3). The rest may be deduced by analogy. An output at an $N^{th}$ invertible flow layer (that is, an invertible flow layer N) is the hidden variable. The N serial invertible flow layers include the target invertible flow layer. In the example shown in FIG. 4A, the target invertible flow layer may be one of the N invertible flow layers in FIG. 4A.

For example, the invertible flow layer 2 is the target invertible flow layer. It is clear that the N invertible flow layers may include a plurality of target invertible flow layers. For example, the invertible flow layer 2, an invertible flow layer 4, and an invertible flow layer 6 are all target invertible flow layers. In other words, the N invertible flow layers include three target invertible flow layers.

In another possible implementation, the target invertible flow layer is the component of the one of the plurality of invertible flow layers in the invertible flow-based model. For example, the target invertible flow layer may be a component of an invertible flow layer in FIG. 4A. In this case, in addition to the target invertible flow layer, the invertible flow layer in the invertible flow-based model may further include another model and/or operator, to form the transformation layer at the target invertible flow layer. The transformation layer at the target invertible flow layer may be an invertible convolutional layer or a coupling layer. In this case, in addition to the target invertible flow layer, the invertible flow-based model further includes the invertible convolutional layer and/or the coupling layer. Specific structures of the invertible convolutional layer and the coupling layer are described in the following figures. Details are not described herein.

Figure 4B:
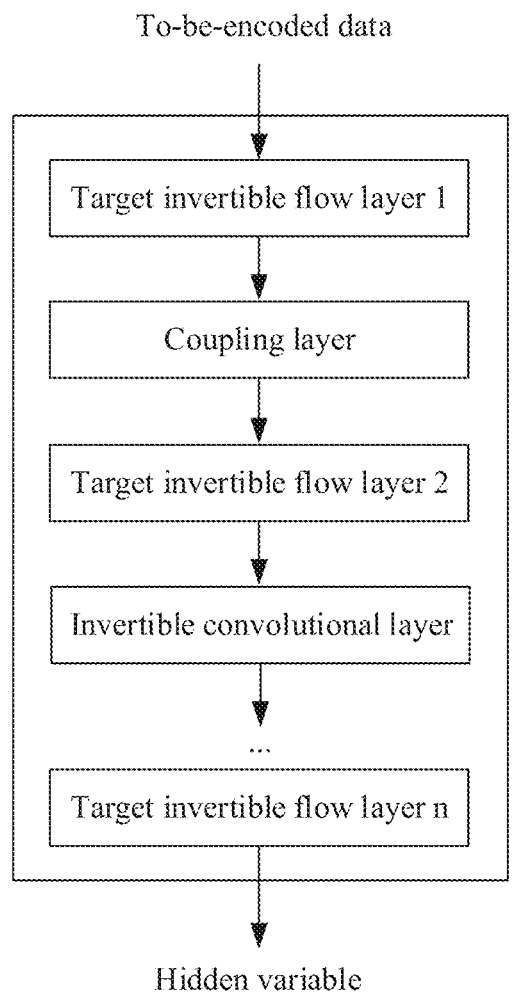
FIG. 4B is a schematic diagram of another structure of an invertible flow-based model according to this application.

It should be understood that different types of invertible flow layers (that is, the target invertible flow layer, the invertible convolutional layer, and the coupling layer) described above may be combined and stacked to improve a transform processing capability of the invertible flow-based model. The invertible flow-based model may include at least one target invertible flow layer, at least one invertible convolutional layer, and at least one coupling layer. For example, the invertible flow-based model may be constructed in a manner in which the target invertible flow layer is separately staggered and stacked with the coupling layer and the invertible convolutional layer. FIG. 4B is used as an example. The invertible flow-based model includes the target invertible flow layer, the coupling layer, and the invertible convolutional layer. The to-be-encoded data is used as an input at a target invertible flow layer 1. An output at the target invertible flow layer 1 is used as an input at the coupling layer. An output at the coupling layer is used as an input at a target invertible flow layer 2. An output at the target invertible flow layer 2 is used as an input at the invertible convolutional layer. The rest may be deduced by analogy. The hidden variable is output through processing by a target invertible flow layer n.

It should be understood that FIG. 4B is merely an example of stacking a plurality of invertible flow layers. In actual application, a stacking sequence of the invertible flow layers may be adjusted based on an actual requirement. The stacking sequence of the invertible flow layers is not limited in this application, and examples are not described herein one by one.

In this embodiment, the target invertible flow layer is used to implement an invertible operation between data (referred to as first data hereinafter for ease of description) input to the target invertible flow layer and data (referred to as second data hereinafter for ease of description) output by the target invertible flow layer. The first data is the to-be-encoded data or data output through processing by at least one invertible flow layer (for example, n invertible flow layers at the N invertible flow layers, where n is an integer greater than 1 and less than N). The second data is the hidden variable, or data output by processing the second data by the at least one invertible flow layer is the hidden variable.

Invertibility means that data obtained through the forward transform processing can be restored to data obtained before the forward transform processing under action of inverse transform processing. It may also be understood that the data that is obtained through the forward transform processing and that is output through the inverse transform processing is consistent with the data obtained before the forward transform processing. For example, the second data is obtained after forward transform processing by the target invertible flow layer is performed on the first data, and the second data is restored to the first data after inverse transform processing by the target invertible flow layer is performed on the second data. In addition, the invertible operation refers to an operation related to the transform process. The operation may not only obtain output data by using input data, but deduce the input data by using the output data. For example, it is assumed that the input data is x, the output data is z, and a forward operation is $z=f(x)$. x may be restored from the output data z by using the invertible operation (for example, $x=f^{-1}(z)$). The target invertible flow layer involves at least multiplication and division operations in the transform processing process.

Further, the target invertible flow layer includes the model parameter, and the model parameter is used to constrain the auxiliary variable generated in the forward transform processing process. In other words, the target invertible flow layer can generate the auxiliary variable based on the model parameter, and the auxiliary variable is used to assist data obtained through the multiplication operation in implementing the invertible operation by using the division operation. Because calculation principles of multiplication and division operation processes of a computer are different from calculation principles of multiplication and division operation processes of a mathematical theory, the data obtained through the multiplication operation may not be restored by using the division operation. For example, if a product can be obtained after the multiplication operation is performed on data and a coefficient (or a parameter), a quotient obtained by performing the division operation on the product and the coefficient is not necessarily the data. However, in this application, the auxiliary variable generated by the target invertible flow layer can assist the data, in implementing invertibility by using the division operation, obtained through the multiplication operation. Specifically, detailed descriptions are provided in the following.

It should be understood that the auxiliary variable being constrained by the model parameter of the target invertible flow layer means that a value range of the auxiliary variable is constrained by a value range of the model parameter. The model parameter may be a preset parameter, may be a parameter generated based on a neural network, or may be a parameter determined by the invertible flow-based model based on another algorithm (for example, an interpolation algorithm or a binary search algorithm). This is not limited herein.

The target invertible flow layer is used to perform forward transform processing on the first data input to the target invertible flow layer to obtain the second data output from the target invertible flow layer. The first data is a multiplier of the multiplication operation, and the second data is an integer quotient of the division operation. In other words, in the forward transform processing process, in the multiplication operation determined based on the model parameter, the first data is used as the multiplier of the multiplication operation, and another multiplier of the multiplication operation is determined by using the model parameter. Because the auxiliary variable may be used as the increment of the product of the multiplication operation, intermediate data may be obtained based on the auxiliary variable plus a product of the first data and the another multiplier. In the division operation determined based on the model parameter, the second data is used as the integer quotient of the division operation, a divisor of the division operation is the intermediate data, and a dividend is determined by using the model parameter. Therefore, after the first data is input to the target invertible flow layer, the second data is output after operation processing such as the multiplication operation and the division operation is performed on the first data, and the second data is an output at the target invertible flow layer. Specifically, refer to the following embodiments corresponding to FIG. 7 and FIG. 8A.

In this embodiment, after the data processing apparatus transforms the to-be-encoded data into the hidden variable by using the invertible flow-based model, the data processing apparatus performs operation 303.

Operation 303: Perform encoding processing on the hidden variable to obtain encoded data corresponding to the to-be-encoded data.

In this embodiment, the hidden variable z may be represented by using probability distribution $p_Z(z)$, and the hidden variable z may be encoded based on the probability distribution $p_Z(z)$, to obtain the encoded data. Optionally, a process of performing encoding processing on the hidden variable may be an entropy coding process, and an existing entropy coding technology may be used in the entropy coding process. Details are not described again in this application.

In this embodiment, after the encoded data is obtained, the encoded data may be sent to a device configured to perform decompression. In this case, the device configured to perform decompression may decompress (or referred to as decoding) the data. Alternatively, a terminal device configured to perform compression may store the encoded data in a storage device. When it is needed, the terminal device may obtain the encoded data from the storage device, and may decompress the encoded data.

In this embodiment, because the invertible flow-based model used to perform forward transform processing on the to-be-encoded data includes the target invertible flow layer, not only the target invertible flow layer includes the multiplication operation and the division operation that are determined based on the model parameter, but the model parameter of the target invertible flow layer can further constrain the auxiliary variable generated in the forward transform processing process. The auxiliary variable is the increment of the product of the multiplication operation or the remainder generated through the division operation. In other words, in this application, not only the multiplication operation can be used, but the invertibility can be implemented by using the auxiliary variable when the division operation is performed. Therefore, in comparison with an integer discrete flow model in the conventional technology, a model representation capability is improved. This helps improve estimation accuracy of model probability distribution, and can further improve compression efficiency of lossless compression.

Figure 5:
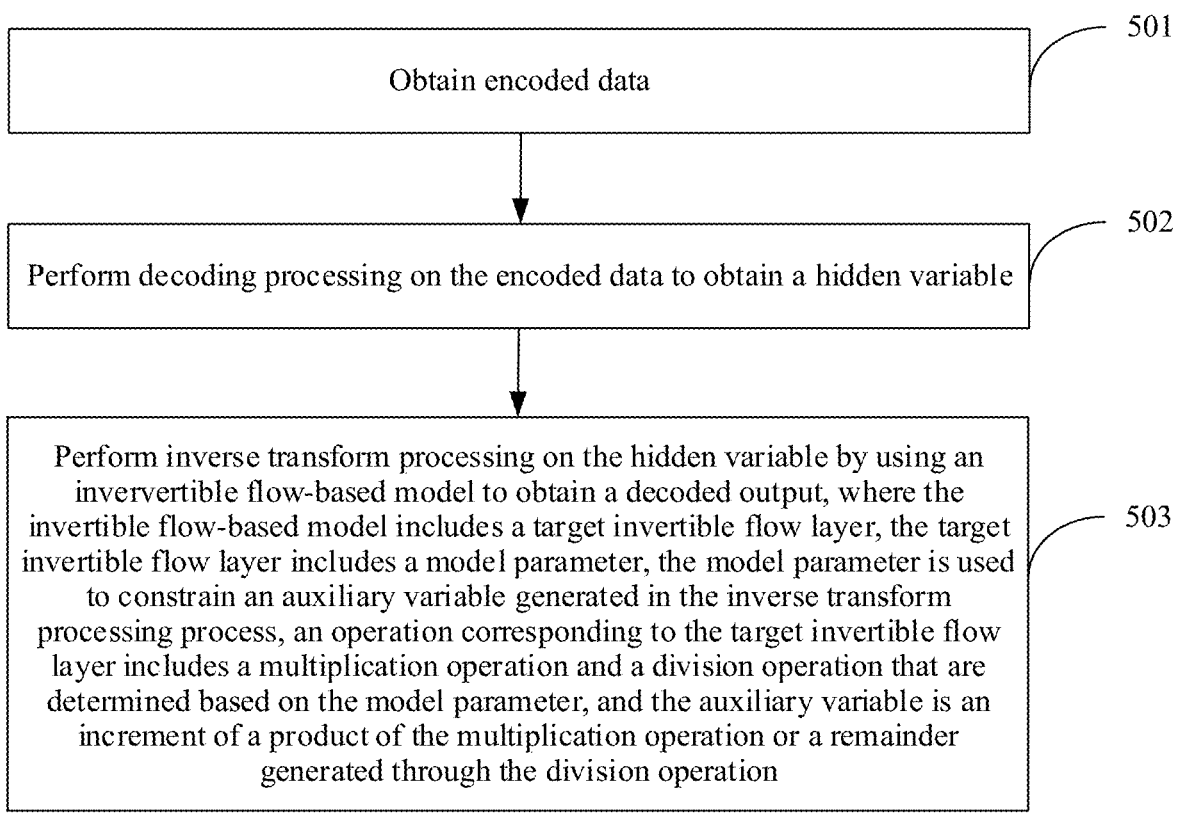
FIG. 5 is a flowchart of a data decoding method according to this application.

The following describes the procedure of the data decoding method provided in this application with reference to FIG. 5. In this case, the foregoing data processing apparatus is used as a decoder side to perform the following operations.

Operation 501: Obtain encoded data.

The encoded data refers to data obtained by using the data encoding method described in the embodiment corresponding to FIG. 3. The encoded data may be integer data.

In this embodiment, if the data processing apparatus needs to obtain uncompressed data, (that is, the to-be-encoded data described in the foregoing embodiment), the data processing apparatus may first obtain the encoded data, and then perform corresponding decoding processing based on the encoded data.

In a possible implementation, the data processing apparatus in the embodiment corresponding to FIG. 3 and the data processing apparatus in the embodiment corresponding to FIG. 5 are located in a same device. Alternatively, the data processing apparatus in the embodiment corresponding to FIG. 3 and the data processing apparatus in the embodiment corresponding to FIG. 5 are a same device. For example, the data processing apparatus is a terminal device with a storage function. The terminal device performs compression and encoding on the to-be-encoded data according to the method in the embodiment corresponding to FIG. 3, and stores the obtained encoded data in a memory. When the to-be-encoded data needs to be used, the terminal device reads the encoded data from the memory, and decompresses the encoded data according to the method in the embodiment corresponding to FIG. 5.

In another possible implementation, the data processing apparatus in the embodiment corresponding to FIG. 3 and the data processing apparatus in the embodiment corresponding to FIG. 5 are located in different devices. Alternatively, the data processing apparatus in the embodiment corresponding to FIG. 3 and the data processing apparatus in the embodiment corresponding to FIG. 5 are different devices. For example, in a scenario in which compressed data needs to be transmitted, a transmitting end sends the encoded data to a receiving end according to the method in the embodiment corresponding to FIG. 3, and the receiving end decodes the encoded data according to the method in the embodiment corresponding to FIG. 5, to obtain the uncompressed data.

It should be noted that whether the encoder side and the decoder side are located in the same device is not limited in this application.

Operation 502: Perform decoding processing on the encoded data to obtain a hidden variable.

In this embodiment, the data processing apparatus may decode the encoded data to obtain the hidden variable. The encoded data may be decoded by using an entropy decoding technology in the conventional technology to obtain the reconstructed hidden variable.

Operation 503: Perform inverse transform processing on the hidden variable by using an invertible flow-based model to obtain a decoded output, where the invertible flow-based model includes a target invertible flow layer, the target invertible flow layer includes a model parameter, the model parameter is used to constrain an auxiliary variable generated in the inverse transform processing process, an operation corresponding to the target invertible flow layer includes a multiplication operation and a division operation that are determined based on the model parameter, and the auxiliary variable is an increment of a product of the multiplication operation or a remainder generated through the division operation.

The invertible flow-based model is a new flow-based model proposed in this application. The target invertible flow layer is a layer to the invertible flow-based model proposed in this application. The invertible flow-based model includes a plurality of invertible flow layers, and the plurality of invertible flow layers sequentially process the data in a serial arrangement manner. The target invertible flow layer may be one of the plurality of invertible flow layers, or may be a component of one of the plurality of invertible flow layers. Specifically, for a structure of the invertible flow-based model, refer to related descriptions corresponding to FIG. 4A and FIG. 4B. Details are not described herein again. It should be noted that the invertible flow-based model used by the data processing apparatus in the data encoding method corresponding to FIG. 3 is the same as the invertible flow-based model used in the data decoding method corresponding to FIG. 5. However, a sequence, in the data encoding method, in which the data flows through the invertible flow layers in the invertible flow-based model is opposite to a sequence, in the data decoding method, in which the data flows through the invertible flow layers in the invertible flow-based model. This may also be understood as: A sequence, in the inverse transform processing process, in which the data flows through the invertible flow layers is opposite to a sequence, in the forward transform process, in which the data flows through the invertible flow layers.

Figure 6A:
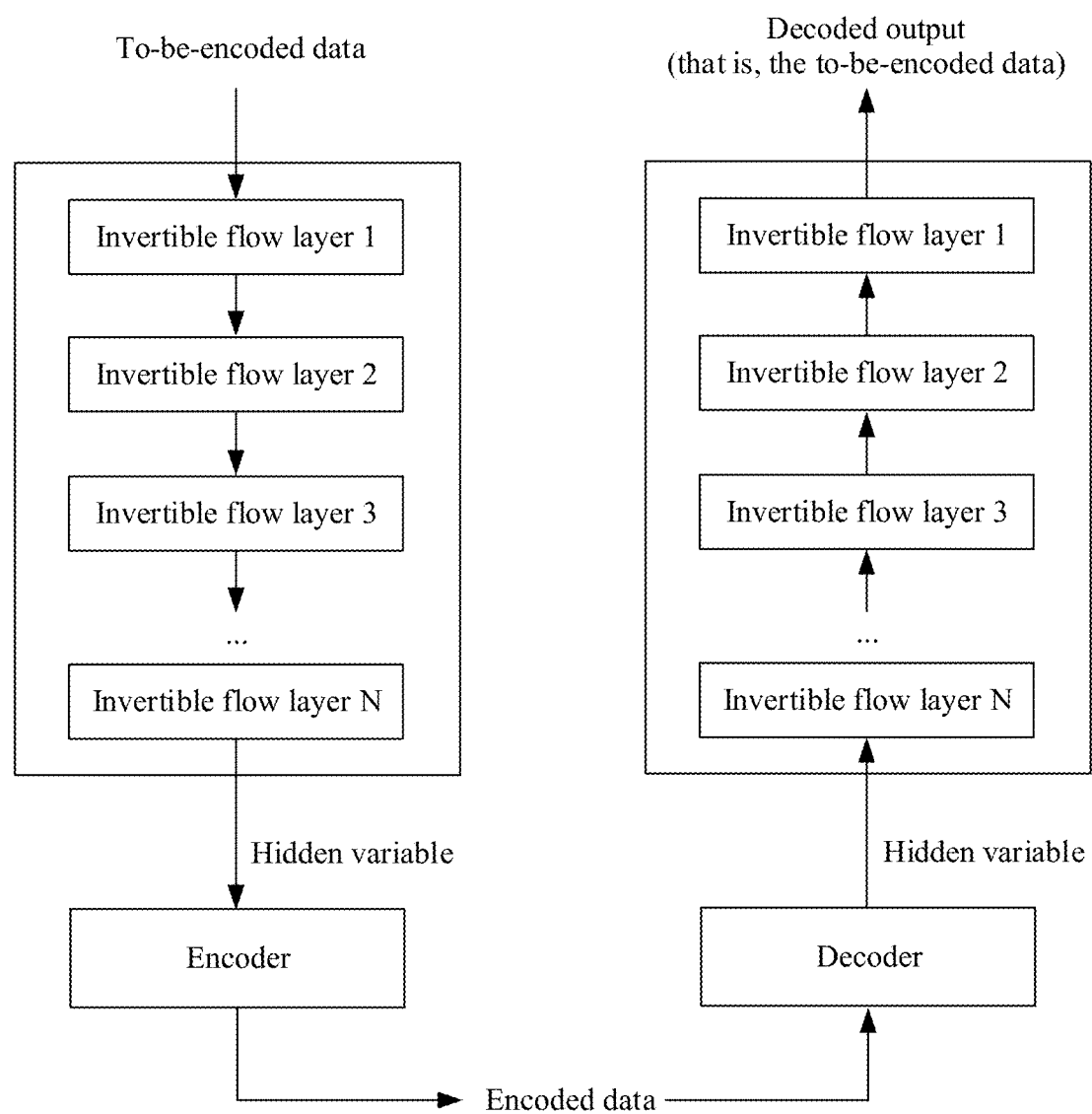
FIG. 6A is a schematic diagram of a structure of an invertible flow-based model according to this application.

For example, in the forward transform process, if a data processing sequence of the invertible flow layers in the invertible flow-based model is shown in FIG. 4A, in the inverse transform process, a data processing sequence of the invertible flow layers in the invertible flow-based model may be shown in FIG. 6A. The invertible flow-based model includes N serial invertible flow layers, and N is an integer greater than 1. If in the forward transform processing process, in a processing sequence on the left side of FIG. 6A, the data sequentially flows through an $(i-1)^{th}$ invertible flow layer, an $i^{th}$ invertible flow layer, and an $(i+1)^{th}$ invertible flow layer, in the inverse transform processing process, in the processing sequence on the right side of FIG. 6A, the data sequentially flows through the $(i+1)^{th}$ invertible flow layer, the $i^{th}$ invertible flow layer, and the $(i-1)^{th}$ invertible flow layer. i is a positive integer greater than or equal to 1 and not greater than N.

In addition, types of the invertible flow layers constituting the invertible flow-based model in the forward transform process should be the same as types of the invertible flow layers constituting the invertible flow-based model in the forward transform process. For example, different types of invertible flow layers (that is, the target invertible flow layer, an invertible convolutional layer, and a coupling layer) in the invertible flow-based model are combined and stacked based on the example shown in FIG. 4B. For example, in the forward transform process, in a data processing sequence on the left side of FIG. 6B, the to-be-encoded data is used as an input at a target invertible flow layer 1. An output at the target invertible flow layer 1 is used as an input at the coupling layer. An output at the coupling layer is used as an input at a target invertible flow layer 2. An output at the target invertible flow layer 2 is used as an input at the invertible convolutional layer. The rest may be deduced by analogy. The hidden variable is output through processing by a target invertible flow layer n. In this case, in the inverse transform process, in a data processing sequence on the right side of FIG. 6B, the hidden variable is used as an input at the target invertible flow layer n. An output at the target invertible flow layer n enters a next invertible flow layer, and then enters the invertible convolutional layer. An output at the invertible convolutional layer is used as the input at the target invertible flow layer 2. The output at the target invertible flow layer 2 is used as the input at the coupling layer. The output at the coupling layer is used as the input at the target invertible flow layer 1. Finally, the decoded output at the target invertible flow layer 1 is the to-be-encoded data described in the foregoing embodiment.

Figure 6B:
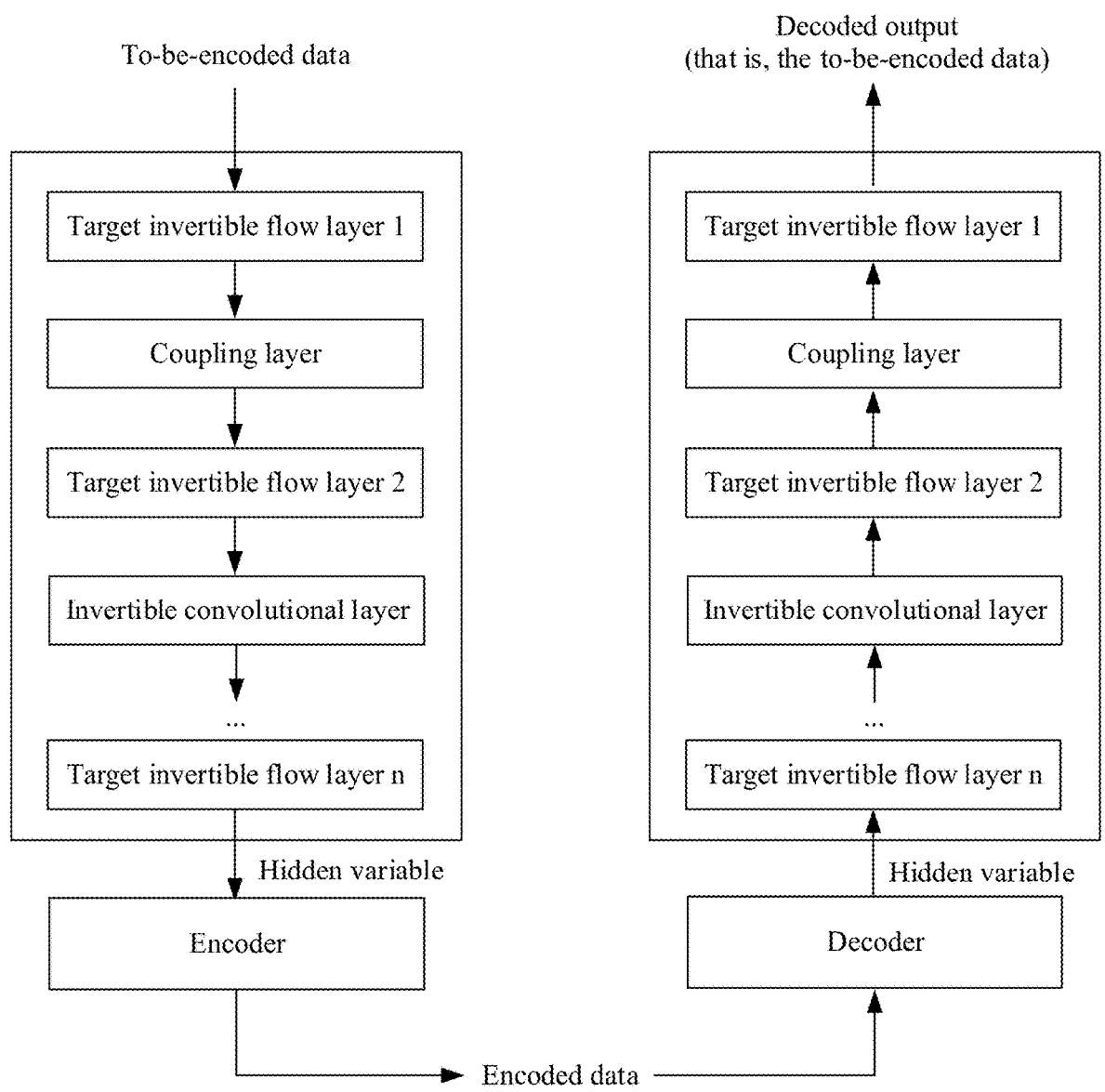
FIG. 6B is a schematic diagram of another structure of an invertible flow-based model according to this application.

It should be understood that FIG. 6B is merely an example of stacking a plurality of invertible flow layers. In actual application, a stacking sequence of the invertible flow layers may be adjusted based on an actual requirement. The stacking sequence of the invertible flow layers is not limited in this application, and examples are not described herein one by one.

In the inverse transform processing process, the target invertible flow layer is used to transform second data input to the target invertible flow layer into the first data described above. The second data is the hidden variable or data output through processing by at least one invertible flow layer. The first data is the decoded output, or an output obtained by processing the first data by the at least one invertible flow layer is the decoded output.

The target invertible flow layer is used to perform inverse transform processing on the second data input to the target invertible flow layer to obtain the first data output from the target invertible flow layer. The second data is a multiplier of the multiplication operation, and the first data is an integer quotient of the division operation. In other words, in the inverse transform processing process, in the multiplication operation determined based on the model parameter, the second data is used as the multiplier of the multiplication operation, and another multiplier of the multiplication operation is determined by using the model parameter. Because the auxiliary variable may be used as the increment of the product of the multiplication operation, intermediate data may be obtained based on the auxiliary variable plus a product of the second data and the another multiplier. In the division operation determined based on the model parameter, the first data is used as the integer quotient of the division operation, a divisor of the division operation is the intermediate data, and a dividend is determined by using the model parameter. Therefore, after the second data is input to the target invertible flow layer, the first data is output after operation processing such as the multiplication operation and the division operation is performed on the second data, and the first data is an output at the target invertible flow layer. Specifically, refer to the following embodiments corresponding to FIG. 9 and FIG. 10A.

It should be understood that the model parameter, the auxiliary variable, and the like that are used in the inverse transform processing process are generated or stored in the transform processing process. For example, a model parameter (for example, a first parameter) and an auxiliary variable (for example, a first auxiliary variable) that are used in the multiplication operation in the forward transform processing process are applied to the division operation in the inverse transform processing process; and a model parameter (for example, a second parameter) and an auxiliary variable (for example, a second auxiliary variable) that are used in a division operation in the forward transform processing process are applied to the multiplication operation in the inverse transform processing process. Specifically, for description of the model parameter and the auxiliary variable, refer to the foregoing embodiment corresponding to FIG. 3. Details are not described herein again.

In this embodiment, after the data processing apparatus performs transform processing on the hidden variable by using the invertible flow-based model, the data processing apparatus may directly output unencoded data. It should be understood that, if the unencoded data is original data such as an image, a video, or a text, the decoded output obtained through the inverse transform processing is the original data such as the image, the video, or the text. If the unencoded data is data obtained after preprocessing is performed based on original data such as an image, a video, or a text, the data processing apparatus may further restore the decoded output to the original data such as the image, the video, or the text.

For example, if the decoded output is data obtained by performing bits-back encoding processing on the original data by using noise data, the data processing apparatus may separate, by performing bits-back decoding processing, the noise data and the original data from the decoded output. If probability distribution of the noise data is given (for example, probability distribution of noise data u is q(u|x) $\delta$, and u∈[0, 1), where $\delta=2^{-k}$, and k represents precision of a fixed-point number), the output of the invertible flow-based model is $\bar{x}$, and an operation of rounding the output $\bar{x}$ of the invertible flow-based model down to a previous lower integer is performed (that is, x←⌊x⌋ is calculated), to obtain the original data. Optionally, a difference between the output $\bar{x}$ of the invertible flow-based model and the original data x is obtained (that is, u←$\bar{x}$−x is calculated), to obtain the noise data u. Optionally, the probability distribution q(u|x) $\delta$ of the noise data u is used to encode u, to restore a code stream used before bits-back encoding processing is performed.

In this embodiment, the data processing apparatus performs inverse transform processing on the decoded hidden variable, and the invertible flow-based model used to perform inverse transform processing includes the target invertible flow layer. Not only the target invertible flow layer includes the multiplication operation and the division operation that are determined based on the model parameter, but the model parameter of the target invertible flow layer can further constrain the auxiliary variable generated in the inverse transform processing process. The auxiliary variable is the increment of the product of the multiplication operation or the remainder generated through the division operation. In other words, in this application, for the multiplication operation in the forward transform processing process, the division operation can be performed by using the auxiliary variable, to restore the hidden variable to data (that is, the to-be-encoded data in the foregoing data encoding method) before the forward transform processing. Therefore, not only the invertible operation of transform processing can be ensured, but a model representation capability can be improved. This helps improve estimation accuracy of model probability distribution, and can further improve compression efficiency of lossless compression.

The following describes a principle of the forward transform processing process of the target invertible flow layer with reference to the foregoing model parameter.

The target invertible flow layer obtains the auxiliary variable based on the model parameter, and performs, based on a monotonic continuous function determined by using the auxiliary variable and the model parameter, transform processing on the first data input to the target invertible flow layer, to obtain the second data output from the target invertible flow layer. A first monotonic continuous function is a function determined by using the auxiliary variable and the model parameter, and the target invertible flow layer processes, by using the monotonic continuous function in the transform processing process, the first data input to the target invertible flow layer, so that the second data can be output after a series of processing is performed.

The model parameter includes the first parameter and the second parameter, both the first parameter and the second parameter are positive integers, and the first parameter is unequal to the second parameter. The auxiliary variable includes the first auxiliary variable and the second auxiliary variable. The first auxiliary variable corresponds to the first parameter, and the second auxiliary variable corresponds to the second parameter. It may be understood that the first auxiliary variable is determined based on the first parameter, and the second auxiliary variable is determined based on the second parameter. The first monotonic continuous function may be a unitary linear function, and is also referred to as a linear function of one variable, that is, a function in a form such as y=kx+b (k≠0).

Figure 7:
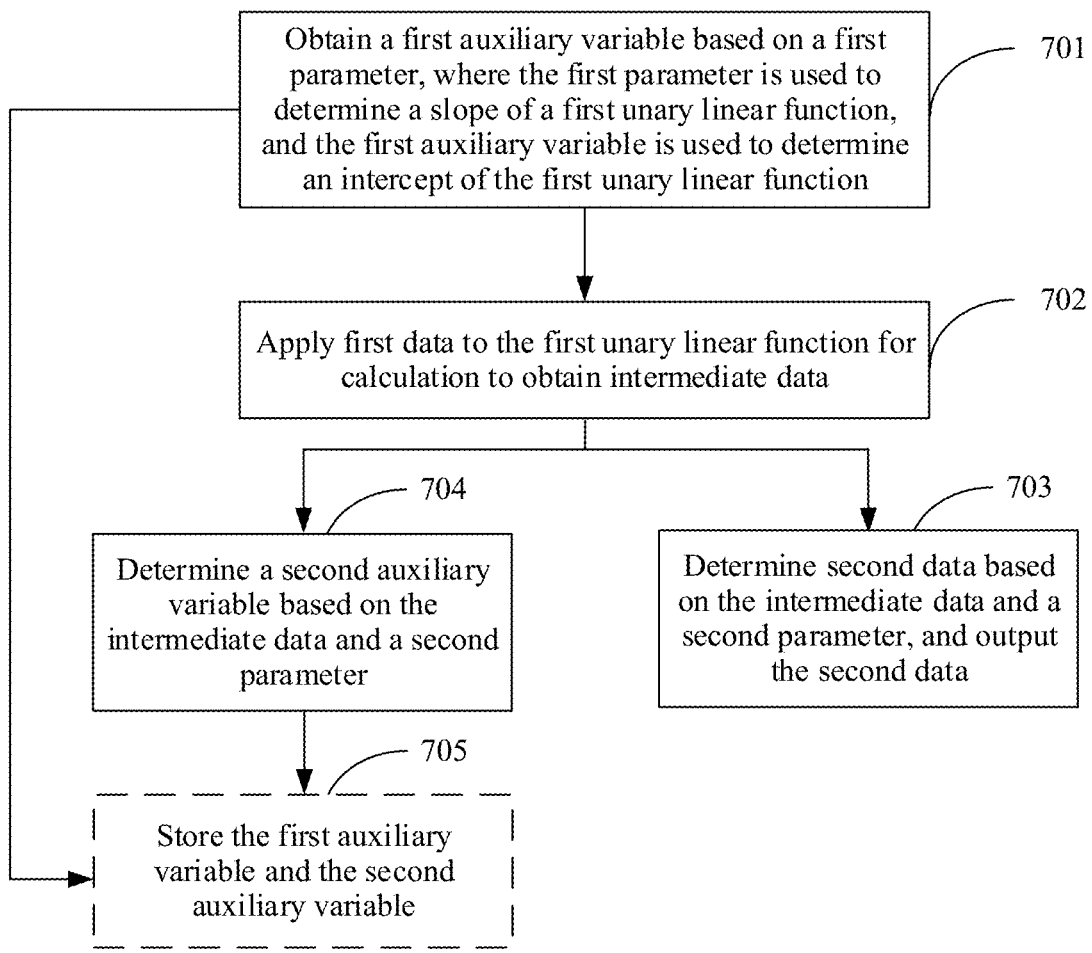
FIG. 7 is a flowchart of a target invertible flow layer when forward transform is performed according to this application.

Further, as shown in FIG. 7, the data processing apparatus performs the following operations in the forward transform processing process by using the target invertible flow layer:

Operation 701: Obtain the first auxiliary variable based on the first parameter, where the first parameter is used to determine a slope of a first unary linear function, and the first auxiliary variable is used to determine an intercept of the first unary linear function.

In one implementation, if the data processing apparatus encodes and decodes the auxiliary variable by using auxiliary data, the data processing apparatus may obtain the first auxiliary variable based on first auxiliary data and probability distribution determined based on the first parameter. The auxiliary data may be a code stream (for example, a binary code stream) prestored in the data processing apparatus, may be a code stream randomly generated by the invertible flow-based model in the data processing apparatus, may be a code stream obtained by the data processing apparatus from an external storage apparatus, or may be a code stream including compressed data. This is not limited herein.

For ease of understanding, the following first describes a principle of encoding and decoding the auxiliary variable by using the auxiliary data.

Uniform distribution U(0, A) is used as an example for description. According to definition of uniform distribution, for any symbol s∈{0, 1, . . . , A−1}, p(s)=1/A is satisfied. In an encoding process, a code stream before encoding is an integer c (c is represented by using a k-bit binary code stream), and a code stream obtained after the any symbol s is encoded is c'=c·A+s (where, c' is represented by using a k-bit binary code stream). In a decoding process, the any symbol s is restored by using a division modulo operation based on the encoded code stream (that is, the code stream before decoding) c'. In other words, the any symbol s is calculated by using a formula s=c' mod A. At the same time, the code stream c before encoding is obtained by using a division rounding operation. In other words, the code stream c before encoding is calculated by using a formula c=⌊c'/A⌋.

Optionally, in actual application, a state vector bs may be set to store the binary code stream to avoid that an excessively long code stream affects algorithm implementation efficiency.

Specifically, a process of encoding the auxiliary variable by using the auxiliary data is shown as follows:

$$c2 \leftarrow c1 \cdot A + s; \quad (1)$$

(2) if $c2 \geq 2^{M+K}$, store lower K bits ($c2 \mod 2^K$) of c2 to the tail of bs, where $c3 \leftarrow \lfloor c2/2^K \rfloor$; and otherwise, $c3 \leftarrow c2$; and (3) store the auxiliary data (that is, c3 and bs).

Correspondingly, when the auxiliary data (that is, c3 and bs) is given, a process of decoding the auxiliary variable by using the auxiliary data is as follows:

(1) If $c3 < 2^M \cdot A$, read from the tail of bs, and pop a $K^{th}$-bit number r (that is, ($c2 \mod 2^K$)), where $c2 \leftarrow 2^K \cdot c3 + r$; and otherwise, $c2 \leftarrow c3$;

(2) $s \leftarrow c2 \mod A$;

(3) $c1 \leftarrow \lfloor c2/A \rfloor$; and (4) output the decompressed symbol s.

Both K and M are integers greater than 0. For example, a value of K may be 32, and a value of M may be 4. It should be understood that, in actual application, the value of K and/or M may be adjusted based on a calculation requirement. This is not limited herein.

It can be learned from the foregoing calculation principle that, when the data processing apparatus obtains the first auxiliary variable based on the first auxiliary data and the probability distribution determined based on the first parameter, the data processing apparatus determines first uniform distribution based on the first parameter, where endpoints of the first uniform distribution are 0 and the first parameter. The data processing apparatus decodes the first auxiliary data by using the first uniform distribution to obtain the first auxiliary variable and second auxiliary data, where a value of the first auxiliary variable is between 0 and the first parameter. The second auxiliary data is data obtained by decoding the first auxiliary data, and the second auxiliary data is used to encode the first auxiliary variable in the inverse transform process.

A process of decoding the first auxiliary data by using the first uniform distribution to obtain the first auxiliary variable and the second auxiliary data may be: The data processing apparatus performs a division modulo operation by using the first auxiliary data as a divisor and the first parameter as a dividend to obtain the first auxiliary variable; and performs a division rounding operation by using the first auxiliary data as a divisor and the first parameter as a dividend to obtain the second auxiliary data. In addition, the data processing apparatus stores the second auxiliary data, for ease of using the second auxiliary data in the inverse transform process.

In this implementation, it is proposed to encode and decode the auxiliary variable by using an entropy coding algorithm of the uniform distribution determined based on the first parameter. This helps improve efficiency of storing the auxiliary variable. In comparison with an rANS (range-based asymmetric numerical system) in a dynamic entropy coding technology in the conventional technology, this helps improve a throughput rate of the target invertible flow layer.

In another implementation, the data processing apparatus determines a first value range based on the first parameter, where the first value range is from 0 to the first parameter. The data processing apparatus randomly selects an integer from the first value range as the first auxiliary variable. Optionally, the data processing apparatus further stores the first auxiliary variable, so that in a subsequent inverse transform processing process, the data processing apparatus can perform inverse transform processing based on the first auxiliary variable.

Operation 702: Apply the first data to the first unary linear function for calculation to obtain intermediate data.

The data processing apparatus performs an addition operation on the first auxiliary variable and a product obtained by performing a multiplication operation on the first data and the first parameter, to obtain the intermediate data.

In this operation, in the forward transform processing, the first auxiliary variable is an increment of the product of the multiplication operation. The data processing apparatus performs a multiplication operation by using the first data as a multiplier of the first parameter to obtain first product data; and performs an addition operation by using the first auxiliary variable as an increment of the first product data to obtain the intermediate data.

It should be understood that the first auxiliary variable is further used as the remainder generated through the division operation in the inverse transform processing.

In this embodiment, because the first auxiliary variable participates in a process of determining the intermediate data, that is, the first auxiliary variable is used as the increment of the product of the multiplication operation, and an integer quotient obtained by performing the division rounding operation based on the intermediate data is the second data, this avoids a problem of a non-invertible operation caused by using only the multiplication operation, and also avoids a problem of a poor model representation capability caused by using only the addition operation and a subtraction operation.

Operation 703: Determine the second data based on the intermediate data and the second parameter, and output the second data.

The data processing apparatus performs a division rounding operation by using the intermediate data as a divisor and the second parameter as a dividend to obtain the second data, and outputs the second data.

Operation 704: Determine the second auxiliary variable based on the intermediate data and the second parameter.

The data processing apparatus further performs a division modulo operation by using the intermediate data as a divisor and the second parameter as a dividend to obtain the second auxiliary variable. The second parameter and the second auxiliary variable are used to determine a second unary linear function, and the second unary linear function is a function used for the inverse transform processing corresponding to the forward transform processing. The second parameter is used to determine a slope of the second unary linear function, and the second auxiliary variable is used to determine an intercept of the second unary linear function.

In this operation, in the forward transform processing, the second auxiliary variable is a remainder generated through the division operation.

It should be understood that the second auxiliary variable is further used as the increment of the product of the multiplication operation in the inverse transform processing corresponding to the forward transform processing.

In this embodiment, because the second auxiliary variable is further generated when the target invertible flow-based model is in the forward transform processing, the second auxiliary variable is used as the increment of the product of the multiplication operation in the inverse transform processing corresponding to the forward transform processing. In other words, in the inverse transform processing, the data processing apparatus restores the second data to the intermediate data based on the second auxiliary variable, and further restores the intermediate data to the first data. Therefore, in the forward transform processing, the second auxiliary variable is calculated. This helps restore the second data to the first data.

It should be noted that there is no limitation on a time sequence between operation 703 and operation 704. The data processing apparatus may perform operation 703 and then operation 704, or the data processing apparatus may perform operation 704 and then operation 703. The data processing apparatus may also separately perform operation 703 and operation 704 at the same time. This is not limited herein.

Operation 705: Store the first auxiliary variable and the second auxiliary variable.

It should be understood that operation 705 should be performed after operation 704.

In this embodiment, the data processing apparatus may directly store the first auxiliary variable and the second auxiliary variable, or the data processing apparatus may indirectly store the first auxiliary variable and the second auxiliary variable in a coding mode.

In one implementation, the data processing apparatus may directly store the first auxiliary variable and the second auxiliary variable. The data processing apparatus may store the first auxiliary variable after generating the first auxiliary variable in operation 701, and the data processing apparatus may store the second auxiliary variable after generating the second auxiliary variable in operation 704. Optionally, the data processing apparatus may correspondingly store the first auxiliary variable and the second auxiliary variable, so that in the inverse transform processing process, the data processing apparatus may obtain the first auxiliary variable corresponding to the second auxiliary variable. This helps improve efficiency of the inverse transform processing process. For example, the data processing apparatus may correspondingly store the first auxiliary variable and the second auxiliary variable in a manner such as by using an array or a table. This is not limited herein.

In another implementation, if the data processing apparatus encodes and decodes the auxiliary variable by using the auxiliary data, the data processing apparatus may store the auxiliary data encoded with the auxiliary variable, but does not need to directly store the auxiliary variable. The data processing apparatus may temporarily store the second auxiliary data obtained by decoding the first auxiliary variable in the foregoing operation 701. After operation 704, the data processing apparatus may encode the second auxiliary variable in a following manner based on the same principle, and store auxiliary data (third auxiliary data described below) encoded with the second auxiliary variable, to indirectly store the first auxiliary variable and the second auxiliary variable.

The data processing apparatus may encode the second auxiliary variable based on the entropy coding principle of the uniform distribution described in the foregoing operation 701. First, the data processing apparatus may obtain the temporarily stored second auxiliary data (that is, the second auxiliary data obtained by decoding the first auxiliary variable), and at the same time, determine second uniform distribution based on the second parameter, where endpoints of the second uniform distribution are 0 and the second parameter. The data processing apparatus encodes the second auxiliary variable by using the second uniform distribution and the second auxiliary data to obtain the third auxiliary data, where a value of the second auxiliary variable is between 0 and the second parameter. The data processing apparatus stores the third auxiliary data, where the third auxiliary data is used to decode the second auxiliary variable in the inverse transform process.

A process of encoding the second auxiliary variable by using the second uniform distribution and the second auxiliary data to obtain the third auxiliary data may be: The data processing apparatus performs an addition operation on the second auxiliary variable and a product obtained by performing a multiplication operation on the second auxiliary data and the second parameter, to obtain the third auxiliary data.

In this embodiment, it is proposed that the multiplication operation is performed on the second data input to the target invertible flow layer, and the first data output from the target invertible flow layer is obtained through the division operation. Therefore, compared with an integer discrete flow model using only integer addition and subtraction, the invertible flow-based model in this application has a stronger model representation capability. This helps improve the estimation accuracy of the model probability distribution, and can further improve the compression efficiency of the lossless compression.

Figure 8A:
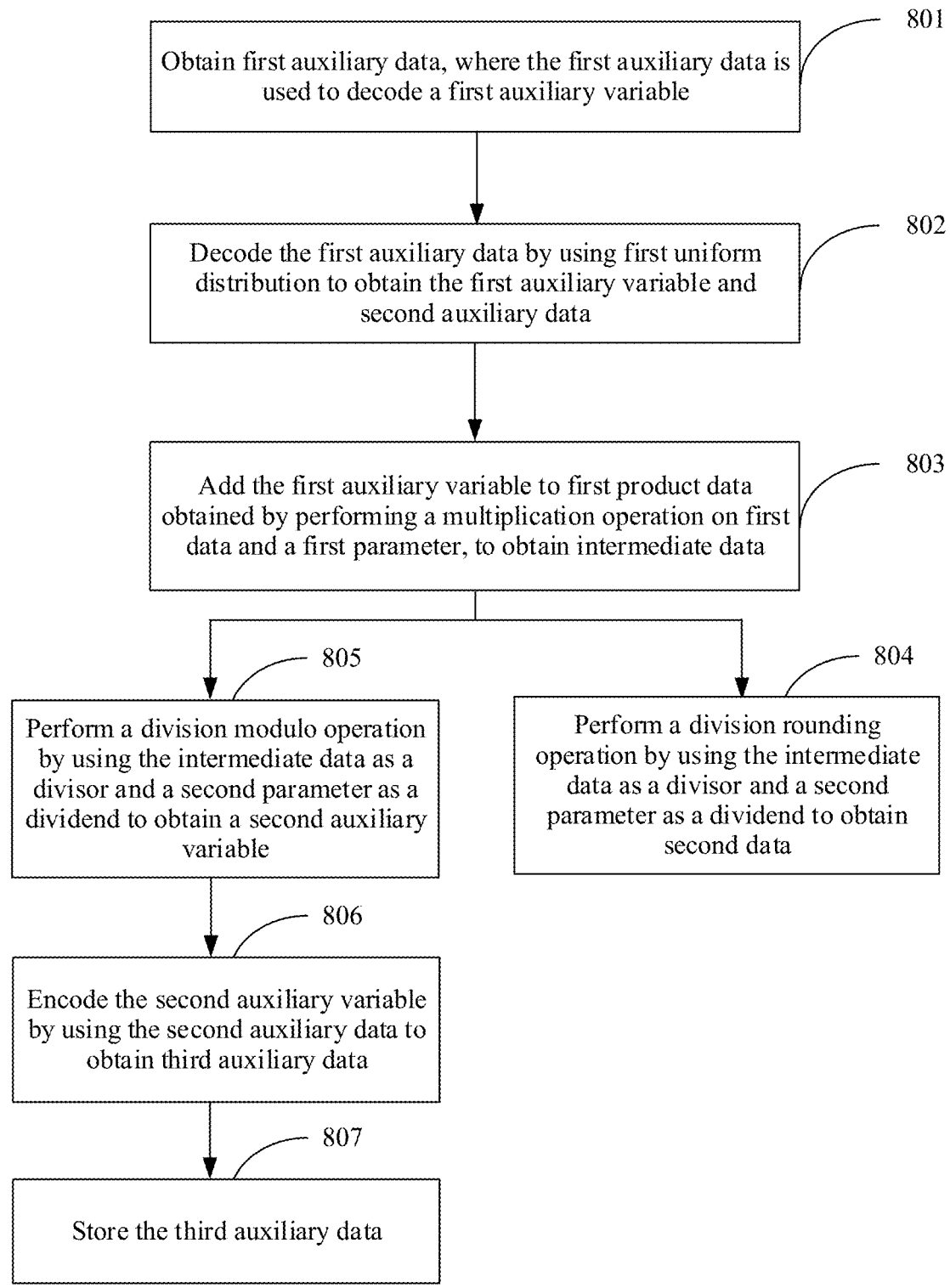
FIG. 8A is another flowchart of a target invertible flow layer when forward transform is performed according to this application.

FIG. 8A shows a calculation procedure of the target invertible flow layer in the forward transform processing process.

Operation 801: Obtain the first auxiliary data, where the first auxiliary data is used to decode the first auxiliary variable.

Operation 802: Decode the first auxiliary data by using the first uniform distribution to obtain the first auxiliary variable and the second auxiliary data.

The first uniform distribution is determined based on the first parameter. For details, refer to related descriptions in the embodiment corresponding to FIG. 7.

Operation 803: Add the first auxiliary variable to the first product data obtained by performing the multiplication operation on the first data and the first parameter, to obtain the intermediate data.

Operation 804: Perform the division rounding operation by using the intermediate data as the divisor and the second parameter as the dividend to obtain the second data.

Operation 805: Perform the division modulo operation by using the intermediate data as the divisor and the second parameter as the dividend to obtain the second auxiliary variable.

It should be noted that there is no limitation on a time sequence between operation 804 and operation 805. The data processing apparatus may perform operation 804 and then operation 805, or the data processing apparatus may perform operation 805 and then operation 804. The data processing apparatus may also separately perform operation 804 and operation 805 at the same time. This is not limited herein.

Operation 806: Encode the second auxiliary variable by using the second auxiliary data to obtain the third auxiliary data.

It should be understood that operation 806 should be performed after operation 805.

Operation 807: Store the third auxiliary data.

Figure 8B:
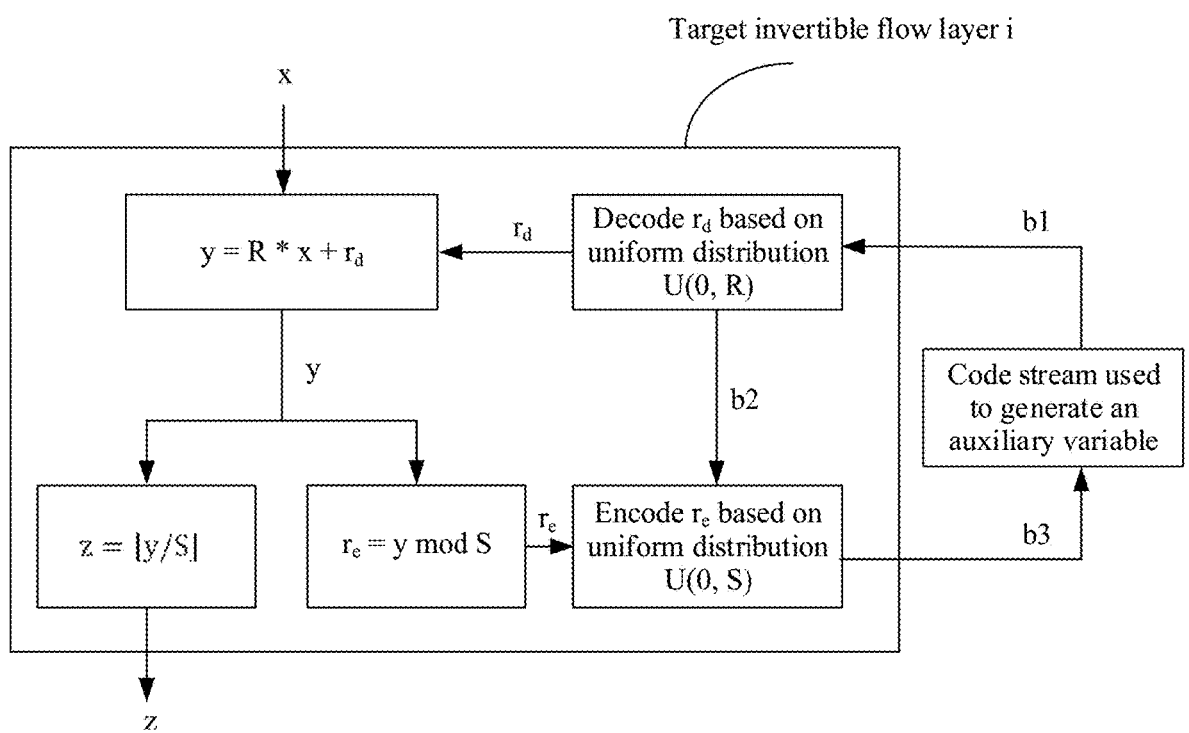
FIG. 8B is an example diagram of a target invertible flow layer when forward transform is performed according to this application.

For ease of understanding, the following describes the transform process (operation 701 to operation 705) of the target invertible flow layer with reference to an example. FIG. 8B shows a target invertible flow layer (for example, the invertible flow layer i) in the invertible flow-based model. x represents data (that is, the first data) input to the target invertible flow layer, and is an output at a previous invertible flow layer (for example, the invertible flow layer i−1). z represents data (that is, the second data) output from the target invertible flow layer, and is an input at a next invertible flow layer (for example, the invertible flow layer i+1). b1 represents the first auxiliary data, b2 represents the second auxiliary data, and b3 represents the third auxiliary data. It is assumed that the first parameter is R and the second parameter is S. First uniform distribution determined based on the first parameter R is U(0, R), and second uniform distribution determined based on the second parameter S is U(0, S). After the first data x is input to the target invertible flow layer, the data processing apparatus obtains the first auxiliary data b1, and decodes the first auxiliary data b1 by using the first uniform distribution U(0, R) to obtain a first auxiliary variable $r_d$ and second auxiliary data b2. The data processing apparatus calculates intermediate data y by determining a first unary linear function (that is, $y=R*x+r_d$) based on the first parameter R and the first auxiliary variable $r_d$. A division rounding operation is performed on the intermediate data y and the second parameter S (that is, z=[y/S] is calculated) to obtain the second data z. In addition, the data processing apparatus further performs a division modulo operation based on the intermediate data y and the second parameter S (that is, $r_e$=y mod S is calculated (in other words, $r_e$=mod(y, S))) to obtain a second auxiliary variable $r_e$. The data processing apparatus obtains the second auxiliary data b2 obtained in a process of decoding the first auxiliary variable $r_d$, and encodes the second auxiliary variable $r_e$ by using the second uniform distribution U(0, S) to obtain the encoded third auxiliary data b3. The data processing apparatus stores the third auxiliary data b3, so that the second auxiliary variable $r_e$ and the second auxiliary data b2 are decoded by using the third auxiliary data b3 in the inverse transform processing process, and the first auxiliary variable $r_d$ is encoded by using the second auxiliary data b2.

It should be noted that, if the to-be-encoded data input to the invertible flow-based model is fixed-point number data with first preset precision, before the transform processing process shown in FIG. 8B is performed, the $i^{th}$ invertible flow layer (that is, the invertible flow layer i) is further used to: process the fixed-point number data with first preset precision into integer data; and after the transform processing process shown in FIG. 8B is performed, process the integer data obtained through the transform processing into the fixed-point number data with first preset precision, to be used as an output at the $i^{th}$ invertible flow layer (that is, the invertible flow layer i).

In this implementation, because the target invertible flow layer may encode and decode auxiliary variables (for example, the first auxiliary variable and the second auxiliary variable) based on model parameters (for example, the first parameter and the second parameter) and auxiliary data (for example, the first auxiliary data, the second auxiliary data, and the third auxiliary data), that data on which a multiplication operation is performed is invertible by using a division operation can be implemented by using the auxiliary variable. Because the target invertible flow layer not only involves the addition operation, but involves the multiplication operation, the division operation, the rounding operation, and the modulo operation, diversity of the transform processing can be improved, and a model representation capability can be improved.

It should be noted that the first parameter and the second parameter in the target invertible flow layer may be preset parameters, may be parameters generated based on a neural network, or may be parameters determined by the data processing apparatus by using an interpolation algorithm or a binary search algorithm.

In a possible implementation, if the target invertible flow layer is constructed based on a unary linear function (for example, a function z=f(x)=a·x(a>0)), the first parameter and the second parameter may be determined based on a coefficient a of the unary linear function. The coefficient a may be deformed into a fractional form, that is, a=R/S. In this case, R may be defined as the first parameter, and S may be defined as the second parameter. Optionally, S may be set to a large value, and R=round(a·S). round(x) represents a returned rounded integer value of x.

In another possible implementation, if the target invertible flow layer is constructed based on a non-linear function (for example, the first monotonic continuous function). In this case, the data processing apparatus may divide the non-linear function into a plurality of segments, and approximate each segment to a straight line to calculate the first parameter and the second parameter by using the interpolation algorithm or the binary search algorithm. The data processing apparatus may obtain a first interval in a definition range of the first monotonic continuous function and a second interval that corresponds to the first interval and that is in a value range of the first monotonic continuous function. The data processing apparatus calculates the first parameter and the second parameter based on the first interval and the second interval by using the interpolation algorithm or the binary search algorithm.

For example, the following describes a process of determining the first parameter and the second parameter by using the interpolation algorithm as an example.

It is assumed that the first monotonic continuous function is a monotonic increasing function z=f(x), the first interval in the definition range of the first monotonic continuous function is [$x_l$, $x_h$), and the second interval corresponding to the first interval in the value range is [$z_l$, $z_h$). Both $x_l$, $x_h$, $z_l$, and $z_h$ are fixed-point numbers (that is, floating-point numbers) with precision of k.

In this case, a large integer S may be first set as the second parameter, and then the first parameter R is calculated by using an interpolation formula (for example, a linear interpolation formula $$R = \left\lfloor \frac{(2^k \cdot (z_h - z_1) - 1) \cdot S - 1}{2^k \cdot (x_h - x_1)} \right\rfloor).$$

It should be noted that the data processing apparatus may determine the first interval and the second interval in any one of the following implementations.

In a possible implementation, the data processing apparatus may perform uniform interpolation based on the definition range. This implementation is applicable to a case in which the value range is greater than the definition range.

A size of an interpolation interval $2^{-h}$(h≪k) is considered, and a process of determining a forward interpolation interval is as follows:

$$x_1 = \frac{\lfloor 2^h \cdot x \rfloor}{2^h} \text{ and } x_h = x_1 + 2^{-h}; \tag{1}$$

$$z_1 = \frac{\lfloor 2^h \cdot f(x_1) \rfloor}{2^h} \text{ and } z_h = \frac{\lfloor 2^h \cdot f(x_h) \rfloor}{2^h}; \tag{2}$$

(3) output $x_l$, $x_h$, $z_l$, and $z_h$.

An inverse interpolation interval needs to be determined through searching, and a determining process is as follows:

$$x' \leftarrow f^{-1}(z); \quad (1)$$

$$x'_m = \frac{\text{round}(2^h \cdot x')}{2^h}, \, x'_l = x'_m - 2^{-h}, \text{ and } x'_h = x'_m + 2^{-h}; \quad (2)$$

$$z'_{\{l,m,h\}} = \frac{\lfloor 2^h \cdot f(x'_{\{l,m,h\}}) \rfloor}{2^h}; \quad (3)$$

(4) if $z<z'_m$, $x_l=x'_l$, $x_h=x'_m$, $z_l=z'_l$, and $z_h=z'_m$; and otherwise, $x_l=x'_m$, $x_h=x'_h$, $z_l=z'_m$, and $z_h=z'_h$; and (5) output $x_l$, $x_h$, $z_l$, and $z_h$.

In another possible implementation, the data processing apparatus may perform linear interpolation based on the value range. This implementation is applicable to a case in which the definition range is greater than the value range.

A size of an interpolation interval $2^{-h}$ (h«k) is considered, a forward interpolation interval is determined through searching, and a determining process is as follows:

$$z' \leftarrow f(x); \quad (1)$$

$$z'_m = \frac{\text{round}(2^h \cdot z')}{2^h}, \, z'_l = z'_m - 2^{-h}, \text{ and } z'_h = z'_m + 2^{-h}; \quad (2)$$

$$x'_{\{l,m,h\}} = \frac{\lfloor 2^h \cdot f^{-1}(z'_{\{l,m,h\}}) \rfloor}{2^h}; \quad (3)$$

(4) if $x<x'_m$, $x_l=x'_l$, $x_h=x'_m$, $z_l=z'_l$, and $z_h=z'_m$; and otherwise, $x_l=x'_m$, $x_h=x'_h$, $z_1=z'_m$, and $z_h=z'_h$; and (5) output $x_l$, $x_h$, $z_l$, and $z_h$.

An inverse interpolation interval is directly obtained through calculation:

$$z_l = \frac{\lfloor 2^h \cdot z \rfloor}{2^h} \text{ and } z_h = z_l + 2^{-h}; \quad (1)$$

$$x_l = \frac{\lfloor 2^h \cdot f^{-1}(z_l) \rfloor}{2^h} \text{ and } x_h = \frac{\lfloor 2^h \cdot f^{-1}(z_h) \rfloor}{2^h}; \quad (2)$$

(3) output $x_l$, $x_h$, $z_l$, and $z_h$.

It should be noted that if the target invertible flow layer is a flow layer constructed based on a linear function, the target invertible flow layer may be referred to as a linear invertible flow layer (or a linear flow layer). If the target invertible flow layer is a flow layer constructed based on a non-linear function, the target invertible flow layer may be referred to as a non-linear invertible flow layer (or a non-linear flow layer). When the target invertible flow layer is the non-linear invertible flow layer, the non-linear function is divided into a plurality of linear functions by using the interpolation algorithm or the binary search algorithm, that is, a numerically invertible operation of the non-linear flow layer is converted into a numerically invertible operation of the linear flow layer. It is beneficial to implement diversity of target invertible flow layers, so that the invertible flow layers in the invertible flow-based model are diversified, and a representation capability of the invertible flow-based model is improved.

In addition, the invertible flow layer in this application may alternatively be a transformation layer at the target invertible flow layer in addition to the target invertible flow layer, and the transformation layer at the target invertible flow layer may be an invertible convolutional layer or a coupling layer. In this case, in addition to the target invertible flow layer, the invertible flow-based model further includes the invertible convolutional layer and/or the coupling layer.

In a possible implementation, one or more of N serial invertible flow layers are invertible convolutional layers, the invertible convolutional layer includes a convolution kernel and the target invertible flow layer, and the convolution kernel is a square matrix whose order is a quantity of channels of the to-be-encoded data. The invertible convolutional layer is used to perform LU factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

For example, an example in which the invertible convolutional layer is a 1*1 convolutional layer is used for description. A parameter of the invertible convolutional layer is a convolution kernel W, and the convolution kernel W satisfies $W \in R^{c \times c}$, where c represents a dimension of data x input to the invertible convolutional layer. In this case, the data z that output from the invertible convolutional layer may be represented as z=Wx. LU factorization is performed on the matrix W, and W=PLΛU may be obtained. The matrix P is a permutation matrix (displace matrix), the matrix L is a lower triangular matrix (LTM), the matrix U is an upper triangular matrix (UTM), and the matrix Λ is a diagonal matrix. In this case, the data z that output from the invertible convolutional layer may be represented as z=PLΛUx. Therefore, a product of the data x and the matrix U, a product of the data x and the matrix Λ, a product of the data x and the matrix L, and a product of the data x and the matrix P may be separately calculated.

First, the product h of the data x and the upper triangular matrix U is calculated. In this case, it is assumed that h=Ux. $u_{ij}$ is an element in an $i^{th}$ row and a $j^{th}$ column of U, $x_i$ is an $i^{th}$ element of x, and $h_i$ is an $i^{th}$ element of h. In this case, h may be calculated by using the following formula:

$$h_i = x_i + \frac{\text{round}\left(2^k \sum_{j=i+1}^{c} u_{ij} x_j\right)}{2^k}$$

A product m of data h and the upper diagonal matrix Λ is calculated. In this case, it is assumed that m=Λh. $\lambda_{ij}$ is an element in an $i^{th}$ row and a $j^{th}$ column of Λ, $h_i$ is an $i^{th}$ element of h, and $m_i$ is an $i^{th}$ element of m. In this case, $m_i=\lambda_i \cdot h_i$. In this case, $\lambda_i$ is used to determine the model parameters (for example, the first parameter and the second parameter). Specifically, each element $\lambda_i$ on a main diagonal of the diagonal matrix Λ may be represented by using a fraction (that is, $\lambda_i$ is represented by dividing two integers). A numerator of the fraction is used as the first parameter R, and a denominator of the fraction is used as the second parameter S, to construct the target invertible flow layer. $h_i$ is used as first data input to the target invertible flow layer at the invertible convolutional layer to calculate second data $m_i$ output from the target invertible flow layer at the invertible convolutional layer.

A product n of data m and the lower triangular matrix L is calculated. In this case, it is assumed that n=Lm. $l_{ij}$ is an element in an $i^{th}$ row and a $j^{th}$ column of L, $m_i$ is an $i^{th}$ element of m, and $n_i$ is an $i^{th}$ element of n. In this case, n may be calculated by using the following formula:

$$n_1 = m_1, n_i = m_i + \frac{\text{round}\left(2^k \sum_{j=1}^{i-1} l_{ij} m_j\right)}{2^k}$$

A product of data n and the permutation matrix P is calculated to obtain the data z output from the invertible convolutional layer. In this case, it is assumed that z=Pn. z is obtained by rearranging elements of x based on the matrix P.

In this implementation, it is proposed that the invertible convolutional layer is disposed in the invertible flow-based model, and the 1*1 convolutional layer is combined with the target invertible flow layer. The 1*1 convolutional layer is converted into continuous matrix multiplication operations of the upper triangular matrix, the diagonal matrix, the lower triangular matrix, and the permutation matrix. Iteration calculation, numerically invertible linear flow transform processing based on the target invertible flow layer, iteration calculation, and element rearrangement are used for the four matrix multiplications, respectively. Therefore, diversity of data transformation can be implemented, and the representation capability of the invertible flow-based model can be improved.

In another possible implementation, one or more of the N invertible flow layers are coupling layers, and the coupling layer includes the target invertible flow layer. The coupling layer is used to: divide, based on preset dimensions, data input to the coupling layer into at least two parts of data, and process at least one of the at least two parts of data as the input at the target invertible flow layer to obtain the output at the coupling layer.

For example, an example in which the data processing apparatus divides the data input to the coupling layer into the two parts of data based on the preset dimensions is used for description. It is assumed that the data input to the coupling layer is x. The data x is decomposed into two parts based on the dimensions: x=[$x_a$, $x_b$], and the coupling layer is z=[$z_a$, $z_b$]=[$x_a$, $f_{x_a}(x_b)$]. $f_{x_a}$ is a unary monotonic function (for example, a unary linear function) in which $x_a$ is used as a parameter. Data $x_b$ is calculated at a target invertible flow layer constructed by using a model parameter determined by using the unary monotonic function $f_{x_a}$, to obtain $f_{x_a}(x_b)$. $f_{x_a}(x_b)$ is used as an output, that is, $z_b$, of one dimension at the coupling layer. In addition, $x_a$ is directly used as an output, that is, $z_a$, of another dimension at the coupling layer.

It should be understood that the coupling layer may include a neural network, and the neural network is used to process, based on the dimensions, the data input to the coupling layer. The neural network may include a plurality of types, for example, a convolutional neural network (CNN), a deep neural network (DNN), a recurrent neural network (RNN), or another neural network. This is not limited herein.

In this implementation, it is proposed that the coupling layer is disposed in the invertible flow-based model. The coupling layer can divide, based on the dimensions, the data input to the coupling layer, and perform transform processing only on data in some dimensions in a transform mode of the target invertible flow layer. Therefore, the diversity of the data transformation can be implemented, and the representation capability of the invertible flow-based model can be improved.

It should be understood that different types of invertible flow layers (that is, the target invertible flow layer, the invertible convolutional layer, and the coupling layer) described above may be combined and stacked to improve a transform processing capability of the invertible flow-based model. Specifically, refer to the foregoing related descriptions corresponding to FIG. 4A and FIG. 4B. Details are not described herein again.

The following describes a principle of the inverse transform processing process of the target invertible flow layer with reference to the foregoing model parameter.

The target invertible flow layer obtains the auxiliary variable based on the model parameter, and performs, based on a monotonic continuous function determined by using the auxiliary variable and the model parameter, transform processing on the second data input to the target invertible flow layer, to obtain the first data output from the target invertible flow layer. A monotonic continuous function is a function determined by using the auxiliary variable and the model parameter, and the target invertible flow layer processes, by using the first monotonic continuous function in the transform processing process, the second data input to the target invertible flow layer, so that the first data can be output after a series of processing is performed, that is, the second data can be restored to the first data.

The model parameter includes the first parameter and the second parameter, both the first parameter and the second parameter are positive integers, and the first parameter is unequal to the second parameter. The auxiliary variable includes the first auxiliary variable and the second auxiliary variable. The first auxiliary variable corresponds to the first parameter, and the second auxiliary variable corresponds to the second parameter. It may be understood that the first auxiliary variable is determined based on the first parameter, and the second auxiliary variable is determined based on the second parameter. The first monotonic continuous function may be a unitary linear function, and is also referred to as a linear function of one variable, that is, a function in a form such as y=kx+b (k≠0).

Figure 9:
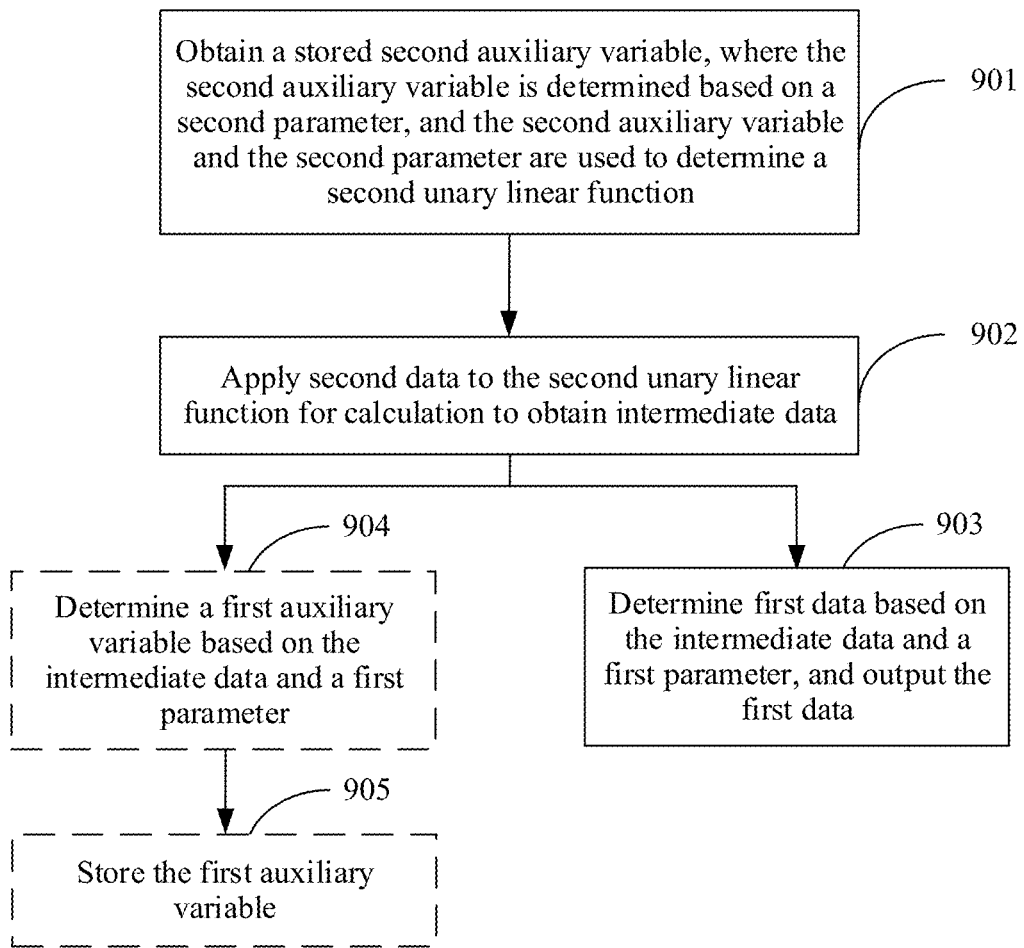
FIG. 9 is a flowchart of a target invertible flow layer when inverse transform is performed according to this application.

Further, as shown in FIG. 9, the data processing apparatus performs the following operations in the inverse transform processing process by using the target invertible flow layer:

Operation 901: Obtain the second auxiliary variable, where the second auxiliary variable is determined based on the second parameter, and the second auxiliary variable and the second parameter are used to determine a second unary linear function.

The second auxiliary variable is an auxiliary variable generated in the forward transform process. The second auxiliary variable is determined based on the second parameter, and the second auxiliary variable and the second parameter are used to determine the second unary linear function. The second parameter is used to determine a slope of the second unary linear function, and the second auxiliary variable is used to determine an intercept of the second unary linear function.

In one implementation, in the forward transform process, if the data processing apparatus encodes and decodes the auxiliary variable by using the auxiliary data, and stores the auxiliary data (for example, third auxiliary data) used for encoding and decoding the auxiliary variable, in the inverse transform process, the data processing apparatus first obtains the third auxiliary data, and then decodes the second auxiliary variable by using the third auxiliary data.

Specifically, for a calculation principle of decoding the auxiliary variable by using the auxiliary data, refer to the related description in the foregoing operation 701. Details are not described herein again.

Specifically, when the data processing apparatus obtains the second auxiliary variable based on the third auxiliary data and probability distribution determined based on the second parameter, the data processing apparatus determines second uniform distribution based on the second parameter, where endpoints of the second uniform distribution are 0 and the second parameter; and decodes the third auxiliary data by using the second uniform distribution to obtain the second auxiliary variable and second auxiliary data, where a value of the second auxiliary variable is between 0 and the second parameter. The second auxiliary data is data obtained by decoding the third auxiliary data.

A process of decoding the third auxiliary data by using the second uniform distribution to obtain the second auxiliary variable and the second auxiliary data may be: The data processing apparatus performs a division modulo operation by using the third auxiliary data as a divisor and the second parameter as a dividend to obtain the second auxiliary variable; and performs a division rounding operation by using the third auxiliary data as a divisor and the second parameter as a dividend to obtain the second auxiliary data. Optionally, the data processing apparatus may temporarily store the second auxiliary data, for ease of using the second auxiliary data in a subsequent transform processing process. For example, the first auxiliary variable is encoded in a subsequent processing process by using the second auxiliary data.

In this implementation, it is proposed to encode and decode the auxiliary variable by using an entropy coding algorithm of the uniform distribution determined based on the second parameter. This helps improve efficiency of storing the auxiliary variable. In comparison with an rANS in a dynamic entropy coding technology in the conventional technology, this helps improve a throughput rate of the target invertible flow layer.

In another implementation, in the forward transform process, if the data processing apparatus directly stores the second auxiliary variable without using the auxiliary data, the data processing apparatus directly obtains the second auxiliary variable from a storage location at which the second auxiliary variable is stored.

Operation 902: Apply the second data to the second unary linear function for calculation to obtain intermediate data.

The data processing apparatus performs an addition operation on the second auxiliary variable and a product obtained by performing a multiplication operation on the second data and the second parameter, to obtain the intermediate data.

In this operation, in the inverse transform processing, the second auxiliary variable is an increment of the product of the multiplication operation. The data processing apparatus performs a multiplication operation by using the second data as a multiplier of the second parameter to obtain second product data; and performs an addition operation by using the second auxiliary variable as an increment of the second product data to obtain the intermediate data.

In this embodiment, because the second auxiliary variable participates in a process of determining the intermediate data, that is, the second auxiliary variable is used as the increment of the product of the multiplication operation, and an integer quotient obtained by performing the division rounding operation based on the intermediate data is the first data, this avoids a problem of a non-invertible operation caused by using only the multiplication operation, and also avoids a problem of a poor model representation capability caused by using only the addition operation and a subtraction operation.

Operation 903: Determine the first data based on the intermediate data and the first parameter, and output the first data.

The data processing apparatus performs a division rounding operation by using the intermediate data as a divisor and the first parameter as a dividend to obtain the first data, and outputs the first data. The first data is data that is obtained through inverse transform processing performed by the target invertible flow layer and that is output from the target invertible flow layer.

Operation 904: Determine the first auxiliary variable based on the intermediate data and the first parameter.

The data processing apparatus performs a division modulo operation by using the intermediate data as a divisor and the first parameter as a dividend to obtain the first auxiliary variable. The first parameter and the first auxiliary variable are used to determine a first unary linear function, and the first unary linear function is a function used for next forward transform processing (that is, next transform processing corresponding to current inverse transform processing). The first parameter is used to determine a slope of the first unary linear function, and the first auxiliary variable is used to determine an intercept of the first unary linear function.

In this operation, in the inverse transform processing, the first auxiliary variable is a remainder generated through the division operation.

It should be noted that there is no limitation on a time sequence between operation 903 and operation 904. The data processing apparatus may perform operation 903 and then operation 904, or the data processing apparatus may perform operation 904 and then operation 903. The data processing apparatus may also separately perform operation 903 and operation 904 at the same time. This is not limited herein.

Operation 905: Store the first auxiliary variable.

In one implementation, the data processing apparatus may directly store the first auxiliary variable. The data processing apparatus may store the first auxiliary variable after generating the first auxiliary variable in operation 904. Optionally, the data processing apparatus may correspondingly store the first auxiliary variable and the originally stored second auxiliary variable, so that in a subsequent transform processing process, the data processing apparatus may obtain the first auxiliary variable corresponding to the second auxiliary variable. This helps improve efficiency of the subsequent transform processing process.

In another implementation, if the data processing apparatus encodes and decodes the auxiliary variable by using the auxiliary data, the data processing apparatus may store the auxiliary data encoded with the auxiliary variable, but does not need to directly store the auxiliary variable. The data processing apparatus may encode the first auxiliary variable by using the second auxiliary data generated in operation 901, to obtain the first auxiliary data, and store the first auxiliary data.

The data processing apparatus may encode the first auxiliary variable based on the entropy coding principle of the uniform distribution described in operation 701 in the embodiment corresponding to FIG. 7 above. First, the data processing apparatus may obtain the second auxiliary data generated in operation 901, and at the same time, determine first uniform distribution based on the first parameter, where endpoints of the first uniform distribution are 0 and the first parameter The data processing apparatus encodes the first auxiliary variable by using the first uniform distribution and the second auxiliary data to obtain the first auxiliary data, where a value of the first auxiliary variable is between 0 and the first parameter. The data processing apparatus stores the first auxiliary data. A process of encoding the first auxiliary variable by using the first uniform distribution and the second auxiliary data to obtain the first auxiliary data may be: The data processing apparatus performs an addition operation on the first auxiliary variable and a product obtained by performing a multiplication operation on the second auxiliary data and the first parameter, to obtain the first auxiliary data.

In this embodiment, because the first auxiliary data is also data input to the target invertible flow layer in the forward transform process, the target invertible flow layer can output the first auxiliary data for another time in the inverse transform process. In other words, the target invertible flow layer can restore a code stream used in a compression and encoding process (that is, the forward transform process), so that the used code stream is invertible.

FIG. 10A shows a calculation procedure of the target invertible flow layer in the inverse transform processing process.

Operation 1001: Obtain third auxiliary data, where the third auxiliary data is used to decode the second auxiliary variable.

It should be understood that the third auxiliary data is auxiliary data stored in the data processing apparatus in the forward transform processing process.

Operation 1002: Decode the third auxiliary data by using the second uniform distribution to obtain the second auxiliary variable and the second auxiliary data.

The second uniform distribution is determined based on the second parameter. For details, refer to related descriptions in the embodiment corresponding to FIG. 9.

Operation 1003: Add the second auxiliary variable to the second product data obtained by performing the multiplication operation on the second data and the second parameter, to obtain the intermediate data.

Operation 1004: Perform the division rounding operation by using the intermediate data as the divisor and the first parameter as the dividend to obtain the first data.

Operation 1005: Perform the division modulo operation by using the intermediate data as the divisor and the first parameter as the dividend to obtain the first auxiliary variable.

It should be noted that there is no limitation on a time sequence between operation 1004 and operation 1005. The data processing apparatus may perform operation 1004 and then operation 1005, or the data processing apparatus may perform operation 1005 and then operation 1004. The data processing apparatus may also separately perform operation 1004 and operation 1005 at the same time. This is not limited herein.

Operation 1006: Encode the first auxiliary variable by using the second auxiliary data to obtain the first auxiliary data.

Operation 1007: Store the first auxiliary data.

For ease of understanding, the following describes the transform process (operation 901 to operation 905) of the target invertible flow layer with reference to an example. FIG. 10B shows a target invertible flow layer (for example, an invertible flow layer i) in the invertible flow-based model. z represents data (that is, the second data) input to the target invertible flow layer, and is an output at a previous invertible flow layer (for example, the invertible flow layer i+1). x represents data (that is, the first data) output from the target invertible flow layer, and is an input at a next invertible flow layer (for example, the invertible flow layer i−1). b1 represents the first auxiliary data, b2 represents the second auxiliary data, and b3 represents the third auxiliary data. It is assumed that the first parameter is R and the second parameter is S. First uniform distribution determined based on the first parameter R is U(0, R), and second uniform distribution determined based on the second parameter S is U(0, S). After the second data z is input to the target invertible flow layer, the data processing apparatus obtains the stored third auxiliary data b3, and decodes the third auxiliary data b3 based on the second uniform distribution U(0, S) to obtain a second auxiliary variable $r_e$ and second auxiliary data b2. The data processing apparatus calculates intermediate data y by determining a first unary linear function (that is, $y=S*z+r_e$) based on the second parameter S and the second auxiliary variable $r_e$. A division rounding operation is performed on the intermediate data y and the first parameter R (that is, $x=[y/R]$ is calculated) to obtain the first data x. In addition, the data processing apparatus further performs a division modulo operation based on the intermediate data y and the first parameter R (that is, $r_d=y$ mod R is calculated (in other words, $r_d=\text{mod}(y, R)$)) to obtain a first auxiliary variable $r_d$. The data processing apparatus encodes the first auxiliary variable $r_d$ based on the first uniform distribution U(0, R) and the second auxiliary data b2 to obtain the encoded first auxiliary data b1. The data processing apparatus may store the first auxiliary data b1 to restore a code stream in a storage apparatus (for example, a memory in the data processing apparatus).

In a possible implementation, if the to-be-encoded data input to the invertible flow-based model is fixed-point number data with first preset precision, before the transform processing process shown in FIG. 10B is performed, the $i^{th}$ invertible flow layer (that is, the invertible flow layer i) is further used to: process the fixed-point number data with first preset precision into integer data; and after the transform processing process shown in FIG. 10B is performed, process the integer data obtained through the transform processing into the fixed-point number data with first preset precision, to be used as an output at the $i^{th}$ invertible flow layer (that is, the invertible flow layer i).

In this implementation, because the target invertible flow layer may encode and decode auxiliary variables (for example, the first auxiliary variable and the second auxiliary variable) based on model parameters (for example, the first parameter and the second parameter) and auxiliary data (for example, the first auxiliary data, the second auxiliary data, and the third auxiliary data), that data on which a multiplication operation is performed is invertible by using a division operation can be implemented by using the auxiliary variable. Because the target invertible flow layer not only involves the addition operation, but involves the multiplication operation, the division operation, the rounding operation, and the modulo operation, diversity of the transform processing can be improved, and a model representation capability can be improved.

It should be understood that, in comparison with a lossless compression method in the conventional technology, lossless compression can be performed by using the data encoding method and the data decoding method provided in this application, an optimal compression ratio can be obtained while ensuring a fast compression throughput rate.

As shown in Table 1, in comparison with a local bits-back coding (local bits-back coding, LBB) model in a currently optimal lossless compression method based on a flow-based model, compression and decompression performed by using the data encoding method and the data decoding method provided in this application can effectively improve compression efficiency. The compression efficiency can be improved by five times.

TABLE 1

| Method | Compression time (ms) |
|---|---|
| LBB (NeurIPS 2019) | 116 |
| Ours | 21.0 |

That to-be-encoded data is image data is used as an example. As shown in Table 2, in embodiments of this application, good compression ratios are achieved in various image datasets, and embodiments of this application can be effectively applied to a lossless image compression task. Best lossless compression ratios are obtained in CIFAR10, Imagenet32, Imagenet, and another dataset. An important reason that the good compression ratios are obtained is that the used invertible flow-based model has a strong capability of fitting data distribution.

TABLE 2

| Method | CIFAR10 | Imagenet32 | Imagenet64 |
|---|---|---|---|
| PNG | 1.36 | 1.25 | 1.40 |
| FLIF | 1.91 | 1.77 | 1.91 |
| HilLoc (ICLR 2020) | 2.25 | 1.90 | 2.05 |
| IDF (NeurIPS 2019) | 2.40 | 1.91 | 2.05 |
| IDF++ (ICLR 2021) | 2.45 | 1.94 | 2.09 |
| iVPF (CVPR 2021) | 2.50 | 1.99 | 2.14 |
| Ours | 2.56 | 2.06 | 2.16 |

In addition, as shown in Table 3, the invertible flow-based model in embodiments of this application has good generalization performance, and a single model can be used to complete compression of images of various types and sizes. The Imagenet64 dataset is used to train the invertible flow-based model (an input size is 64*64). A lossless compression test is performed on a natural image (the natural image is partitioned into blocks with the size of 64*64, and for an image smaller than the size of 64*64, the image is filled to the size of 64*64 with color blocks of appropriate pixel values). A compression ratio of more than 3.1 times is obtained, and is far higher than compression ratios of existing lossless compression methods.

TABLE 3

| Method | CLIC.mobile | CLIC.pro | DIV2k |
|---|---|---|---|
| PNG | 2.05 | 2.00 | 2.59 |
| FLIF | 3.21 | 2.88 | 2.75 |
| L3C (CVPR 2019) | 3.03 | 2.72 | 2.59 |
| RC (CVPR 2020) | 3.15 | 2.73 | 2.60 |
| iVPF (CVPR 2021) | 3.35 | 3.15 | 2.99 |
| Ours | 3.54 | 3.28 | 3.11 |

It can be learned that this application proposes a new numerically invertible flow-based model calculation method (that is, the invertible flow-based model), and proposes corresponding numerically invertible calculation methods for flow layers such as a unary linear/non-linear flow, a 1*1 convolutional layer, and a coupling layer, to eliminate a numerical error of the flow-based model. The method is simple and efficient. Compared with the local bits-back coding (LBB) model in the conventional technology, the method does not require complex local encoding and decoding processes, and can greatly improve efficiency of the lossless compression.

FIG. 11 is a schematic diagram of a structure of a data processing apparatus 110 according to an embodiment of this application. The data processing apparatus 110 may be a server, a terminal device, or another device that has a compression storage requirement. This is not limited herein. The operations in embodiments corresponding to FIG. 3, FIG. 5, FIG. 7, FIG. 8A, FIG. 9, and FIG. 10A may be performed by the data processing apparatus 110. When the data processing apparatus 110 is used as an encoder side, the data processing apparatus 110 performs the operations in embodiments corresponding to FIG. 3, FIG. 7, and FIG. 8A. When the data processing apparatus 110 is used as a decoder side, the data processing apparatus 110 performs the operations in embodiments corresponding to FIG. 5, FIG. 9, and FIG. 10A.

The data processing apparatus 110 includes at least one processor 1101 and at least one memory 1102. The processor 1101 and the memory 1102 are interconnected through a line. It should be understood that FIG. 11 shows only one processor 1101 and one memory 1102.

The processor 1101 may be a general-purpose central processing unit (CPU), a microprocessor, a network processor (NP), an application-specific integrated circuit, or one or more integrated circuits for controlling program execution of the solutions of this application. The processor 1101 may be a single-core (single-CPU) processor, or may be a multi-core (multi-CPU) processor. The processor 1101 may be one or more apparatuses, circuits, and/or processing cores configured to process data (for example, computer program instructions). The processor 1101 may be an independent semiconductor chip, or may be integrated with another circuit into a semiconductor chip, for example, may be integrated with another circuit (such as a codec circuit, a hardware acceleration circuit, or various bus and interface circuits) to form a system-on-a-chip (SoC), or may be integrated into the ASIC as a built-in processor of an application-specific integrated circuit (ASIC). The ASIC integrated with the processor may be independently packaged, or may be packaged together with another circuit.

Optionally, the memory 1102 may be a read-only memory (ROM) or another type of static storage device that may store static information and instructions, or a random access memory (RAM) or another type of dynamic storage device that may store information and instructions, or may be an electrically erasable programmable read-only memory (EEPROM). This is not limited herein. The memory 1102 may exist independently, or may be connected to the processor 1101. Alternatively, the memory 1102 may be integrated with the processor 1101, for example, integrated in one or more chips.

In addition, the memory 1102 is further configured to store program code for executing the technical solutions in embodiments of this application. The foregoing program code may be controlled and executed by the processor 1101, and various types of executed computer program code may also be considered as a driver of the processor 1101. Therefore, the processor 1101 may obtain model parameters such as a first parameter and a second parameter, determine auxiliary variables (for example, a first auxiliary variable and a second auxiliary variable) based on the model parameters, and perform, based on the model parameter and the auxiliary variable, transform processing on data input to an invertible flow-based model.

FIG. 12 is used as an example. The processor 1101 in the data processing apparatus 110 invokes the program code stored in the memory 1102 to run the invertible flow-based model. Optionally, the processor 1101 in the data processing apparatus 110 invokes the program code stored in the memory 1102 to run a uniform entropy encoder (the uniform entropy encoder may use first uniform distribution determined based on the first parameter, and second uniform distribution determined based on the second parameter). In a compression and encoding process, the processor 1101 reads to-be-encoded data (for example, various types of original data in FIG. 12) from the memory 1102, and performs forward transform processing on the to-be-encoded data by using the invertible flow-based model to obtain a hidden variable. The encoder performs compression and encoding on the hidden variable to obtain encoded data (that is, compressed data). The processor 1101 stores the generated encoded data in the memory 1102. In a decompression and decoding process, the processor 1101 reads the encoded data (that is, the compressed data) from the memory 1102 to first perform decoding processing to obtain the hidden variable, and then perform inverse transform processing on the hidden variable by using the invertible flow-based model to obtain a decoded output (that is, unencoded data, namely, the to-be-encoded data). The processor 1101 stores the generated to-be-encoded data in the memory 1102, or directly outputs unencoded data (that is, to-be-encoded data).

Optionally, the data processing apparatus 110 further includes a communication interface 1103, and the communication interface 1103 is configured to communicate with another server or a network device. The data processing apparatus 110 may receive instructions or data from another device through the communication interface 1103. For example, the communication interface 1103 is a transceiver, for example, a wireless transceiver or an optical transceiver.

For example, the data processing apparatus 110 may receive, through the communication interface 1103, the first parameter and the second parameter that are set by a user. For another example, the data processing apparatus 110 may receive auxiliary data, for example, first auxiliary data or third auxiliary data, through the communication interface 1103. The data processing apparatus 110 may obtain the first auxiliary data through the communication interface 1103, and the processor 1101 in the data processing apparatus 110 decodes the first auxiliary data by using the first uniform distribution determined based on the first parameter, to obtain the first auxiliary variable and the second auxiliary data. In addition, after the processor 1101 calculates the second auxiliary variable, the processor 1101 encodes the second auxiliary variable by using the second auxiliary data and the second uniform distribution determined based on the second parameter, to obtain the third auxiliary data. The data processing apparatus 110 may output and store the third auxiliary data to an external storage medium through the communication interface 1103, or may directly store the third auxiliary data to the memory 1102 in the data processing apparatus 110. If the data processing apparatus 110 outputs and stores the third auxiliary data to the external storage medium through the communication interface 1103, the data processing apparatus 110 further reads the third auxiliary data from the external storage medium through the communication interface 1103 in the inverse transform processing process.

In addition, the data processing apparatus 110 may further send instructions or data to the another device through the communication interface 1103. For example, when the encoder side and the decoder side are different devices, the data processing apparatus 110 used as the encoder side may send, through the communication interface 1103, the encoded data and the model parameters (for example, the first parameter and the second parameter) to the another device used as the decoder side, so that the decoder side can perform decoding processing and inverse transform processing based on the encoded data and the model parameters to obtain the decoded output.

An embodiment of this application further provides a computer-readable storage medium. The computer-readable storage medium stores a program used to construct an invertible flow-based model. When the foregoing computer program runs on a computer, the computer may be enabled to perform the methods described in embodiments shown in FIG. 3, FIG. 5, FIG. 7, FIG. 8A, FIG. 9, and FIG. 10A.

In a possible implementation, the data processing apparatus 110 shown in FIG. 11 is a chip, and the chip is also referred to as a digital processing chip. The chip includes a processing unit and a communication unit. The processing unit obtains program instructions by using the communication unit, and the program instructions are executed by the processing unit, so that the processing unit performs the method operations described in embodiments corresponding to FIG. 3, FIG. 5, FIG. 7, FIG. 8A, FIG. 9, and FIG. 10A. The processing unit is a circuit integrated with the processor 1101 or a circuit configured to implement a function of the processor 1101. The communication unit is a circuit or an interface integrated with the communication interface 1103, or a circuit or an interface configured to implement a function of the communication interface 1103.

Optionally, when the chip is integrated with a storage unit, the storage unit may be a storage apparatus such as a memory. In this case, the processing unit in the chip may invoke program code from the storage unit to implement the method operations described in embodiments corresponding to FIG. 3, FIG. 5, FIG. 7, FIG. 8A, FIG. 9, and FIG. 10A. When the chip is not integrated with the storage unit, the chip may be connected to a storage apparatus such as an external memory by using the communication unit, so that the program code is obtained from the external memory to implement the method operations described in embodiments corresponding to FIG. 3, FIG. 5, FIG. 7, FIG. 8A, FIG. 9, and FIG. 10A.

For example, when the data processing apparatus 110 shown in FIG. 11 is a chip, an interface of the chip may be shown in FIG. 13. FIG. 13 is a schematic diagram of a structure of a chip according to an embodiment of this application. The chip may be represented as a neural-network processing unit (NPU) 130. The neural-network processing unit 130 is mounted to a host CPU as a coprocessor, and the host CPU allocates a task. A core part of the neural-network processing unit 130 is an operation circuit 1301. The neural-network processing unit 130 controls the operation circuit 1301 to obtain matrix data in a memory by using a controller 1302 (for example, a weight memory or an input memory described below), and perform a multiplication operation.

The operation circuit 1301 has a plurality of possible implementations. In a possible implementation, the operation circuit 1301 internally includes a plurality of process engines (PE). In another possible implementation, the operation circuit 1301 is a two-dimensional systolic array. In another possible implementation, the operation circuit 1301 may alternatively be a one-dimensional systolic array or another electronic circuit that can perform mathematical operations such as multiplication and addition. In another possible implementation, the operation circuit 1301 is a general-purpose matrix processor. A form of the operation circuit 1301 is not limited in this embodiment of this application.

For example, it is assumed that the input memory 1304 stores an input matrix A, and the weight memory 1303 stores a weight matrix B. The operation circuit 1301 fetches, from the weight memory 1303, data corresponding to the matrix B, and buffers the data in each PE of the operation circuit 1301. In addition, the operation circuit 1301 further obtains the matrix A from the input memory 1304, and performs a matrix operation by using the matrix A and the matrix B to obtain an output matrix C. The output matrix C may be a partial result or a final result, and the output matrix C is stored in an accumulator 1305.

In addition, the neural-network processing unit 130 further includes a unified memory 1306, configured to: store input data, and output data. Generally, the input data may be transferred to the unified memory 1306 by using a direct memory access controller (DMAC) 1307. Some input data or output data may be transferred to the weight memory 1303 by using the direct memory access controller 1307. For example, externally input weight data (for example, a weight matrix) may be transferred to the weight memory 1303 by using the direct memory access controller 1307.

In addition, a bus interface unit (BIU) 1308 of the neural-network processing unit 130 is configured to interact with the direct memory access controller 1307 and an instruction fetch buffer (IFB) 1309 by using a bus protocol (advanced extensible interface, AXI). In addition, the bus interface unit 1308 is further configured to obtain instructions from the external memory by using the instruction fetch buffer 1309, and is further configured to obtain input data, for example, original data of the input matrix A or original data of the weight matrix B in the foregoing example, from the external memory by using the direct memory access controller 1307.

Optionally, the neural-network processing unit 130 further includes a vector calculation unit 1310. The vector calculation unit 1310 may include a plurality of operation processing units. In one embodiment, the vector calculation unit 1310 may perform further processing on an output of the operation circuit 1301, for example, vector multiplication, vector addition, an exponential operation, a logarithm operation, or size comparison. In addition, the vector calculation unit 1310 is further configured to perform network calculation at a non-convolutional/fully connected layer in a neural network, for example, processing such as batch normalization, pixel-level summation, and upsampling on a feature plane.

In a possible implementation, the vector calculation unit 1310 can store an output vector obtained through processing in the unified memory 1306, so that the operation circuit 1301 invokes data such as the vector and a function in the unified memory 1306 in a subsequent calculation process. For example, the vector calculation unit 1310 may store a linear function and/or a non-linear function in the unified memory 1306, so that the vector calculation unit may invoke the linear function and/or the non-linear function from the unified memory 1306 to further process the output of the operation circuit 1301, and store a processing result in the unified memory 1306 or the accumulator 1305. For another example, the vector calculation unit 1310 may perform linear transform or non-linear transform on to-be-processed data. In another possible implementation, the vector calculation unit 1310 may be further configured to generate a normalized value, a pixel-level sum, or a normalized value and a pixel-level sum. In another possible implementation, the processed output vector can be used as an activation input of the operation circuit 1301, so that the output vector can be used at a subsequent hidden layer in the neural network.

In addition, the controller 1302 is further connected to the instruction fetch buffer 1309, so that the instruction fetch buffer 1309 can store instructions used by the controller 1302.

It should be understood that the weight memory 1303, the input memory 1304, the unified memory 1306, and the instruction fetch buffer 1309 are all on-chip memories. In addition, the external memory is private for a hardware architecture of the neural-network processing unit.

An operation at each layer in the neural network may be performed by the operation circuit 1301 or the vector calculation unit 1310.

The processor mentioned above may be a general-purpose central processing unit, a microprocessor, an ASIC, or one or more integrated circuits for controlling program execution of the methods in FIG. 3, FIG. 5, FIG. 7, FIG. 8A, FIG. 9, and FIG. 10A. This is not limited herein.

FIG. 14 is a schematic diagram of a structure of a data processing apparatus 140 according to an embodiment of this application.

When the data processing apparatus 140 is used as an encoder side, the data processing apparatus 140 runs the following modules to implement functions of the data processing apparatus in the method embodiments corresponding to FIG. 3, FIG. 7, and FIG. 8A.

The data processing apparatus 140 includes an obtaining module 1401, a transform processing module 1402, and an encoding module 1403. The transform processing module 1402 includes the invertible flow-based model proposed in this application. At the encoder side, the invertible flow-based model is used to perform forward transform processing on data input to the invertible flow-based model. Functions of the foregoing functional modules are as follows:

The obtaining module 1401 is configured to obtain to-be-encoded data;

the transform processing module 1402 is configured to perform forward transform processing on the to-be-encoded data by using the invertible flow-based model to obtain a hidden variable, where the invertible flow-based model includes a target invertible flow layer, the target invertible flow layer includes a model parameter, the model parameter is used to constrain an auxiliary variable generated in the forward transform processing process, an operation corresponding to the target invertible flow layer includes a multiplication operation and a division operation that are determined based on the model parameter, and the auxiliary variable is an increment of a product of the multiplication operation or a remainder generated through the division operation; and the encoding module 1403 is configured to perform encoding processing on the hidden variable to obtain encoded data corresponding to the to-be-encoded data.

In this embodiment, because the invertible flow-based model used to perform forward transform processing on the to-be-encoded data includes the target invertible flow layer, not only the target invertible flow layer includes the multiplication operation and the division operation that are determined based on the model parameter, but the model parameter of the target invertible flow layer can further constrain the auxiliary variable generated in the forward transform processing process. The auxiliary variable is the increment of the product of the multiplication operation or the remainder generated through the division operation. In other words, in this application, not only the multiplication operation can be used, but invertibility can be implemented by using the auxiliary variable when the division operation is performed. Therefore, in comparison with an integer discrete flow model in the conventional technology, a model representation capability is improved. This helps improve estimation accuracy of model probability distribution, and can further improve compression efficiency of lossless compression.

In a possible implementation, the invertible flow-based model includes N invertible flow layers, the N invertible flow layers include the target invertible flow layer, and N is an integer greater than or equal to 1.

The target invertible flow layer is used to perform forward transform processing on first data input to the target invertible flow layer to obtain second data output from the target invertible flow layer. The first data is a multiplier of the multiplication operation, and the second data is an integer quotient of the division operation. The first data is the to-be-encoded data or data output through processing by at least one invertible flow layer. The second data is the hidden variable, or data output by processing the second data by the at least one invertible flow layer is the hidden variable.

In a possible implementation, the model parameter includes a first parameter and a second parameter, both the first parameter and the second parameter are positive integers, the first parameter is unequal to the second parameter, the auxiliary variable includes a first auxiliary variable, and the first auxiliary variable is the increment of the product of the multiplication operation.

The transform processing module 1402 is configured to:
perform a multiplication operation by using the first data as a multiplier of the first parameter to obtain first product data;
perform an addition operation by using the first auxiliary variable as an increment of the first product data to obtain intermediate data; and
perform a division rounding operation by using the intermediate data as a divisor and the second parameter as a dividend to obtain the second data.

In this implementation, the data processing apparatus 140 performs the addition operation on the first auxiliary variable and a product (that is, the first product data) obtained by performing the multiplication operation on the first data and the first parameter, to obtain the intermediate data. The data processing apparatus 140 performs the division operation by using the intermediate data as the divisor and the second parameter as the dividend, and the obtained integer quotient is the second data. It can be learned that, in the forward transform process, the first data is first transformed into the intermediate data based on the multiplication operation and the addition operation, and the intermediate data is transformed into the second data based on the division rounding operation. Because the first auxiliary variable participates in a process of determining the intermediate data, that is, the first auxiliary variable is used as the increment of the product of the multiplication operation, and the integer quotient obtained by performing the division rounding operation based on the intermediate data is the second data, this avoids a problem of a non-invertible operation caused by using only the multiplication operation, and also avoids a problem of a poor model representation capability caused by using only the addition operation and a subtraction operation.

In a possible implementation, the auxiliary variable further includes a second auxiliary variable, and the second auxiliary variable is the remainder generated through the division operation.

The transform processing module 1402 is further configured to perform a division modulo operation by using the intermediate data as a divisor and the second parameter as a dividend to obtain the second auxiliary variable. The second auxiliary variable is used as an increment of a product of a multiplication operation in inverse transform processing corresponding to the forward transform processing, and the first auxiliary variable is used as a remainder generated through a division operation in the inverse transform processing.

In this implementation, it is proposed that the second auxiliary variable is further generated when the target invertible flow-based model is in the forward transform processing, and the second auxiliary variable is used as the increment of the product of the multiplication operation in the inverse transform processing corresponding to the forward transform processing. In other words, in the inverse transform processing, the data processing apparatus 140 restores the second data to the intermediate data based on the second auxiliary variable, and further restores the intermediate data to the first data. Therefore, in the forward transform processing, the second auxiliary variable is calculated. This helps restore the second data to the first data.

In a possible implementation, the transform processing module 1402 is further configured to:
obtain first auxiliary data input to the target invertible flow layer; and
determine the first auxiliary variable based on the first auxiliary data and the first parameter.

In a possible implementation, the transform processing module 1402 is configured to:
determine first uniform distribution based on the first parameter, where endpoints of the first uniform distribution are 0 and the first parameter; and
decode the first auxiliary data by using the first uniform distribution to obtain the first auxiliary variable and second auxiliary data, where a value of the first auxiliary variable is between 0 and the first parameter.

In a possible implementation, the transform processing module 1402 includes a first entropy encoding and decoding module 14021, the first entropy encoding and decoding module 14021 stores the first uniform distribution, and the first entropy encoding and decoding module 14021 is configured to:
perform a division modulo operation by using the first auxiliary data as a divisor and the first parameter as a dividend to obtain the first auxiliary variable; and
perform a division rounding operation by using the first auxiliary data as a divisor and the first parameter as a dividend to obtain the second auxiliary data, where the second auxiliary data is used to: encode the second auxiliary variable in the forward transform process, and encode the first auxiliary variable in the inverse transform process.

In a possible implementation, the transform processing module 1402 is further configured to:
determine second uniform distribution based on the second parameter, where endpoints of the second uniform distribution are 0 and the second parameter;
encode the second auxiliary variable by using the second uniform distribution and the second auxiliary data to obtain third auxiliary data, where a value of the second auxiliary variable is between 0 and the second parameter; and store the third auxiliary data, where the third auxiliary data is used to decode the second auxiliary variable in the inverse transform processing.

In this implementation, because the data processing apparatus 140 encodes the second auxiliary variable by using the second auxiliary data to obtain the third auxiliary data encoded with the second auxiliary variable, this helps the data processing apparatus 140 store the third auxiliary data, so that the data processing apparatus 140 decodes the second auxiliary variable by using the third auxiliary data in the inverse transform processing process. Because storage space occupied for storing the third auxiliary data is far less than storage space required for storing the second auxiliary variable, in comparison with a solution in which the data processing apparatus 140 directly stores the second auxiliary variable, this helps save the storage space, and improve storage efficiency. In addition, because the third auxiliary data is determined by encoding the second auxiliary variable by using the second auxiliary data, and the second auxiliary data is obtained in a process in which the first auxiliary variable is decoded by using the first auxiliary data, storing the third auxiliary data means indirectly storing a correspondence between the second auxiliary variable and the first auxiliary variable (this is equivalent to storing the first auxiliary variable and the second auxiliary variable correspondingly).

In a possible implementation, the transform processing module 1402 includes a second entropy encoding and decoding module 14022, the second entropy encoding and decoding module 14022 stores the second uniform distribution, and the second entropy encoding and decoding module 14022 is configured to:

perform an addition operation on the second auxiliary variable and a product obtained by performing a multiplication operation on the second auxiliary data and the second parameter, to obtain the third auxiliary data.

In another possible implementation, the target invertible flow layer is further used to:

obtain a first interval in a definition range of a first monotonic continuous function and a second interval that corresponds to the first interval and that is in a value range of the first monotonic continuous function, where the first monotonic continuous function is a non-linear function; and calculate the model parameter based on the first interval and the second interval by using an interpolation algorithm or a binary search algorithm.

In a possible implementation, when the N invertible flow layers include at least two invertible flow layers, the N invertible flow layers are arranged in a serial manner.

An output at an $(i-1)^{th}$ invertible flow layer is used as an input at an $i^{th}$ invertible flow layer, i is a positive integer greater than 1 and not greater than N, an input at a first invertible flow layer is the to-be-encoded data, and an output at an $N^{th}$ invertible flow layer is the hidden variable.

In a possible implementation, the to-be-encoded data is data obtained by performing bits-back encoding processing on original data by using noise data, and the to-be-encoded data is fixed-point number data with first preset precision. The $i^{th}$ invertible flow layer is further used to: before the forward transform processing, process the fixed-point number data with first preset precision into integer data, and process the integer data obtained through the forward transform processing into the fixed-point number data with first preset precision, to be used as an output at the $i^{th}$ invertible flow layer.

It should be understood that the noise data may be a bit stream of compressed data in the data processing apparatus 140, or may be a bit stream prestored in the data processing apparatus 140. This is not limited herein. In this implementation, because bits-back encoding processing is performed on the original data by using the noise data, a value of data calculated by the data processing apparatus 140 can be increased. This helps improve processing precision in a subsequent transform process, and also helps improve a compression ratio.

In a possible implementation, the N invertible flow layers further include an invertible convolutional layer, the invertible convolutional layer includes a convolution kernel and the target invertible flow layer, and the convolution kernel is a square matrix whose order is a quantity of channels of the to-be-encoded data. The invertible convolutional layer is used to perform LU factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

In this implementation, it is proposed that the invertible convolutional layer is disposed in the invertible flow-based model, and the 1*1 convolutional layer is combined with the target invertible flow layer. The 1*1 convolutional layer is converted into continuous matrix multiplication operations of an upper triangular matrix, the diagonal matrix, a lower triangular matrix, and a permutation matrix. Iteration calculation, numerically invertible linear flow transform processing based on the target invertible flow layer, iteration calculation, and element rearrangement are used for the four matrix multiplications, respectively. Therefore, diversity of data transformation can be implemented, and a representation capability of the invertible flow-based model can be improved.

In a possible implementation, the N invertible flow layers further include a coupling layer, and the coupling layer includes the target invertible flow layer. The coupling layer is used to: divide, based on preset dimensions, data input to the coupling layer into at least two parts of data, and process at least one of the at least two parts of data as the input at the target invertible flow layer to obtain an output at the coupling layer.

It should be understood that the coupling layer may include a neural network, and the neural network is used to process, based on the dimensions, the data input to the coupling layer. The neural network may include a plurality of types, for example, a convolutional neural network (CNN), a deep neural network (DNN), a recurrent neural network (RNN), or another neural network. This is not limited herein.

In this implementation, it is proposed that the coupling layer is disposed in the invertible flow-based model. The coupling layer can divide, based on the dimensions, the data input to the coupling layer, and perform transform processing only on data in some dimensions in a transform mode of the target invertible flow layer. Therefore, diversity of data transformation can be implemented, and a representation capability of the invertible flow-based model can be improved.

FIG. 15 is a schematic diagram of a structure of a data processing apparatus 150 according to an embodiment of this application.

When the data processing apparatus 150 is used as a decoder side, the data processing apparatus 150 runs the following modules to implement functions of the data processing apparatus in the method embodiments corresponding to FIG. 5, FIG. 9, and FIG. 10A.

The data processing apparatus 150 includes an obtaining module 1501, a decoding module 1502, and a transform processing module 1503. The transform processing module 1503 includes the invertible flow-based model proposed in this application. At the decoder side, the invertible flow-based model is used to perform inverse transform processing on a hidden variable input to the invertible flow-based model. Functions of the foregoing functional modules are as follows:

The obtaining module 1501 is configured to obtain encoded data;

the decoding module 1502 is configured to perform decoding processing on the encoded data to obtain the hidden variable; and the transform processing module 1503 is configured to perform inverse transform processing on the hidden variable by using the invertible flow-based model to obtain a decoded output, where the invertible flow-based model includes a target invertible flow layer, the target invertible flow layer includes a model parameter, the model parameter is used to constrain an auxiliary variable generated in the inverse transform processing process, an operation corresponding to the target invertible flow layer includes a multiplication operation and a division operation that are determined based on the model parameter, and the auxiliary variable is an increment of a product of the multiplication operation or a remainder generated through the division operation.

In this embodiment, the data processing apparatus 150 performs inverse transform processing on the decoded hidden variable, and the invertible flow-based model used to perform inverse transform processing includes the target invertible flow layer. Not only the target invertible flow layer includes the multiplication operation and the division operation that are determined based on the model parameter, but the model parameter of the target invertible flow layer can further constrain the auxiliary variable generated in the inverse transform processing process. The auxiliary variable is the increment of the product of the multiplication operation or the remainder generated through the division operation. In other words, in this application, for the multiplication operation in the forward transform processing process, the division operation can be performed by using the auxiliary variable, to restore the hidden variable to data (that is, the to-be-encoded data in the foregoing data encoding method) before the forward transform processing. Therefore, not only the invertible operation of transform processing can be ensured, but a model representation capability can be improved. This helps improve estimation accuracy of model probability distribution, and can further improve compression efficiency of lossless compression.

In a possible implementation, the invertible flow-based model includes N invertible flow layers, the N invertible flow layers include the target invertible flow layer, and N is an integer greater than or equal to 1.

The target invertible flow layer is used to perform inverse transform processing on second data input to the target invertible flow layer to obtain first data output from the target invertible flow layer. The second data is a multiplier of the multiplication operation, and the first data is an integer quotient of the division operation. The second data is the hidden variable or data output through processing by at least one invertible flow layer. The first data is the decoded output, or an output obtained by processing the first data by the at least one invertible flow layer is the decoded output.

In a possible implementation, the model parameter includes a first parameter and a second parameter, both the first parameter and the second parameter are positive integers, the first parameter is unequal to the second parameter, the auxiliary variable includes a second auxiliary variable, and the second auxiliary variable is the increment of the product of the multiplication operation.

The transform processing module 1503 is configured to:

perform a multiplication operation by using the second data as a multiplier of the second parameter to obtain second product data;

perform an addition operation by using the second auxiliary variable as an increment of the second product data to obtain intermediate data; and perform a division rounding operation by using the intermediate data as a divisor and the first parameter as a dividend to obtain the first data.

In this implementation, the data processing apparatus 150 performs the addition operation on the second auxiliary variable and a product (that is, the second product data) obtained by performing the multiplication operation on the second data and the second parameter, to obtain the intermediate data. The data processing apparatus 150 performs the division operation by using the intermediate data as the divisor and the first parameter as the dividend, and the obtained integer quotient is the first data. It can be learned that, in the forward transform process, the second data is first transformed into the intermediate data based on the multiplication operation and the addition operation, and the intermediate data is transformed into the first data based on the division rounding operation. Because the second auxiliary variable participates in a process of determining the intermediate data, that is, the second auxiliary variable is used as the increment of the product of the multiplication operation, and the integer quotient obtained by performing the division rounding operation based on the intermediate data is the first data, this avoids a problem of a non-invertible operation caused by using only the multiplication operation, and also avoids a problem of a poor model representation capability caused by using only the addition operation and a subtraction operation.

In a possible implementation, the auxiliary variable further includes a first auxiliary variable, and the first auxiliary variable is the remainder generated through the division operation.

The transform processing module 1503 is further configured to:

perform a division modulo operation by using the intermediate data as a divisor and the first parameter as a dividend to obtain the first auxiliary variable.

In a possible implementation, the transform processing module 1503 is configured to:

obtain third auxiliary data input to the target invertible flow layer, where the third auxiliary data is auxiliary data stored in the forward transform processing corresponding to the inverse transform processing; and determine the second auxiliary variable based on the third auxiliary data and the second parameter.

In this embodiment, it is proposed that the data processing apparatus 150 determines the second auxiliary variable by using the third auxiliary data stored in the forward transform processing corresponding to the inverse transform processing. This helps restore the second auxiliary variable from the third auxiliary data, to ensure that a value of the second auxiliary variable used in the inverse transform processing process is consistent with a value of the second auxiliary variable used in the forward transform processing process.

In a possible implementation, the transform processing module 1503 is configured to:
determine second uniform distribution based on the second parameter, where endpoints of the second uniform distribution are 0 and the second parameter; and
decode the third auxiliary data by using the second uniform distribution to obtain the second auxiliary variable and second auxiliary data, where a value of the second auxiliary variable is between 0 and the second parameter.

In a possible implementation, the transform processing module 1503 includes a second entropy encoding and decoding module 15032, the second entropy encoding and decoding module 15032 stores the second uniform distribution, and the second entropy encoding and decoding module 15032 is configured to:
perform a division modulo operation by using the third auxiliary data as a divisor and the second parameter as a dividend to obtain the second auxiliary variable; and
perform a division rounding operation by using the third auxiliary data as a divisor and the second parameter as a dividend to obtain the second auxiliary data, where the second auxiliary data is used to: encode the second auxiliary variable in the forward transform process, and encode the first auxiliary variable in the inverse transform process.

In a possible implementation, the transform processing module 1503 is further configured to:
determine first uniform distribution based on the first parameter, where endpoints of the first uniform distribution are 0 and the first parameter;
encode the first auxiliary variable by using the first uniform distribution and the second auxiliary data to obtain first auxiliary data, where a value of the first auxiliary variable is between 0 and the first parameter; and
store the first auxiliary data, where the first auxiliary data is auxiliary data that is input to the target invertible flow layer in the forward transform processing corresponding to the inverse transform processing.

In this implementation, because the data processing apparatus 150 encodes the first auxiliary variable by using the second auxiliary data to obtain the first auxiliary data encoded with the first auxiliary variable, this helps the data processing apparatus 150 store the first auxiliary data. Because storage space occupied for storing the first auxiliary data is far less than storage space required for storing the first auxiliary variable, in comparison with a solution in which the data processing apparatus 150 directly stores the first auxiliary variable, this helps save the storage space, and improve storage efficiency. In addition, generating and storing the first auxiliary data helps restore the first auxiliary data input to the target invertible flow layer in the forward transform processing process.

In a possible implementation, the transform processing module 1503 includes a first entropy encoding and decoding module 15031, the first entropy encoding and decoding module 15031 stores the first uniform distribution, and the first entropy encoding and decoding module 15031 is configured to:
perform an addition operation on the first auxiliary variable and a product obtained by performing a multiplication operation on the second auxiliary data and the first parameter, to obtain the first auxiliary data.

In another possible implementation, the target invertible flow layer is further used to:
obtain a first interval in a definition range of a first monotonic continuous function and a second interval that corresponds to the first interval and that is in a value range of the first monotonic continuous function, where the first monotonic continuous function is a non-linear function; and
calculate the model parameter based on the first interval and the second interval by using an interpolation algorithm or a binary search algorithm.

In a possible implementation, when the N invertible flow layers include at least two invertible flow layers, the N invertible flow layers are arranged in a serial manner.

An output at an $i^{th}$ invertible flow layer is used as an input at an $(i-1)^{th}$ invertible flow layer, i is a positive integer greater than 1 and not greater than N, an input at an $N^{th}$ invertible flow layer is the hidden variable, and an output at a first invertible flow layer is the decoded output.

In a possible implementation, the $i^{th}$ invertible flow layer is further used to: before the inverse transform processing, process fixed-point number data with first preset precision into integer data, and process, into the fixed-point number data with first preset precision, the integer data obtained through the inverse transform processing, to be used as an output at the $i^{th}$ invertible flow layer.

In a possible implementation, the decoding module is further configured to perform bits-back decoding processing on the output at the first invertible flow layer to obtain original data and noise data.

In a possible implementation, the N serial invertible flow layers further include an invertible convolutional layer, the invertible convolutional layer includes a convolution kernel and the target invertible flow layer, and the convolution kernel is a square matrix whose order is a quantity of channels of the to-be-encoded data. The invertible convolutional layer is used to perform LU factorization on the convolution kernel to obtain a target matrix, the target matrix is a diagonal matrix, and a non-zero element on a diagonal of the diagonal matrix is used to determine a model parameter of the target invertible flow layer at the invertible convolutional layer.

In this implementation, it is proposed that the invertible convolutional layer is disposed in the invertible flow-based model, and the 1*1 convolutional layer is combined with the target invertible flow layer. The 1*1 convolutional layer is converted into continuous matrix multiplication operations of an upper triangular matrix, the diagonal matrix, a lower triangular matrix, and a permutation matrix. Iteration calculation, numerically invertible linear flow transform processing based on the target invertible flow layer, iteration calculation, and element rearrangement are used for the four matrix multiplications, respectively. Therefore, diversity of data transformation can be implemented, and a representation capability of the invertible flow-based model can be improved.

In a possible implementation, the N serial invertible flow layers further include a coupling layer, and the coupling layer includes the target invertible flow layer. The coupling layer is used to: divide, based on preset dimensions, data input to the coupling layer into at least two parts of data, and process at least one of the at least two parts of data as the input at the target invertible flow layer to obtain an output at the coupling layer.

It should be understood that the coupling layer may include a neural network, and the neural network is used to process, based on the dimensions, the data input to the coupling layer. The neural network may include a plurality of types, for example, a convolutional neural network CNN, a deep neural network DNN, a recurrent neural network RNN, or another neural network. This is not limited herein.

In this implementation, it is proposed that the coupling layer is disposed in the invertible flow-based model. The coupling layer can divide, based on the dimensions, the data input to the coupling layer, and perform transform processing only on data in some dimensions in a transform mode of the target invertible flow layer. Therefore, the diversity of the data transformation can be implemented, and the representation capability of the invertible flow-based model can be improved.

In addition, it should be noted that the apparatus embodiments described above are merely used as examples. The units described as separate components may or may not be physically separate. Components shown as units may be or may not be physical units, and may be located in one position, or may be distributed on a plurality of network units. In actual application, some or all of the modules/units may be selected based on an actual requirement to achieve the objectives of the solutions of embodiments. In addition, in the accompanying drawings of the apparatus embodiments provided in this application, connection relationships between the modules indicate that the modules have communication connections with each other, which may be implemented as one or more communication buses or signal cables.

Based on the description of the foregoing implementations, persons skilled in the art may clearly understand that this application may be implemented by software in addition to universal hardware, or certainly may be implemented by dedicated hardware, including an application-specific integrated circuit, a dedicated CPU, a dedicated memory, a dedicated component, and the like. Generally, any function performed by a computer program can be easily implemented by using corresponding hardware, and a hardware structure used to achieve a same function may be of various forms, for example, in a form of an analog circuit, a digital circuit, a dedicated circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, or a network device) to perform the methods described in embodiments of this application.

In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

Descriptions such as "first" and "second" in this specification are only used to distinguish one object or operation from another, and do not necessarily require or imply that any actual relationship or sequence exists between these objects or operations.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data encoding method, comprising:
   obtaining to-be-encoded data;
   performing forward transform processing on the to-be-encoded data using an invertible flow-based model to obtain a hidden variable, wherein the invertible flow-based model comprises a target invertible flow layer comprising a model parameter used to constrain an auxiliary variable generated in the forward transform processing, and wherein an operation corresponding to the target invertible flow layer comprises a multiplication operation and a division operation that are determined based on the model parameter, and the auxiliary variable is an increment of a product of the multiplication operation or a remainder generated through the division operation; and
   performing encoding processing on the hidden variable to obtain encoded data corresponding to the to-be-encoded data.

2. The method according to claim 1, wherein
   the invertible flow-based model comprises N invertible flow layers that comprise the target invertible flow layer, and N is an integer greater than or equal to 1; and
   the target invertible flow layer is used to perform forward transform processing on first data input to the target invertible flow layer to obtain second data output from the target invertible flow layer, wherein the first data is a multiplier of the multiplication operation, and the second data is an integer quotient of the division operation; and
   the first data is the to-be-encoded data or data output through processing by at least one invertible flow layer; and the second data is the hidden variable, or data output by processing the second data by the target invertible flow layer is the hidden variable.

3. The method according to claim 2, wherein
   the model parameter comprises a first parameter and a second parameter, both the first parameter and the second parameter are positive integers, the first parameter is unequal to the second parameter, the auxiliary variable comprises a first auxiliary variable, and the first auxiliary variable is the increment of the product of the multiplication operation; and the performing forward transform processing further comprises:
    performing a multiplication operation by using the first data as a multiplier of the first parameter to obtain first product data;
    performing an addition operation by using the first auxiliary variable as an increment of the first product data to obtain intermediate data; and
    performing a division rounding operation by using the intermediate data as a divisor and the second parameter as a dividend to obtain the second data.

4. The method according to claim 3, wherein
the auxiliary variable further comprises a second auxiliary variable, and the second auxiliary variable is the remainder generated through the division operation; and
the method further comprises:
    performing a division modulo operation using the intermediate data as a divisor and the second parameter as a dividend to obtain the second auxiliary variable, wherein the second auxiliary variable is used as an increment of a product of a multiplication operation in inverse transform processing corresponding to the forward transform processing, and the first auxiliary variable is used as a remainder generated through a division operation in the inverse transform processing.

5. The method according to claim 3, wherein the method further comprises:
    obtaining first auxiliary data input to the target invertible flow layer; and
    determining the first auxiliary variable based on the first auxiliary data and the first parameter.

6. A data decoding method, comprising:
    obtaining encoded data;
    performing decoding processing on the encoded data to obtain a hidden variable; and
    performing inverse transform processing on the hidden variable by using an invertible flow-based model to obtain a decoded output, wherein the invertible flow-based model comprises a target invertible flow layer comprising a model parameter used to constrain an auxiliary variable generated in the inverse transform processing process, and wherein an operation corresponding to the target invertible flow layer comprises a multiplication operation and a division operation that are determined based on the model parameter, and the auxiliary variable is an increment of a product of the multiplication operation or a remainder generated through the division operation.

7. The method according to claim 6, wherein
the invertible flow-based model comprises N invertible flow layers that comprise the target invertible flow layer, and N is an integer greater than or equal to 1; and
the target invertible flow layer is used to perform inverse transform processing on second data input to the target invertible flow layer to obtain first data output from the target invertible flow layer, wherein the second data is a multiplier of the multiplication operation, and the first data is an integer quotient of the division operation; and
the second data is the hidden variable or data output through processing by at least one invertible flow layer; and the first data is the decoded output, or an output obtained by processing the first data by the target invertible flow layer is the decoded output.

8. The method according to claim 7, wherein
the model parameter comprises a first parameter and a second parameter, both the first parameter and the second parameter are positive integers, the first parameter is unequal to the second parameter, the auxiliary variable comprises a second auxiliary variable, and the second auxiliary variable is the increment of the product of the multiplication operation; and
the performing inverse transform processing further comprises:
    performing a multiplication operation by using the second data as a multiplier of the second parameter to obtain second product data;
    performing an addition operation by using the second auxiliary variable as an increment of the second product data to obtain intermediate data; and
    performing a division rounding operation by using the intermediate data as a divisor and the first parameter as a dividend to obtain the first data.

9. The method according to claim 8, wherein
the auxiliary variable further comprises a first auxiliary variable, and the first auxiliary variable is the remainder generated through the division operation; and
the method further comprises:
    performing a division modulo operation using the intermediate data as a divisor and the first parameter as a dividend to obtain the first auxiliary variable.

10. The method according to claim 9, wherein the method further comprises:
    obtaining third auxiliary data input to the target invertible flow layer, wherein the third auxiliary data is auxiliary data stored in forward transform processing corresponding to the inverse transform processing; and
    determining the second auxiliary variable based on the third auxiliary data and the second parameter.

11. The method according to claim 10, wherein the determining the second auxiliary variable further comprises:
    determining second uniform distribution based on the second parameter, wherein endpoints of the second uniform distribution are 0 and the second parameter; and
    decoding the third auxiliary data by using the second uniform distribution to obtain the second auxiliary variable and second auxiliary data, wherein a value of the second auxiliary variable is between 0 and the second parameter.

12. The method according to claim 11, wherein the decoding the third auxiliary data further comprises:
    performing a division modulo operation by using the third auxiliary data as a divisor and the second parameter as a dividend to obtain the second auxiliary variable; and
    performing a division rounding operation using the third auxiliary data as a divisor and the second parameter as a dividend to obtain the second auxiliary data, wherein the second auxiliary data is used to: encode the second auxiliary variable in the forward transform process, and encode the first auxiliary variable in the inverse transform process.

13. The method according to claim 11, wherein the method further comprises:
    determining first uniform distribution based on the first parameter, wherein endpoints of the first uniform distribution are 0 and the first parameter;
    encoding the first auxiliary variable by using the first uniform distribution and the second auxiliary data to obtain first auxiliary data, wherein a value of the first auxiliary variable is between 0 and the first parameter; and storing the first auxiliary data, wherein the first auxiliary data is auxiliary data that is input to the target invertible flow layer in the forward transform processing corresponding to the inverse transform processing.

14. The method according to claim 13, wherein the encoding the first auxiliary variable further comprises:
performing an addition operation on the first auxiliary variable and a product obtained by performing a multiplication operation on the second auxiliary data and the first parameter, to obtain the first auxiliary data.

15. The method according to claim 7, wherein the target invertible flow layer is further used to:
obtain a first interval in a definition range of a first monotonic continuous function and a second interval that corresponds to the first interval and that is in a value range of the first monotonic continuous function, wherein the first monotonic continuous function is a non-linear function; and
calculate the model parameter based on the first interval and the second interval by using an interpolation algorithm or a binary search algorithm.

16. The method according to claim 7, wherein
when the N invertible flow layers comprise at least two invertible flow layers, the N invertible flow layers are arranged in a serial manner; and
an output at an $i^{th}$ invertible flow layer is used as an input at an $(i-1)^{th}$ invertible flow layer, i is a positive integer greater than 1 and not greater than N, an input at an $N^{th}$ invertible flow layer is the hidden variable, and an output at a first invertible flow layer is the decoded output.

17. The method according to claim 16, wherein the $i^{th}$ invertible flow layer is further used to:
before the inverse transform processing, process fixed-point number data with first preset precision into integer data, and process, into the fixed-point number data with first preset precision, the integer data obtained through the inverse transform processing, to be used as an output at the $i^{th}$ invertible flow layer.

18. The method according to claim 16, wherein the method further comprises:
performing bits-back decoding processing on the output at the first invertible flow layer to obtain original data and noise data.

19. A data processing apparatus, comprising a processor, wherein the processor is coupled to a memory, the memory stores a program, and when program instructions stored in the memory are executed by the processor, the data processing apparatus is enabled to implement the method according to claim 1.

20. A data processing apparatus, comprising:
a processor; and
a memory to store instructions that, when executed by the processor cause the processor to:
obtain encoded data;
perform decoding processing on the encoded data to obtain a hidden variable; and
perform inverse transform processing on the hidden variable by using an invertible flow-based model to obtain a decoded output, wherein the invertible flow-based model comprises a target invertible flow layer comprising a model parameter used to constrain an auxiliary variable generated in the inverse transform processing process, and wherein an operation corresponding to the target invertible flow layer comprises a multiplication operation and a division operation that are determined based on the model parameter, and the auxiliary variable is an increment of a product of the multiplication operation or a remainder generated through the division operation.

\* \* \* \* \*